US008123615B2

(12) United States Patent
Okada

(10) Patent No.: US 8,123,615 B2
(45) **Date of Patent: *Feb. 28, 2012**

(54) MULTIPLAYER GAMING MACHINE CAPABLE OF CHANGING VOICE PATTERN

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 485 days.

This patent is subject to a terminal disclaimer.

(21) Appl. No.: 12/358,957

(22) Filed: Jan. 23, 2009

(65) Prior Publication Data

US 2009/0209319 A1 Aug. 20, 2009

Related U.S. Application Data

(60) Provisional application No. 61/028,773, filed on Feb. 14, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ..... 463/35; 463/20; 704/257; 704/E15.003; 704/E15.004

(58) Field of Classification Search .................... 463/16, 463/20, 31, 35, 36, 43; 704/257, E15.003
See application file for complete search history.

(56) References Cited

U.S. PATENT DOCUMENTS

| | | | |
|---|---|---|---|
| 2002/0010574 | A1 | 1/2002 | Tsourikov et al. |
| 2002/0116176 | A1 | 8/2002 | Tsourikov et al. |
| 2007/0033040 | A1 | 2/2007 | Huang et al. |
| 2007/0094004 | A1 | 4/2007 | Huang et al. |
| 2007/0094005 | A1 | 4/2007 | Huang et al. |
| 2007/0094006 | A1 | 4/2007 | Todhunter et al. |
| 2007/0094007 | A1 | 4/2007 | Huang et al. |
| 2007/0094008 | A1 | 4/2007 | Huang et al. |
| 2007/0123354 | A1 | 5/2007 | Okada |

*Primary Examiner* — Jarrett Stark
(74) *Attorney, Agent, or Firm* — NDQ&M Watchstone LLP

(57) ABSTRACT

Herein disclosed is a gaming machine executing a game and paying out a predetermined amount of credits according to a game result; generating voice data based on a player's voice; identifying a voice pattern corresponding to the voice data by retrieving the dialogue voice database and identifying a type of voice corresponding to the voice data, so as to store the voice data along with the voice pattern into the memory; calculating a value indicative of a game result, and updating the play history data stored in the memory using the result of the calculation; comparing the play history data thus updated with a predetermined threshold value data; generating voice data according to the voice pattern based on the play history data if the play history data thus updated exceeds the predetermined threshold value data; and outputting voices from the speaker.

8 Claims, 40 Drawing Sheets

FIG. 13

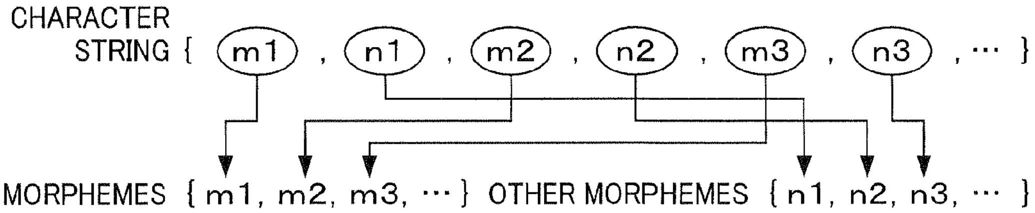

FIG. 14

| SPEECH SENTENCE TYPE | | EXAMPLE DATA(SENTENCE) |
|---|---|---|
| DA | DECLARATION ACKNOWLEDGMENT | I LIKE HORSES |
| LA | LOCATION ACKNOWLEDGMENT | I LIKE A SERIOUS-FACED HORSE STANDING IN A PADDOCK |
| NA | NEGATIVE ACKNOWLEDGMENT | I DO NOT WANT TO TALK WITH PEOPLE WHO DO NOT LIKE HORSES. |
| DQ | DECLARATION QUESTION | DO YOU LIKE HORSES? |
| LQ | LOCATION QUESTION | WHICH PART OF THE HORSE STANDING IN THE PADDOCK DO YOU LIKE? |
| NQ | NEGATIVE QUESTION | IS IT A LIE THAT YOU LIKE HORSES? |
| ⋮ | ⋮ | ⋮ |

FIG. 15

| JUDGMENT TYPE | USED DICTIONARY |
|---|---|
| D JUDGMENT | DEFINITION EXPRESSION DICTIONARY |
| N JUDGMENT | NEGATIVE EXPRESSION DICTIONARY |
| ⋮ | ⋮ |

FIG. 18

| | | TOPIC TITLE (SECOND MOPHEME INFORMATION) | | | |
|---|---|---|---|---|---|
| | | FIRST SPECIFYING INFORMATION (1001) | SECOND SPECIFYING INFORMATION (1002) | THIRD SPECIFYING INFORMATION (1003) | |
| $1810D_1$ | TOPIC SPECIFYING INFORMATION ("SEVEN SAMURAI") | SEVEN SAMURAI | * | * | $1820_1$ |
| | | SEVEN SAMURAI | * | INTERESTING | $1820_2$ |
| | | ⋮ | ⋮ | ⋮ | |
| $1810D_2$ | TOPIC SPECIFYING INFORMATION ("RAN") | RAN | * | * | $1820_3$ |
| | | RAN | * | INTERESTING | $1820_4$ |
| | | ⋮ | ⋮ | ⋮ | |
| $1810D_3$ | TOPIC SPECIFYING INFORMATION ("YOJINBO") | YOJINBO | * | * | $1820_5$ |
| | | YOJINBO | * | INTERESTING | $1820_6$ |
| | | ⋮ | ⋮ | ⋮ | |

FIG. 19

| TYPE | CONTENT |
|---|---|
| D | DECLARATION |
| T | DECLARATION SENTENCE IS A SENTENCE COMPOSED OF A TIME CONCEPT SUCH AS "WHEN" |
| L | DECLARATION SENTENCE IS A SENTENCE COMPOSED OF A LOCATIONAL CONCEPT SUCH AS "WHERE" |
| N | SENTENCE BY WHICH DECLARATION IS NEGATED |
| ⋮ | ⋮ |

FIG. 20

1810

TOPIC SPECIFYING INFORMATION (HORSE)
UPPER CONCEPT TOPIC SPECIFYING INFORMATION (HORSE RACING)
LOWER CONCEPT TOPIC SPECIFYING INFORMATION (HORSE RACING TICKET)
SYNONYMS ("THOROUGHBRED," "RACING HORSE," "DEEP IMPACT")

1820 1830 1840

| TOPIC TITLE 1-1 (HORSE; *; LIKE) | REPLY SENTENCE 1-1 | REPLY TYPE | CONTENT | NEXT PLAN DESIGNATION INFORMATION |
|---|---|---|---|---|
| | | DA | "I ALSO LIKE HORSES." | ID「000010」 |
| | | TA | "I LIKE HORSES STANDING IN A PADDOCK." | ID「000011」 |
| | | ⋮ | ⋮ | ⋮ |
| TOPIC TITLE1-2 | TOPIC TITLE1-2 | ⋮ | ⋮ | ⋮ |
| ⋮ | ⋮ | ⋮ | ⋮ | ⋮ |

FIG. 32

$1701_{10}$ $1402_{10}$ $1501_{10}$ $1702_{10}$ $1502_{10}$

| | | | |
|---|---|---|---|
| "I WANT A HORSE." | "PLEASE ANSWER A SIMPLE QUESTIONNAIRE. THERE ARE FIVE QUESTIONS. PLEASE INPUT " I WILL ANSWER THE QUESTIONNAIRE " IF YOU AGREE." | 2000-01 | 2000-02 |

⇩

$1701_{11}$ $1402_{11}$ $1501_{11}$ $1702_{11}$ $1502_{11}$

| | | | |
|---|---|---|---|
| "I WILL ANSWER THE QUESTIONNAIRE." | "THANK YOU. THIS IS THE FIRST QUESTION. WOULD YOU CHOOSE TO BUY A YOUNG HORSE OR AN OLD HORSE?" | 2000-02 | 2000-03 |

⇩

$1701_{12}$ $1402_{12}$ $1501_{12}$ $1702_{12}$ $1502_{12}$

| | | | |
|---|---|---|---|
| 「*」 | "THE SECOND QUESTION. WOULD YOU PREFER A JAPANESE HORSE OR A FOREIGN HORSE?" | 2000-03 | 2000-04 |

⇩

$1701_{13}$ $1402_{13}$ $1501_{13}$ $1702_{13}$ $1502_{13}$

| | | | |
|---|---|---|---|
| 「*」 | "THE THIRD QUESTION. WHAT TYPE OF HORSE WOULD YOU LIKE? A PUREBLOOD HORSE, A THOROUGHBRED HORSE, A LIGHT TYPE OR A PONY?" | 2000-04 | 2000-05 |

⇩

$1701_{14}$ $1402_{14}$ $1501_{14}$ $1702_{14}$ $1502_{14}$

| | | | |
|---|---|---|---|
| 「*」 | "THE FOURTH QUESTION. HOW MUCH WOULD YOU LIKE TO PAY FOR IT?" | 2000-05 | 2000-06 |

⇩

$1701_{15}$ $1402_{15}$ $1501_{15}$ $1702_{15}$ $1502_{15}$

| | | | |
|---|---|---|---|
| 「*」 | "THE FIFTH QUESTION. IF YOU BOUGHT A HORSE, WHEN WOULD YOU BUY IT?" | 2000-06 | 2000-07 |

⇩

$1701_{16}$ $1402_{16}$ $1501_{16}$ $1702_{16}$ $1502_{16}$

| | | | |
|---|---|---|---|
| 「*」 | "THAT IS ALL. THANK YOU VERY MUCH." | 2000-07 | 2000-08 |

FIG. 33

| $1701_{21}$ | $1402_{21}$ / $1501_{21}$ | $1702_{21}$ | $1502_{21}$ |
|---|---|---|---|
| "I WILL ANSWER THE QUESTIONNAIRE." | "THANK YOU. THIS IS THE FIRST QUESTION. WOULD YOU CHOOSE TO BUY A YOUNG HORSE OR AN OLD HORSE?" | 2000-02 | 2000-03<br>2000-04<br>2000-05 |

| $1701_{22}$ | $1402_{22}$ / $1501_{22}$ | $1702_{22}$ | $1502_{22}$ |
|---|---|---|---|
| "A YOUNG HORSE." | THE SECOND QUESTION. WOULD YOU PREFER A JAPANESE HORSE OR A FOREIGN HORSE?" | 2000-03 | 2000-06<br>2000-07<br>2000-08 |

| $1701_{23}$ | $1402_{23}$ / $1501_{23}$ | $1702_{23}$ | $1502_{23}$ |
|---|---|---|---|
| "AN OLD HORSE." | "THE SECOND QUESTION. WOULD YOU PREFER A JAPANESE HORSE OR A FOREIGN HORSE?" | 2000-04 | 2000-06<br>2000-07<br>2000-08 |

| $1701_{24}$ | $1402_{24}$ / $1501_{24}$ | $1702_{24}$ | $1502_{24}$ |
|---|---|---|---|
| NEITHER "A YOUNG HORSE" NOR "AN OLD HORSE." | "FOR NOW, PLEASE ANSWER THE FIRST QUESTION. WOULD YOU CHOOSE A YOUNG HORSE OR AN OLD HORSE IF YOU BUY?" | 2000-05 | 2000-03<br>2000-04<br>2000-05 |

| $1701_{25}$ | $1402_{25}$ / $1501_{25}$ | $1702_{25}$ | $1502_{25}$ |
|---|---|---|---|
| "A JAPANESE HORSE." | "THE THIRD QUESTION. WHAT TYPE OF HORSE WOULD YOU LIKE? A PUREBLOOD HORSE, A THOROUGHBRED HORSE, A LIGHT TYPE OR A PONY?" | 2000-06 | 2000-09<br>2000-10<br>2000-11 |

| $1701_{26}$ | $1402_{26}$ / $1501_{26}$ | $1702_{26}$ | $1502_{26}$ |
|---|---|---|---|
| "A FOREIGN HORSE." | "THE THIRD QUESTION. WHAT TYPE OF HORSE WOULD YOU LIKE? A PUREBLOOD HORSE, A THOROUGHBRED HORSE, A LIGHT TYPE OR A PONY?" | 2000-07 | 2000-09<br>2000-10<br>2000-11 |

| $1701_{27}$ | $1402_{27}$ / $1501_{27}$ | $1702_{27}$ | $1502_{27}$ |
|---|---|---|---|
| "NEITHER A JAPANESE HORSE NOR A FOREIGN HORSE." | "FOR NOW, PLEASE ANSWER THE SECOND QUESTION. WOULD YOU PREFER A JAPANESE HORSE OR A FOREIGN HORSE?" | 2000-08 | 2000-06<br>2000-07<br>2000-08 |

FIG. 37A

ACTION WORD DICTIONARY

| ENGLISH | FRENCH |
|---|---|
| Reduce | abaisser, minorer, réduire, amenuiser, s'abaisser, s'amoindrir, diminuer |
| Indicate | indiquer, représenter, signaler, déterminer, designer, montrer |

FIG. 37B

CONCEPTUAL WORD DICTIONARY

| ENGLISH | FRENCH |
|---|---|
| data processing | informatique |
| pneumatic tyre | chambre à air |
| cholesterol | cholestérol |
| cable car | funiculaire |

MULTIPLAYER GAMING MACHINE CAPABLE OF CHANGING VOICE PATTERN

CROSS REFERENCE TO RELATED APPLICATIONS

This application claims benefit of U.S. Provisional Application No. 61/028,773, filed Feb. 14, 2008, the entire contents of which are incorporated herein by reference.

BACKGROUND OF THE INVENTION

1. Field of the Invention

The present invention relates to a multiplayer participation type gaming system that can change voice patterns outputted from a gaming machine.

2. Related Art

Commercial multiplayer participation type gaming machines through which a large number of players participate in games, so-called mass-game machines, have conventionally been known. In recent years, horse racing game machines have been known. These mass-game machines include, for example, a gaming machine body provided with a large main display unit, and a plurality of terminal devices, each having a sub display unit, mounted on the gaming machine body (for example, refer to U.S. Patent Application Publication No. 2007/0123354).

The plurality of terminal devices is arranged facing the main display unit on a play area of rectangular configuration when viewed from above, and passages are formed among these terminal devices. Each of these terminal devices is provided with a seat on which a player can sit, and the above-mentioned sub display unit is arranged ahead of the seat or laterally obliquely ahead of the seat so that the player can view the sub display unit. This enables the player sitting on the seat to view the sub display unit, while viewing the main display unit placed ahead of the seat.

On the other hand, dialogue controllers configured to speak in response to the user's speech, and control the dialogue with the user, have been disclosed in U.S. Patent Application Publications Nos. 2007/0094004, 2007/0094005, 2007/0094006, 2007/0094007 and 2007/0094008. It can be considered that when this type of dialogue controller is mounted on the mass-game machine, the player can interactively participate in a game, further enhancing the player's enthusiasm.

U.S. Patent Application Publication No. 2007/0033040 discloses a system and method of identifying the language of an information source and extracting the information contained in the information source. Equipping the above system on the mass-game machine enables handling of multi-language dialogues. This makes it possible for the players of different countries to participate in games, further enhancing the enthusiasm of the players.

However, the dialogue controller generally outputs reply sentences with a fixed voice pattern. Thus, when such a dialogue controller is mounted on the mass-game machine to have a conversation in response to a user's speech, if the voice pattern of the dialogue controller is monotonous, it is possible to weaken the enthusiasm of players.

It is, therefore, desirable to provide a commercial multiplayer participation type gaming machine that further enhancing the enthusiasm of players by mounting a dialogue controller on a mass-game machine to change voice patterns according to a player's status.

SUMMARY OF THE INVENTION

In accordance with a first aspect of the present invention, there is provided a gaming machine disposed on a predetermined play area, comprising: a memory for storing play history data generated according to a game result of a player, a plurality of voice generation original data for generating a predetermined voice message, and a predetermined threshold value data in relation to the play history data; a speaker for outputting a voice message; a microphone for collecting a voice generated by a player; a dialogue voice database for identifying a type of voice based on player's voices; and a controller programmed to carry out the following processing of: (a) executing a game and paying out a predetermined amount of credits according to a game result; (b) generating voice data based on a player's voice collected by the microphone; (c) identifying a voice pattern corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern.

According to the first aspect of the present invention, the gaming machine carries out the following processing of: (a) executing a game and paying out a predetermined amount of credits according to a game result; (b) generating voice data based on a player's voice collected by the microphone; (c) identifying a voice pattern corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern. Generally, voices generated by machines tend to be monotonous, which is possible to weaken the enthusiasm of players. The gaming machine thus constructed is configured to change the way of outputting voice messages using various voice patterns so as to avoid the voice messages outputted from the speaker being monotonous, thereby enhancing the enthusiasm of players.

In accordance with a second aspect of the present invention, a gaming machine, in addition to the feature according to the first aspect, may further comprise an input section for receiving a voice input instruction, and the controller may carry out the processing of, when the voice input instruction is received by the input section, collecting player's voices in the processing (b).

According to the second aspect of the present invention, the gaming machine, in addition to the feature according to the first aspect, may further comprise an input section for receiving a voice input instruction, and the controller may carry out the processing of, when the voice input instruction is received by the input section, collecting player's voices in the processing (b), thereby enabling to collect the player's voices at a timing determined by the player, for example, in a condition with little background noise.

In accordance with a third aspect of the present invention, a gaming machine, in addition to the feature according to the first aspect, may further comprise a voice pattern specifying device for specifying a voice pattern, and the controller, in the processing (c), carries out the processing of identifying the voice pattern specified by the voice pattern specifying device as a voice pattern corresponding to the voice data.

According to the third aspect of the present invention, the gaming machine, in addition to the feature according to the first aspect, may further comprise a voice pattern specifying device for specifying a voice pattern, and the controller, in the processing (c), carries out the processing of identifying the voice pattern specified by the voice pattern specifying device as a voice pattern corresponding to the voice data, thereby enabling the player to specify the desired voice pattern In accordance with a fourth aspect of the present invention, in a gaming machine, in addition to the feature according to the first aspect, the controller, in the processing (f), carries out the processing of changing the voice pattern in view of the play history data thus updated.

According to the fourth aspect of the present invention, in the gaming machine, in addition to the feature according to the first aspect, the controller, in the processing (f), carries out the processing of changing the voice pattern in view of the play history data thus updated, thereby enabling, even when the player has designated a desired voice pattern, to additionally designate various voice patterns such as a voice pattern with intonations, which can make the conversations more fun.

In accordance with a fifth aspect of the present invention, a gaming machine, in addition to the feature according to the first aspect, the voice pattern may include at least one of a man's voice pattern, a woman's voice pattern, a dialect pattern, a suppressed voice pattern, and an elevated voice pattern.

According to the fifth aspect of the present invention, in the gaming machine, in addition to the feature according to the first aspect, the voice pattern may include at least one of a man's voice pattern, a woman's voice pattern, a dialect pattern, a suppressed voice pattern, and an elevated voice pattern, thereby making the conversations assisted by the gaming machine more fun.

In accordance with a sixth aspect of the present invention, a gaming machine, in addition to the feature according to the first aspect, wherein the controller further carries out the following processing of: (h) setting a language type; and (i) outputting voices from the speaker based on the language type thus set, and the play history data and the voice generation original data stored in the memory.

According to the sixth aspect of the present invention, in the gaming machine, in addition to the feature according to the first aspect, the controller further carries out the following processing of: setting a language type; and outputting voices from the speaker based on the language type thus set, and the play history data and the voice generation original data stored in the memory, thereby enabling to handle various languages. This makes it possible for the players of different countries to participate in games, further enhancing the enthusiasm of the players.

In accordance with a seventh aspect of the present invention, there is provided a gaming machine disposed on a predetermined play area, comprising: a memory for storing play history data generated according to a game result of a player, a plurality of voice generation original data for generating a predetermined voice message, and a predetermined threshold value data in relation to the play history data; a speaker for outputting a voice message; a microphone for collecting a voice generated by a player; an input section for receiving a voice input instruction; a dialogue voice database for identifying a type of voice based on player's voices; and a controller programmed to carry out the following processing of: (a) executing a game and paying out a predetermined amount of credits according to a game result; (b) generating voice data based on a player's voice collected by the microphone when the voice input instruction is received by the input section; (c) identifying a voice pattern corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern.

According to the seventh aspect of the present invention, the gaming machine carries out the following processing of: (a) executing a game and paying out a predetermined amount of credits according to a game result; (b) generating voice data based on a player's voice collected by the microphone when the voice input instruction is received by the input section; (c) identifying a voice pattern corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern. Generally, voices generated by machines tend to be monotonous, which is possible to weaken the enthusiasm of players. The gaming machine thus constructed is configured to change the way of outputting voice messages using various voice patterns so as to avoid the voice messages outputted from the speaker being monotonous, thereby enhancing the enthusiasm of players.

In accordance with an eighth aspect of the present invention, there is provided a gaming machine disposed on a predetermined play area, comprising: a memory for storing play history data generated according to a game result of a player, a plurality of voice generation original data for generating a predetermined voice message, and a predetermined threshold value data in relation to the play history data; a speaker for outputting a voice message; a microphone for collecting a voice generated by a player; an input section for receiving a voice input instruction; a dialogue voice database for identifying a type of voice based on player's voices; and a controller programmed to carry out the following processing of: (a) executing a game and paying out a predetermined amount of credits according to a game result; (b) generating voice data based on a player's voice collected by the microphone when the voice input instruction is received by the input section; (c) identifying a voice pattern including at least one of a man's voice pattern, a woman's voice pattern, a dialect pattern, a suppressed voice pattern, and an elevated voice pattern, corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; (g) outputting voices from the speaker based on the voice data generated in the processing (f) with the voice pattern.

According to the eighth aspect of the present invention, the gaming machine carries out the following processing of: (a) executing a game and paying out a predetermined amount of credits according to a game result; (b) generating voice data based on a player's voice collected by the microphone when the voice input instruction is received by the input section; (c) identifying a voice pattern including at least one of a man's voice pattern, a woman's voice pattern, a dialect pattern, a suppressed voice pattern, and an elevated voice pattern, corresponding to the voice data by retrieving the dialogue voice database and identifying a type of voice corresponding to the voice data, so as to store the voice data along with the voice pattern into the memory; (d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation; (e) comparing, upon updating the play history data stored in the memory, the play history data thus updated and stored in the memory with a predetermined threshold value data; (f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern. Generally, voices generated by machines tend to be monotonous, which is possible to weaken the enthusiasm of players. The gaming machine thus constructed is configured to change the way of outputting voice messages using various voice patterns so as to avoid the voice messages outputted from the speaker being monotonous, thereby enhancing the enthusiasm of players.

BRIEF DESCRIPTION OF THE DRAWINGS

FIG. 13 is a diagram showing the relation between a character string and morphemes extracted from the character string;

FIG. 14 is a diagram showing "speech sentence types," two-alphabet combinations indicating these speech sentence types, and examples of speech sentence corresponding to these speech sentence types, respectively;

FIG. 15 is a diagram showing the relationship between sentence type and a dictionary for judging the type thereof;

FIG. 18 is a diagram showing an example of the data configuration of topic titles (also referred to as "second morpheme information");

FIG. 19 is a diagram illustrating an example of the data configuration of reply sentences;

FIG. 20 is a diagram showing specific examples of topic titles corresponding to certain topic specifying information, reply sentences and next plan designation information;

FIG. 32 is a diagram showing a specific example of plan dialogue processing in a second type of dialogue control circuit;

FIG. 33 is a diagram showing another example of the plan of the type called forced scenario;

FIG. 37A is a diagram showing a portion of a bilingual dictionary of structural words;

FIG. 37B is a diagram showing a portion of a bilingual dictionary of concepts/objects;

DETAILED DESCRIPTION OF THE INVENTION

Figure 1:
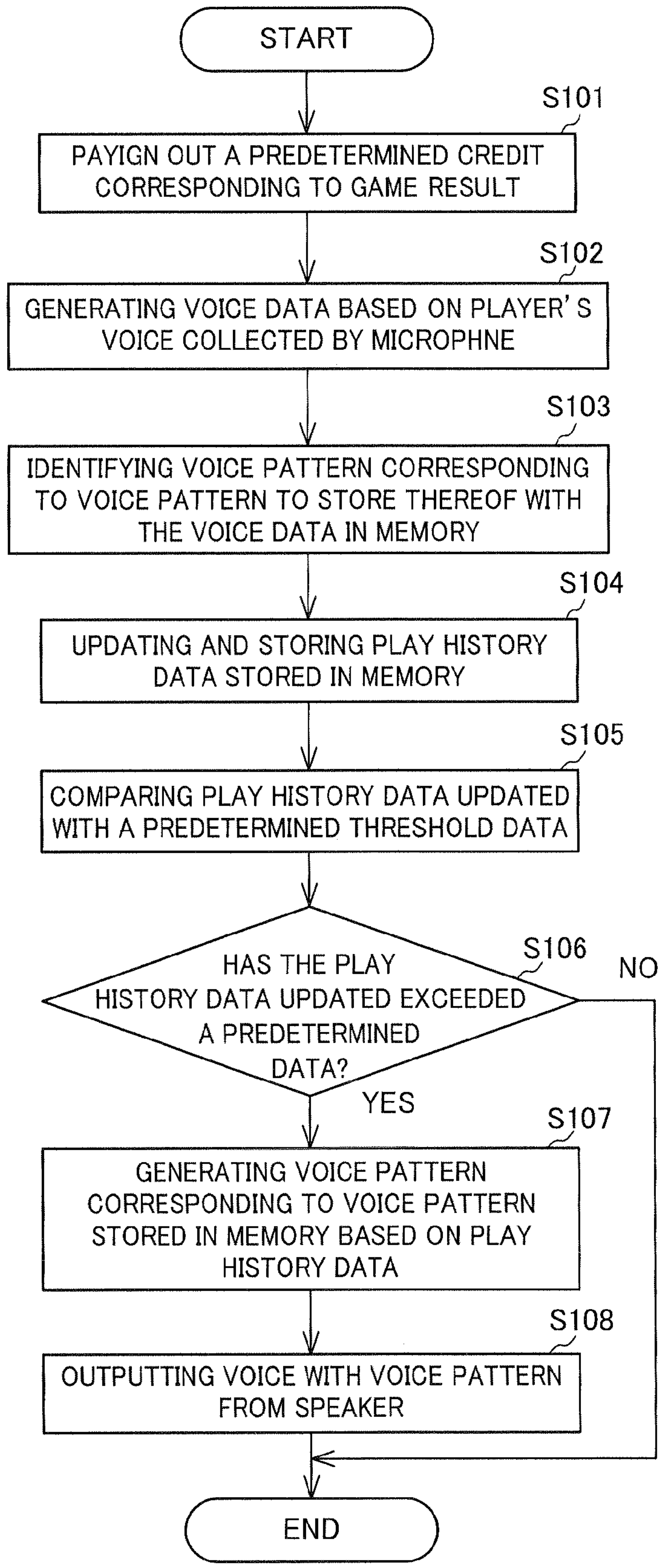
FIG. 1 is a flowchart showing a principal part of the present invention.

The principal part of the invention is now described. A gaming machine 30 according to the present invention, disposed on a predetermined play area 40 (see FIG. 5), includes a memory 80 for storing play history data generated according to a game result of a player, a plurality of voice generation original data for generating a predetermined voice message, and a predetermined threshold value data in relation to the play history data, a speaker 50 for outputting a voice message, a microphone 60 for receiving a voice generated by a player, a dialogue voice database 1500, 1700 for identifying a type of voice based on player's voices (see FIG. 8), and a controller 235 (see FIG. 7).

An embodiment of the present invention is described below with reference to the accompanying drawings. FIG. 1 is a flowchart showing a principal part of the embodiment;

As shown in FIG. 1, in Step S101, a predetermined amount of credits is paid out according to a game result. In Step S102, voice data is generated based on a player's voice received by the microphone 60. In Step S103, a voice pattern corresponding to the voice data is identified so as to store it as well as the voice data in the memory 80. More specifically, a dialogue voice database is retrieved and the type of voice corresponding to the voice data is identified, so that the voice pattern corresponding to the voice data is identified so as to store it as well as the voice data in the memory 80. In Step S104, play history data stored in the memory 232 is updated to be stored. More specifically, at least one of the input credit amount, the accumulated input credit amount, the payout amount, the accumulated payout amount, the accumulated play time, and the accumulated number of times played, is calculated according to a game result of a player, and the play history data is updated to be stored in a memory using the calculated result. In Step S105, the play history data updated is compared with a predetermined threshold value data. More specifically, according to updating of the play history data stored in the memory 232, the play history data thus updated is compared with a predetermined threshold value data. As a result of this processing, in Step S106, it is determined whether the play history data updated exceeds a predetermined threshold data. In a case in which the play history data updated exceeds a predetermined threshold value data, the processing proceeds to Step S107. In Step S107, voice data according to a voice pattern stored in the memory 80 is generated based on the play history data. In Step S108, based on the voice data thus generated, voices with the voice pattern is outputted from the speaker 50.

With the abovementioned processing, the gaming machine 30 of the present invention enhances the enthusiasm of players by mounting a dialogue controller, and also further enhances the enthusiasm of players with a configuration that the way of outputting voice messages can be changed using various voice patterns according to players so as to avoid the voice messages outputted from the speaker being monotonous.

Embodiments of the invention are described below in detail with reference to the accompanying drawings.

First Embodiment

Figure 2:
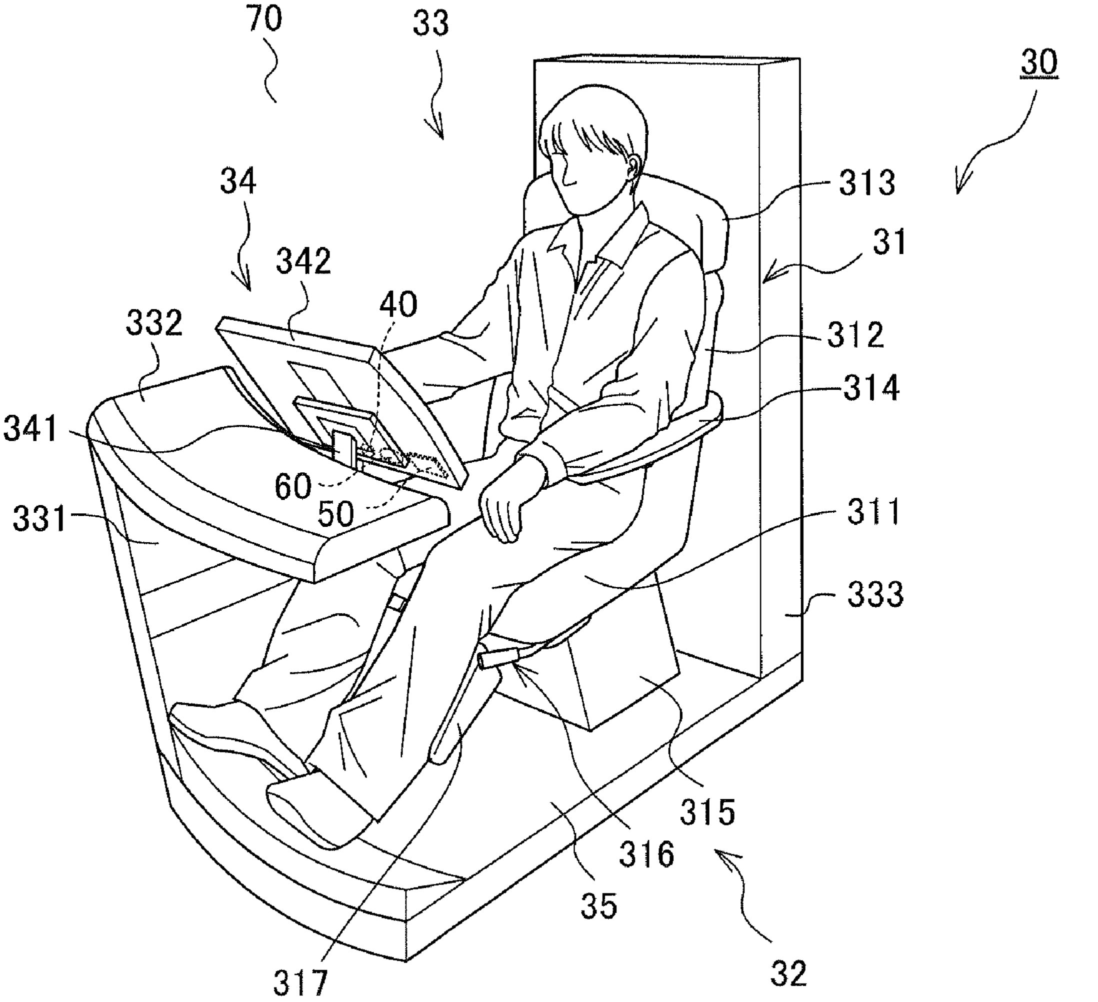
FIG. 2 is a perspective view of a gaming machine according to a first embodiment of the present invention.
Figure 3A:
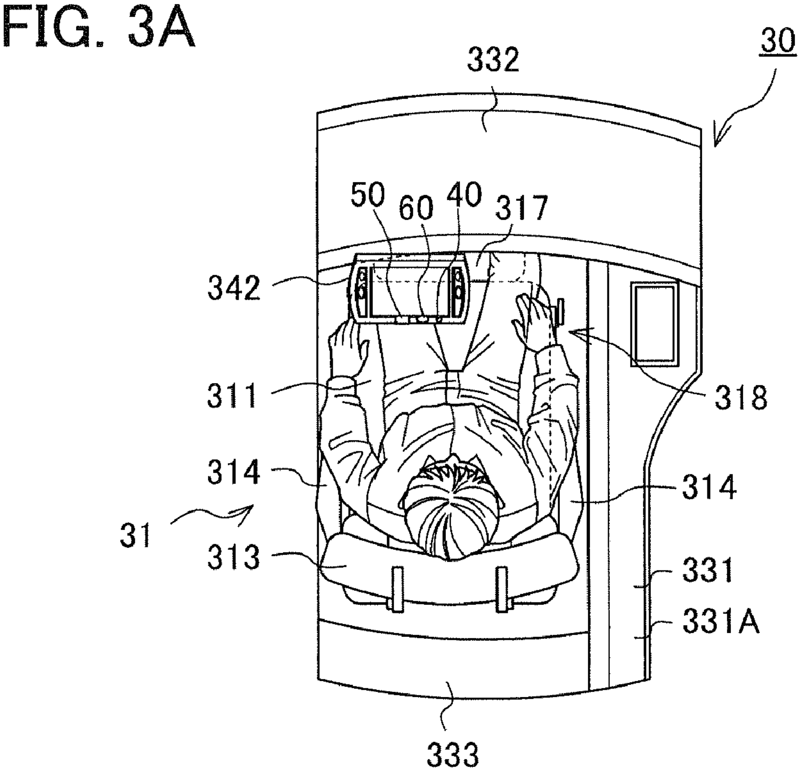
FIG. 3A is a top view of the gaming machine of FIG. 1.
Figure 3B:
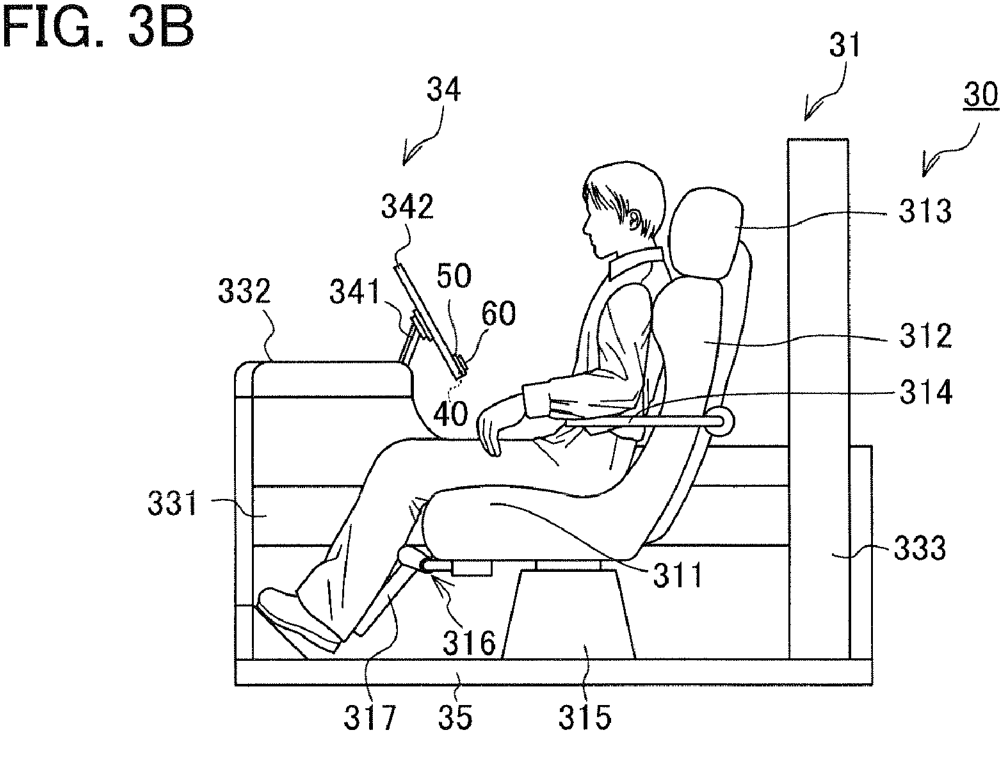
FIG. 3B is a side view of the gaming machine of FIG. 1.
Figure 4A:
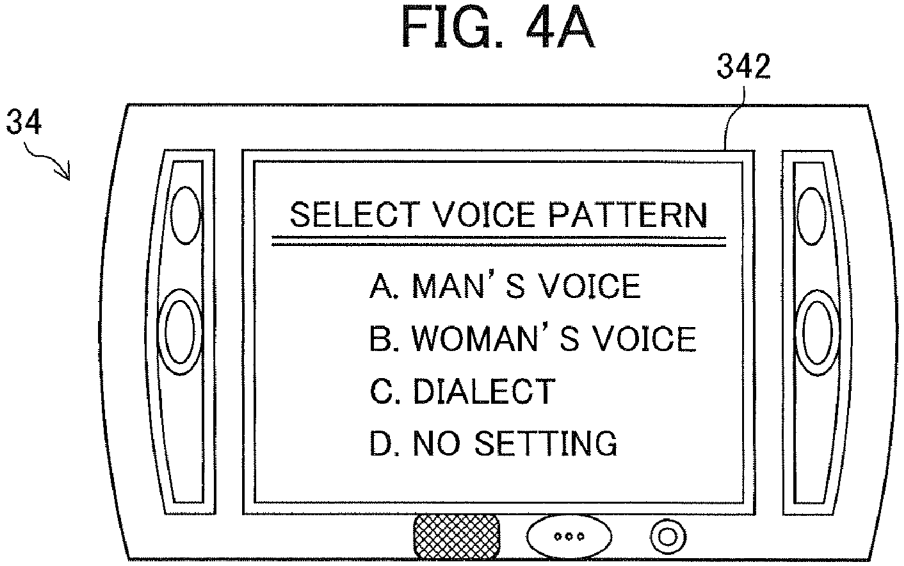
FIG. 4A shows selection processing of voice patterns.
Figure 4B:
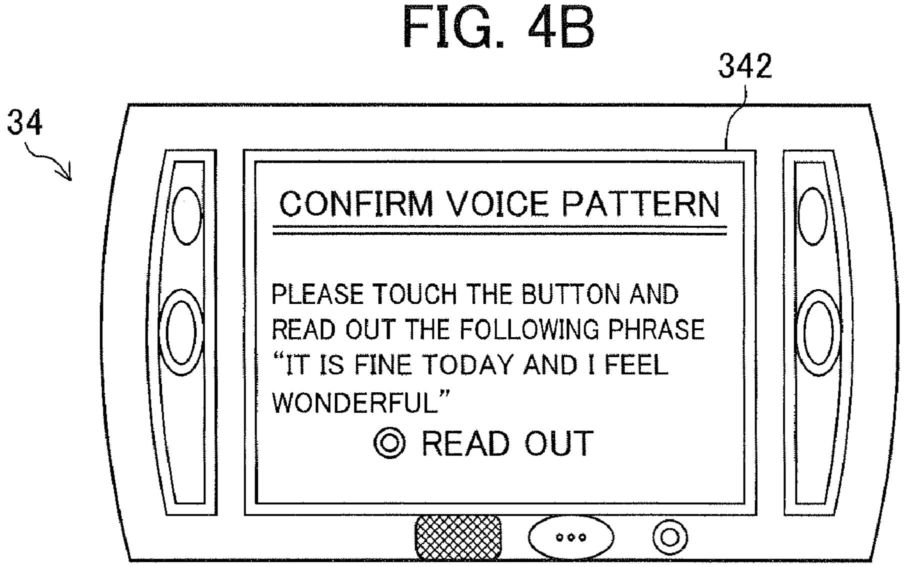
FIG. 4B shows identification processing of voice patterns.

A description is given regarding the gaming machine 30 according to an embodiment of the present invention with reference to FIGS. 2 to 4B. FIG. 2 is a perspective view showing the external appearance of the gaming machine 30. FIG. 3A is a top view showing the external appearance of the gaming machine 30, and FIG. 3B is a side view showing the external appearance of the gaming machine 30. FIGS. 4A and 4B illustrate general descriptions of selection processing of a voice pattern of voice messages outputted from the gaming machine 30 and identification processing for the voice patterns, executed by a voice pattern setting circuit 70, which is described later.

The gaming machine 30 has a seat 31 on which a player can sit, an opening portion 32 formed on one of four circumferential sides of the gaming machine 30, a seat surrounding portion 33 surrounding the three sides except for the side having the opening portion 32, and a sub display unit 34 to display game images, disposed ahead of the gaming machine 30 in the seat surrounding portion 33. The sub display unit 34 has a sensor 40 for sensing a player's attendance, a speaker 50 for outputting a voice message with various voice patterns, and a microphone 60 for receiving the voice generated by the player. The gaming machine 30 outputs various voice messages from the speaker 50. Generally, voices generated by machines tend to be monotonous, which is possible to weaken the enthusiasm of players. The gaming machine 30 of the present embodiment is configured to change the way of outputting voice messages using various voice patterns so as to avoid the voice messages outputted from the speaker 50 being monotonous. Here, the term "voice pattern" includes information associated with frequency characteristics of a voice such as man's voice, woman's voice and the like, and information associated with way of speaking or intonation such as a dialect, suppressed voices, elevated voices, and the like.

The seat 31 defines a game play space enabling the player to play games and is disposed so as to be rotatable in the angle range from the position at which the back support 312 is located in front of the gaming machine 30 to the position at which the back support 312 is opposed to the opening portion 32.

The seat 31 has a seat portion 311 on which the player sits, the back support 312 to support the back of the player, a head rest 313 disposed on top of the back support 312, arm rests 314 disposed on both sides of the back support 312, and a leg portion 315 mounted on a base 35.

The seat 31 is rotatably supported by the leg portion 315. Specifically, a brake mechanism (not shown) to control the rotation of the seat 31 is mounted on the leg portion 315, and a rotating lever 316 is disposed on the opening portion 32 in the bottom of the seat portion 311.

In the non-operated state of the rotating lever 316, the brake mechanism firmly secures the seat 31 to the leg portion 315, preventing rotation of the seat 31. On the other hand, with the rotating lever 316 pulled upward, the firm securing of the seat 31 by the brake mechanism is released to allow the seat 31 to rotate around the leg 315. This enables the player to rotate the seat 31 by, for example, applying force through the player's leg to the base 35 in the circumferential direction around the leg 315, with the rotating lever 316 pulled upward. Here, the brake mechanism limits the rotation angle of the seat 31 to approximately 90 degrees.

A leg rest 317 capable of changing the angle with respect to the seat portion 311 is disposed ahead of the seat portion 311, and a leg lever 318 is disposed on the opposite side of the opening portion 32 among the side surfaces of the seat portion 311 (refer to FIG. 3A). In the non-operated state of the leg lever 318, the angle of the leg rest 317 with respect to the seat portion 311 can be maintained. On the other hand, with the leg lever 318 pulled upward, the player can change the angle of the lever rest 317 with respect to the seat portion 311.

The seat surrounding portion 33 has a side unit 331 disposed on a surface opposed to the surface provided with the opening portion 32 among the side surfaces of the gaming machine 30, a front unit 332 disposed ahead of the gaming machine 30, and a back unit 333 disposed behind the gaming machine 30.

The side unit 331 extends vertically upward from the base 35 and has, at a position higher than the seat portion 311 of the seat 31, a horizontal surface 331A (see FIG. 3A) substantially horizontal to the base 35. Although in the present embodiment, medals are used as a game medium, the present invention is not limited thereto, and may use, for example, coins, token, electronic money, or alternatively valuable information such as electronic credit corresponding to these. The horizontal surface 331A includes a medal insertion slot (not shown) for inserting medals corresponding to credits, and a medal payout port (not shown) for paying out medals corresponding to the credits.

The front unit 332 is a table having a flat surface substantially horizontal to the base 35, and supported on a portion of the side unit 331 which is located ahead of the gaming machine 30. The front unit 332 is disposed at such a position as to oppose to the chest of the player sitting on the seat 31, and the legs of the player sitting on the seat 31 can be held in the underlying space.

The back unit 333 is integrally formed with the side unit 331.

Thus, the seat 31 is surrounded by these three surfaces of the seat surrounding portion 33, that is, the side unit 331, the front unit 332 and the back unit 333. Therefore, the player can sit on the seat 31 and leave the seat 31 only through the region where the seat surrounding portion 33 is not formed: namely, the opening part 32.

The sub display unit 34 has a support arm 341 supported by the front unit 332, and a rectangular flat liquid crystal monitor 342 to execute liquid crystal display, mounted on the front end of the support arm 341. The liquid crystal monitor 342 is a so-called touch panel and is disposed at the position opposed to the chest of the player sitting on the seat 31.

With reference to FIG. 3A, when the liquid crystal monitor 342 is viewed from vertically above, a portion of the seat portion 311 is out of sight, hidden by the liquid crystal monitor 342.

The sub display unit 34 further includes a sensor 40, a speaker 50 and a microphone 60, each arranged at the lower portion of the liquid crystal monitor 342. The sensor 40 is configured to sense the player's head. The sensor 40 may be composed of a CCD camera and sense the player's presence by causing a controller described later to perform pattern recognition of the image captured. The speaker 50 is configured to output a message to a player. The microphone 60 collects sounds generated by the player, and converts the sounds to electric signals.

With reference to FIGS. 4A and 4B, general descriptions are made regarding selection processing of a voice pattern and identification processing of the voice pattern, executed by a voice pattern selection unit.

Firstly, with reference to FIG. 4A, a description is made regarding selection processing of a voice pattern for selecting a voice pattern of a voice message outputted from the speaker 50. When the sensor 40 senses a player's presence, the gaming machine 30 executes an initial setting before starting a game. Upon the initial setting, a screen shown in FIG. 4A is displayed on a liquid crystal monitor 342. A player can select a desired voice pattern on the screen. For example, when the player want to hear a voice message with man's voice from the speaker 50, the player may select "A. man's voice". On the other hand, when the player want to hear the voice message with woman's voice, the player may select "B. woman's voice". In addition, when the player want to hear a voice message with a dialect, the player may select "C. dialect". Although three voice patterns are displayed to be selectable to the player in FIG. 4A, the present invention is not limited thereto. If necessary, a display screen of the liquid crystal monitor 342 may be scrolled, so that the player can select various voice patterns such as "man's voice with dialect from the Tsugaru area". Moreover, when the player selects "D. no setting", the gaming machine 30 may be configured to output a voice message from the speaker 50 with a predetermined voice pattern. Alternatively, the gaming machine 30 may be configured to execute identification processing of voice patterns (described later) so as to identify its voice pattern, so that a voice pattern which seems to fit well with the player may be selected.

Identification processing of voice patterns is described with reference to FIG. 4B. When identifying a voice pattern of a player, it is preferable to receive the player's voice in a condition with little background noise as much as possible. For this reason, as shown in FIG. 4B, a button may be provided, so that the player's voice used for identifying the voice pattern of the player can be received only during the player pressing the button. Moreover, a volume of the player's voice to be received is preferably one of phrases existing in the database, which has a plenty of samples, of the gaming machine 30. Thus, in the example shown in FIG. 4B, the player reads vocally the phrase "It is fine today and I feel wonderful". Then, the voice messages are received and checked on the database. If the player's voice pattern identified here is, for example, a standard language, a voice message is configured to be outputted with a standard language from the speaker 50. On the other hand, if the player's voice pattern identified is a dialect from the Osaka area, a voice message is configured to be outputted with a dialect from the Osaka area from the speaker 50. In addition, if the player's voice pattern is identified as, for example, a man's voice, a voice message may be configured to be outputted arbitrarily with a woman's voice from the speaker 50. Selection processing and identification processing for voice patterns executed in the gaming machine 30 are described later. In addition, a combination of a player's voice pattern identified and a voice pattern outputted from the speaker 50, which is executed by the gaming machine 30, may be configured to be set arbitrarily.

Although in the present embodiment, the liquid crystal monitor 342 is configured as a touch panel, the invention is not limited thereto. Instead of the touch panel, an operation unit or an input unit may be otherwise provided separately.

Generally, voices generated by machines tend to be monotonous, which is possible to weaken the enthusiasm of players. However, the gaming machine 30 of the present embodiment enhances the enthusiasm of players with a configuration that the way of outputting voice messages can be changed using various voice patterns according to players so as to avoid the voice messages outputted from the speaker being monotonous.

Figure 5:
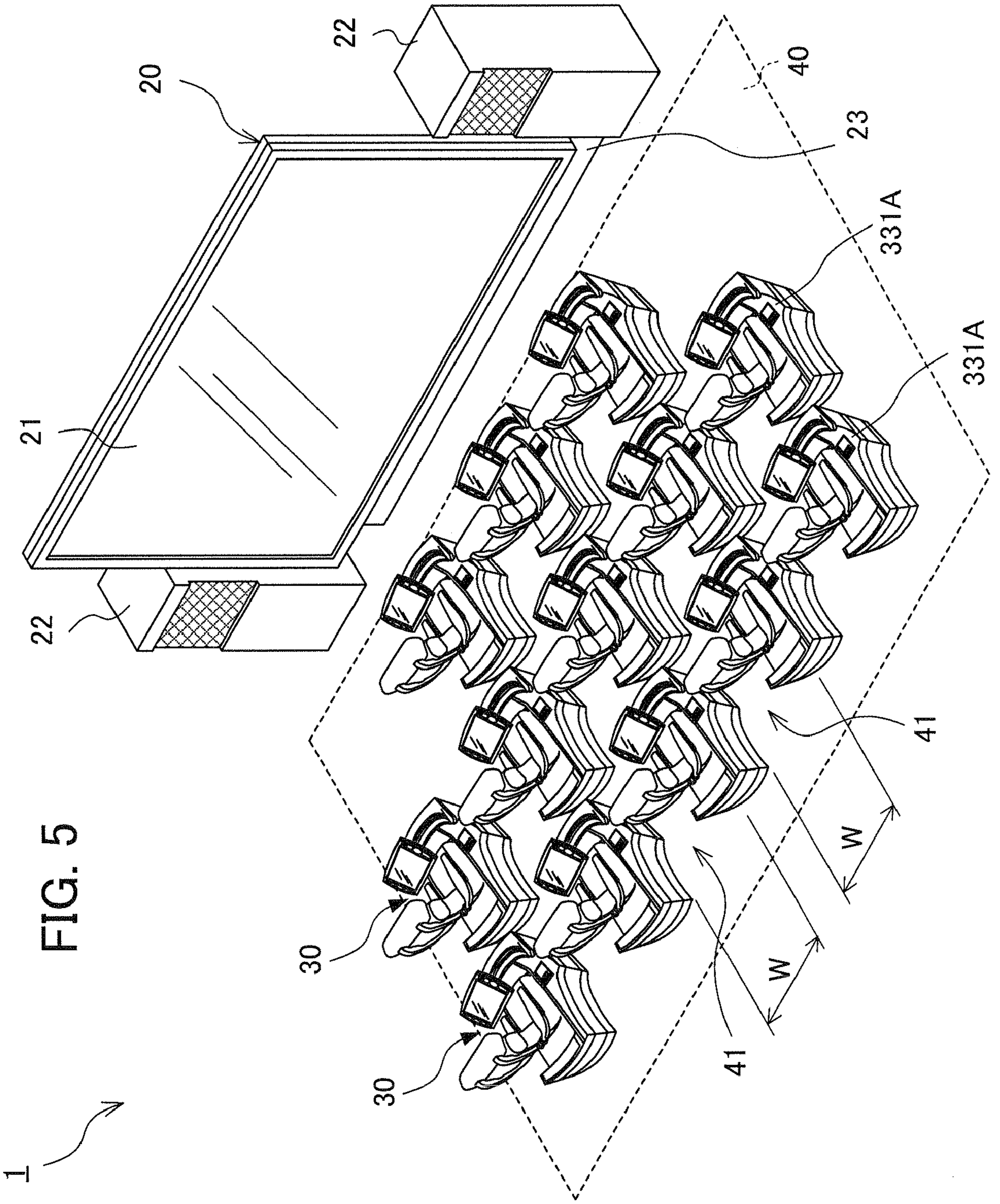
FIG. 5 is a perspective view showing an external appearance of a gaming machine according to a first embodiment of the present invention.

FIG. 5 is a perspective view showing the appearance of the multiplayer participation type gaming system 1 provided with a plurality of gaming machines 30 according to an embodiment of the present invention. The gaming system 1 is a mass-game machine to perform a multiplayer participation type horse racing game in which a large number of players participate, and is provided with a gaming system main body 20 having a large main display unit 21, in addition to a plurality of gaming machines 30A, 30B, 30C, . . . 30N. The individual gaming machines are disposed adjacent to each other with a predetermined distances W therebetween in the play area, and the adjacent gaming machines are spaced apart to provide a passage 41 in between.

The main display unit 21 is a large projector display unit. The main display unit 21 displays, for example, the image of the race of a plurality of racehorses and the image of the race result, in response to the control of the main controller 23. On the other hand, the sub display units included in the individual gaming machines 30 display, for example, the odds information of individual racehorses and the information indicating the player's own betting situation. The individual speakers output voice messages in response to the player's situation, the player's dialogue or the like. Although the present embodiment employs a large projector display unit, the present invention is not limited thereto, and any large monitor may be used.

Next, the functional configurations of the gaming system main body 20 and the gaming machines 30 are described below.

Figure 6:
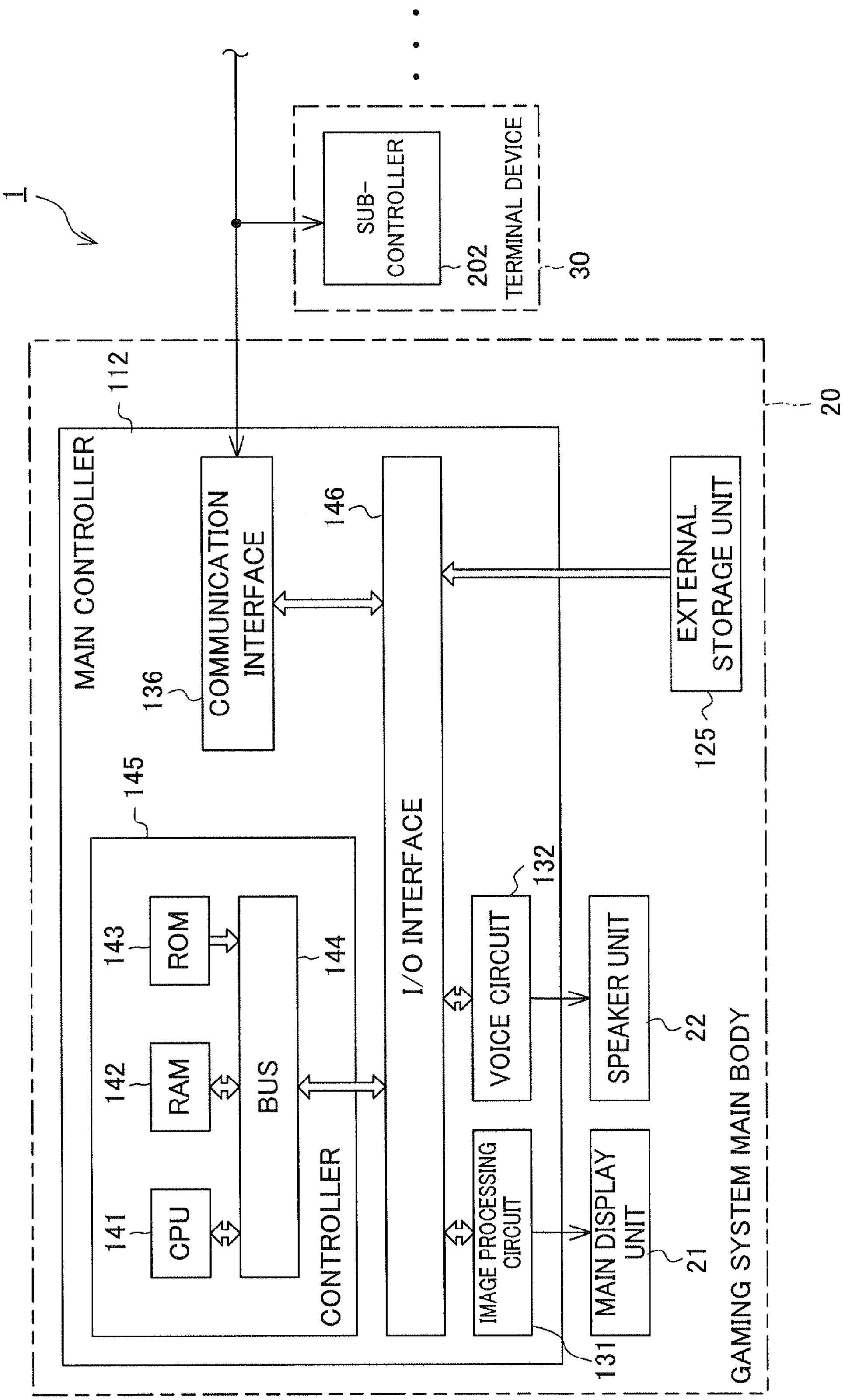
FIG. 6 is a block diagram showing a configuration of a main control unit included in a gaming system main body.

FIG. 6 is a block diagram showing the configuration of a main controller 112 included in the gaming system main body 20. The main controller 112 is built around a controller 145 as a microcomputer composed basically of a CPU 141, RAM 142, ROM 143 and a bus 144 to perform data transfer thereamong. The RAM 142 and ROM 143 are connected through the bus 144 to the CPU 141. The RAM 142 is memory to temporarily store various types of data operated by the CPU 141. The ROM 143 stores various types of programs and data tables to perform the processing necessary for controlling the gaming system 1.

An image processing circuit 131 is connected through an I/O interface 146 to the controller 145. The image processing circuit 131 is connected to the main display unit 21, and controls the drive of the main display unit 21.

The image processing circuit 131 is composed of program ROM, image ROM, an image control CPU, work RAM, a VDP (video display processor) and video RAM. The program ROM stores image control programs and various types of select tables related to the displays on the main display unit 21. The image ROM stores pixel data for forming images, such as pixel data for forming images on the main display unit 21. Based on the parameters set by the controller 145, the image control CPU determines an image displayed on the main display unit 21 out of the pixel data prestored in the image ROM, in accordance with the image control program prestored in the program ROM. The work RAM is configured as a temporary storage means used when the abovementioned image control program is executed by the image control CPU. The VDP generates image data corresponding to the display content determined by the image control CPU, and then outputs the image data to the main display unit 21. The video RAM is configured as a temporary storage means used when an image is formed by the VDP.

A voice circuit 132 is connected through an I/O interface 146 to the controller 145. A speaker unit 22 is connected to the voice circuit 132. The speaker unit 22 generates various types of sound effects and BGMs when various types of productions are produced under the control of the voice circuit 132 based on the drive signal from the CPU 141.

An external storage unit 125 is connected through the I/O interface 146 to the controller 145. The external storage unit 125 has the same function as the image ROM in the image processing circuit 131 by storing, for example, the pixel data for forming images such as the pixel data for forming images on the main display unit 21. Therefore, when determining an image to be displayed on the main display unit 21, the image control CPU in the image processing circuit 131 also takes, as a determination object, the pixel data prestored in the external storage unit 125.

A communication interface 136 is connected through an I/O interface 146 to the controller 145. Sub-controllers 235 of the individual gaming machines 30 are connected to the communication interface 136. This enables two-way communication between the CPU 141 and the individual gaming machines 30. The CPU 141 can perform, through the communication interface 136, sending/receiving instructions, sending/receiving requests and sending/receiving data with the individual gaming machines 30. Consequently, in the gaming system 1, the gaming system main body 20 cooperates with the individual gaming machines 30 to control the progress of a horse racing game.

Figure 7:
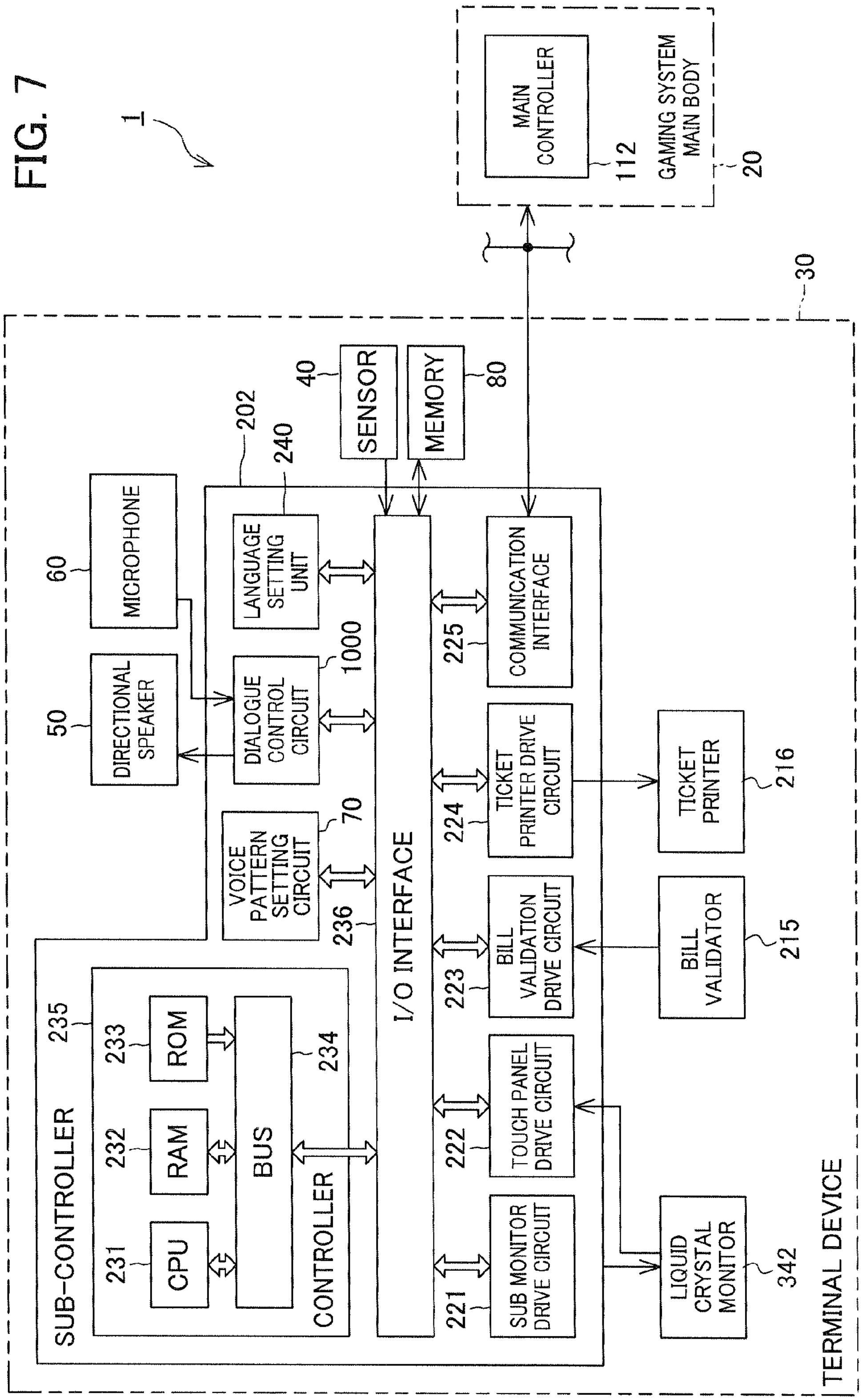
FIG. 7 is a block diagram showing a configuration of a sub-control unit included in a gaming machine.

FIG. 7 is a block diagram showing the configuration of the sub-controllers 235 included in the gaming machines 30. Each of the sub-controllers 235 is built around the controller 235 as a microcomputer composed basically of a CPU 231, RAM 232, ROM 233 and a bus 234 to perform data transfer thereamong. The RAM 232 and ROM 233 are connected through the bus 234 to the CPU 231. The RAM 232 is memory to temporarily store various types of data operated by the CPU 231. A combinations of a player's voice pattern identified and a voice pattern outputted from the speaker 50 is stored in the RAM 233. The ROM 233 stores various types of programs and data tables to perform the processing necessary for controlling the gaming system 1. In the present embodiment, the threshold value of a value calculated based on at least one of the input credit amount, the accumulated input credit amount, the payout amount, the accumulated payout amount, the payout rate corresponding to the payout amount per play, the accumulated play time and the accumulated number of times played, is stored in the ROM 233 as threshold value data.

A submonitor drive circuit 221 is connected through an I/O interface 236 to the controller 235. A liquid crystal monitor 342 is connected to the submonitor drive circuit 221. The submonitor drive circuit 221 controls the drive of the liquid crystal monitor 342 based on the drive signal from the gaming system main body 20.

A touch panel drive circuit 222 is connected through the I/O interface 236 to the controller 235. The liquid crystal monitor 342 as a touch panel is connected to the touch panel drive circuit 222. An instruction (a contact position) on the surface of the liquid crystal monitor 342 performed by the player's touch operation is inputted to the CPU 231 based on a coordinate signal from the touch panel drive circuit 222.

A bill validation drive circuit 223 is connected through the I/O interface 236 to the controller 235. A bill validator 215 is connected to the bill validation drive circuit 223. The bill validator 215 determines whether bill or a barcoded ticket is valid or not. Upon acceptance of normal bill, the bill validator 215 inputs the amount of the bill to the CPU 231, based on a determination signal from the bill validator drive circuit 223. Upon acceptance of a normal barcoded ticket, the bill validator 215 inputs the credit number and the like stored in the barcoded ticket to the CPU 231; based on a determination signal from the bill validation drive circuit 223.

A ticket printer drive circuit 224 is connected through the I/O interface 236 to the controller 235. A ticket printer 216 is connected to the ticket printer drive circuit 224. Under the output control of the ticket printer drive circuit 224 based on a drive signal outputted from the CPU 231, the ticket printer 216 outputs, as a barcoded ticket, a bar code obtained by encoding data such as the possessed number of credits stored in the RAM 232 by printing on a ticket.

A communication interface 225 is connected through the I/O interface 236 to the controller 235. A main controller 112 of the gaming system main body 20 is connected to the communication interface 225. This enables two-way communication between the CPU 231 and the main controller 112. The CPU 231 can perform, through the communication interface 225, sending/receiving instructions, sending/receiving requests and sending/receiving data with the main controller 112. Consequently, in the gaming system 1, the individual gaming machines 30 cooperates with the gaming system main body 20 to control the progress of the horse racing game.

The sensor 40, the voice pattern setting circuit 70, and the memory 80 are connected with the controller 235 via the I/O interface 146. The CPU 231 cooperates with the voice pattern setting circuit 70 to control the touch panel driving circuit 222 during an initial setting, and displays a message for allowing the player to select a voice pattern on the liquid crystal monitor 342 based on the data stored in the RAM 232. In a case in which an indication for allowing the player to select a voice pattern is displayed on the liquid crystal monitor 342 which operates as a touch panel, the CPU 231 cooperates with the voice pattern setting circuit 70 and stores the voice pattern thus selected in the RAM 232 as a voice pattern corresponding to the player. Alternatively, in a case in which an indication for allowing the player to select a voice pattern is not displayed on the liquid crystal monitor 342 which operates as a touch panel, the CPU 231 cooperates with the voice pattern setting circuit 70 to control the touch panel driving circuit 222, and displays a message for causing the player to read out a predetermined phrase based on the data stored in the RAM 232. The phrase is preferably one of phrases existing in the database, which has a plenty of samples, of the gaming machine 30.

Collation and selection of a player's voice pattern is processed as follows. When a player's voice is collected from the microphone 60, the controller 235 collates the player's voice pattern using the voice recognition unit 1200 dialogue control circuit 1000. Next, a voice pattern outputted from the speaker 50 is selected with reference to the RAM 142 based on the voice pattern thus collated. The controller 235 sets the voice pattern thus selected to the dialogue control circuit 1000. The dialogue control circuit 1000 generates a voice message outputted from the speaker 50 using the voice pattern set.

The speaker drive unit 55, a dialogue control circuit 1000, and a language setting unit 240 are connected through an I/O interface 146 to the controller 235. The dialogue control circuit 1000 is connected to the speaker 50 and the microphone 60. The speaker 50 outputs the voices generated by the dialogue control circuit 1000 to the player, and the microphone 60 receives the sounds generated by the player. The dialogue control circuit 1000 controls the dialogue with the player in accordance with the player's language type set by the language setting unit 240, and the player's play history. For example, when the player starts a game, the controller 234 may control the liquid crystal monitor 342 so as to function as a touch panel to display "Language type?" and "English, French, . . . ", and initiate the player to designate the language. In the gaming system 1, the number of at least the primary parts of the abovementioned dialogue control circuit 1000 may correspond to the number of different languages to be handled. When a certain language is thus set by the language setting unit 240, the controller 234 sets the dialogue control circuit 1000 so as to contain the primary parts corresponding to the designated language. However, when the dialogue setting circuit 1000 is configured by a third type of dialogue control circuit described later, the language setting unit 240 may be omitted.

A general configuration of the dialogue control circuit 1000 is described below in detail.

Dialogue Control Circuit

The dialogue control circuit 1000 is described with reference to FIG. 8. As the dialogue control circuit 1000, different types of dialogue control circuits can be applied. As an example thereof, the following three types of dialogue control circuits are described here.

As first and second types of dialogue control circuits applicable as the dialogue control circuit 1000, the examples of the dialogue control circuit to establish a dialogue with the player by outputting a reply to the player's speech are described based on general user cases.

A. First Type of Dialogue Control Circuit

1. Configuration Example of Dialogue Control Circuit 1.1. Overall Configuration

Figure 8:
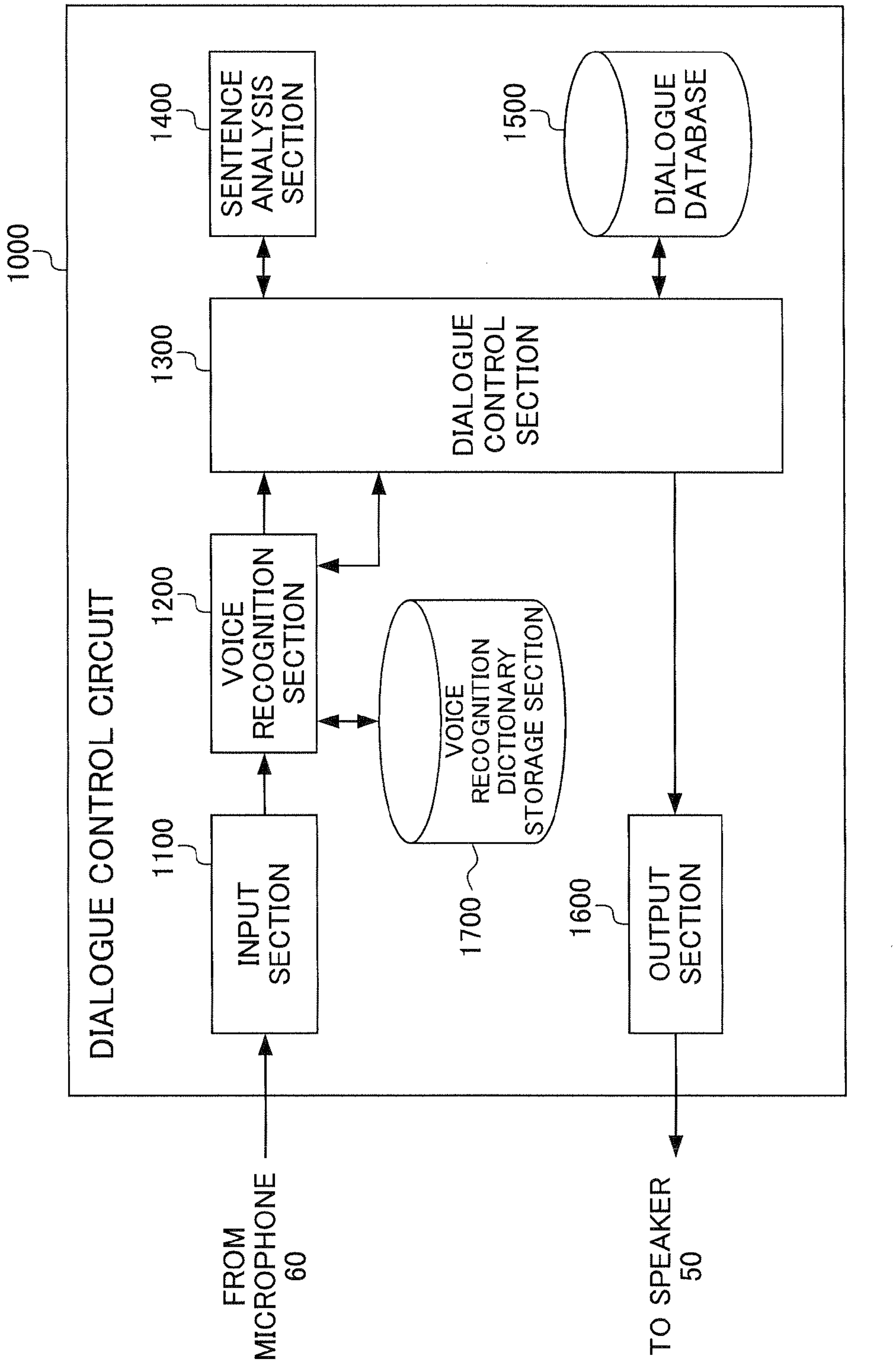
FIG. 8 is a functional block diagram showing an example of a configuration of a first type of a dialogue control circuit.

FIG. 8 is a functional block diagram showing an example of the configuration of the dialogue control circuit 1000 as a first type example.

The dialogue control circuit 1000 may include an information processing unit or hardware corresponding to the information processing unit. The information processing unit included in the dialogue control circuit 1000 is configured by a device provided with an external storage device such as a central processing unit (CPU), main memory (RAM), read only memory (ROM), an I/O device and a hard disk device. The abovementioned ROM or the external storage device stores the program for causing the information processing unit to function as the dialogue control circuit 1000, or the program for causing a computer to execute a dialogue control method. The dialogue control circuit 1000 or the dialogue processing method is realized by storing the program in the main memory, and causing the CPU to execute this program. The abovementioned program may not necessarily be stored in the storage unit included in the abovementioned device. Alternatively, the program may be provided from a computer readable program storage medium such as a magnetic disc, an optical disc, a magneto-optical disc, a CD (compact disc) or a DVD (digital video disc), or the server of an external device (e.g., an ASP (application service provider)), and the program may be stored on the main memory. Alternatively, the controller 145 itself may realize the processing executed by the dialogue control circuit 1000, or the controller 145 itself may realize a part of the processing executed by the dialogue control circuit 1000. Here, for simplicity, the configuration of the dialogue control circuit 1000 is described below as a configuration independent from the controller 145.

As shown in FIG. 8, the dialogue control circuit 1000 has an input section 1100, a voice recognition section 1200, a dialogue control section 1300, a sentence analysis section 1400, a dialogue database 1500, an output section 1600 and a voice recognition dictionary storage section 1700. The dialogue database 1500 and the voice recognition dictionary storage section 1700 constitute the voice generation original data in the present embodiment.

1.1.1. Input Section

The input section 1100 obtains input information (a user's speech) inputted by the user. The input section 1100 outputs a voice corresponding to the obtained speech content as a voice signal, to the voice recognition section 1200. The input section 1100 is not limited to one capable of handling voices, and it may be ones capable of handling character input, such as a keyboard or a touch panel. In this case, there is no need to include the voice recognition section 1200 described later. The following is a case of recognizing the user's speech received by the microphone 60.

1.1.2. Voice Recognition Section

The voice recognition section 1200 specifies a character string corresponding to the speech content, based on the speech content obtained by the input section 1100. Specifically, upon the input of the voice signal from the input section 1100, the voice recognition section 1200 collates the inputted voice signal with the dictionary stored in the voice recognition dictionary storage section 1700 and the dialogue database 1500, and then outputs a voice recognition result estimated from the voice signal. In the configuration example shown in FIG. 8, the voice recognition section 1200 sends a request to acquire the storage content of the dialogue database 1500 to the dialogue control section 1300. In response to the request, the dialogue control section 1300 acquires the obtained storage content of the dialogue database 1500. Alternatively, the voice recognition section 1200 may directly acquire the storage content of the dialogue database 1500 and compare it with voice signals.

1.1.2.1. Configuration Example of Voice Recognition Section

Figure 9:
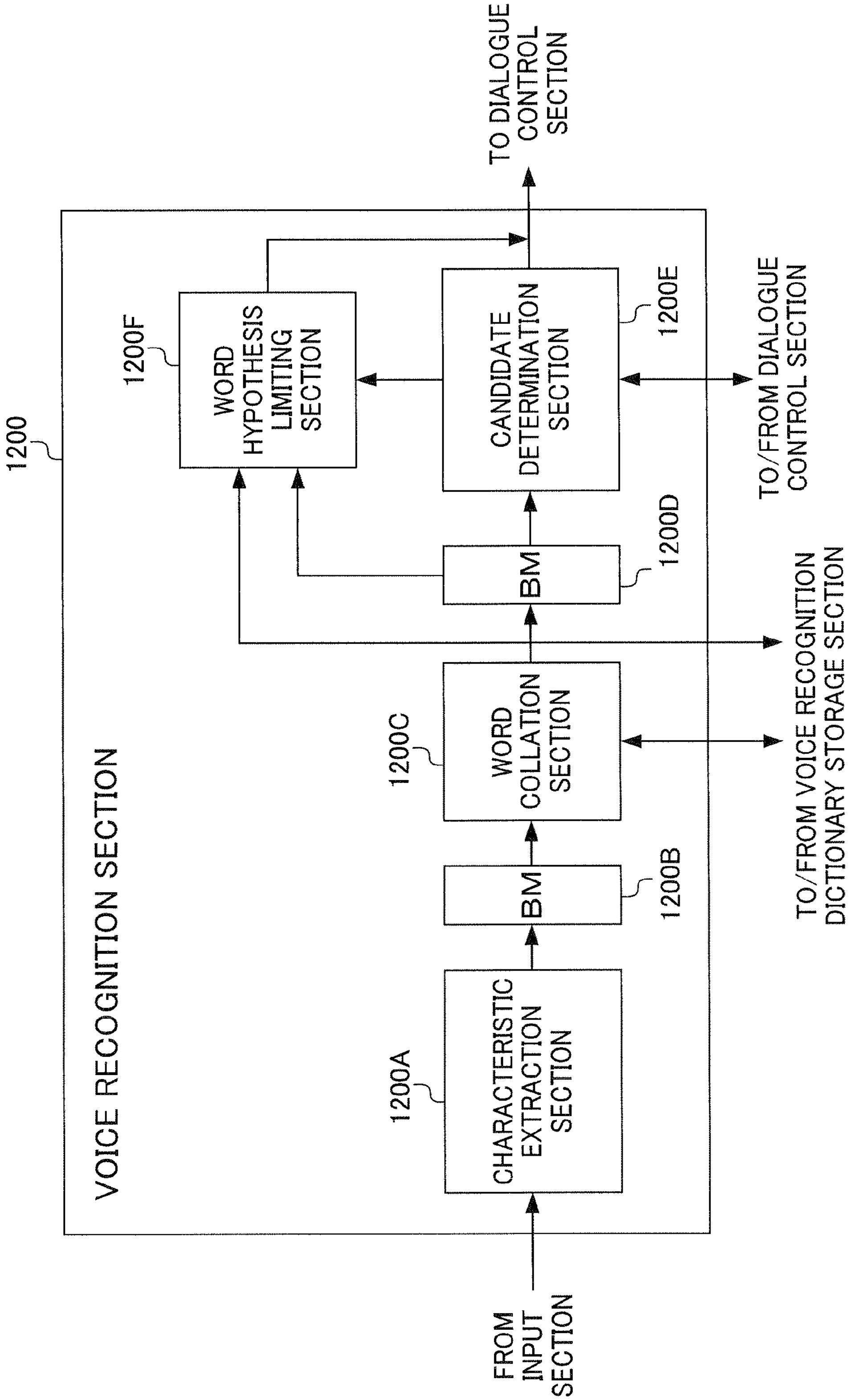
FIG. 9 is a functional block diagram showing an example of a configuration of a voice recognition unit.

FIG. 9 shows a functional block diagram showing a configuration example of the voice recognition section 1200. The voice recognition section 1200 has a character extraction section 1200A, buffer memory (BM) 1200B, a word collation section 1200C, buffer memory (BM) 1200D, a candidate determination section 1200E and a word hypothesis limiting section 1200F. The word collation section 1200C and the word hypothesis limiting section 1200F are connected to the voice recognition dictionary storage section 1700, and the candidate determination section 1200E is connected to the dialogue database 1500.

The voice recognition dictionary storage section 1700 connected to the word collation section 1200C stores a phoneme hidden Markov model (hereinafter, the hidden Markov model is referred to as "HMM"). The phoneme HMM is represented along with the following states having the following information: (a) state number, (b) receivable context class, (c) preceding state and succeeding state lists, (d) output probability density distribution parameters, and (e) self-transition probability and transition probability to a succeeding state. The phonemes HMMs used in the present embodiment are generated by converting a predetermined mixed speaker HMM, because it is necessary to establish a correspondence between individual distributions and the corresponding talker. An output probability density function is a mix Gaussian distribution having 34-dimensional diagonal variance-covariance matrices. The voice recognition dictionary storage section 1700 connected to the word collation section 1200C stores a word dictionary. The word dictionary stores symbol strings indicating pronunciation expressed by symbols for each word of the phoneme HMM.

The talker's speaking voice is inputted into the microphone, converted to voice signals, and then inputted into the characteristic extraction section 1200A. The characteristic extraction section 1200A applies A/D conversion processing to the inputted voice signals, and extracts and outputs a characteristic parameter. There are various methods of extracting and outputting the characteristic parameter. For example, in one example, LPC analysis is performed to extract 34-dimensional characteristic parameters including a logarithmic power, a 16-dimensional cepstrum coefficient, delta logarithmic power and 16-dimensional delta cepstrum coefficient. The time series of the extracted characteristic parameter is inputted through the buffer memory (BM) 1200B to the word collation section 1200C. In addition, as a parameter extracted, information related to frequencies such as pitch frequency and formant frequency is included. In the identification processing for a voice pattern, the characteristic extraction section 1200A identifies whether the voice pattern inputted represents a man's voice or a woman's voice. The identification information regarding the voice obtained here is stored in the RAM 232.

With the one-pass Viterbi decoding method, the word collation section 1200C detects a word hypothesis, and calculates and outputs the likelihood thereof by using the phonemes HMMs and the word dictionary stored in the voice recognition dictionary storage section 1700, based on the characteristic parameter data inputted through the buffer memory 1200B. The word collation section 1200C calculates, per HMM state, the likelihood within a word and the likelihood from the start of speech at each time. The likelihood differs for different identification numbers of words as likelihood calculation targets, different speech start times of the target words, and different preceding words spoken before the target words. In order to reduce the calculation processing amount, a low likelihood grid hypothesis may be eliminated from the total likelihoods calculated based on the phonemes HMMs and the word dictionary. The word collation section 1200C outputs the detected word hypothesis and the likelihood information thereof along with the time information from the speech start time (specifically, for example, the corresponding frame number) to the candidate determination section 1200E and the word hypothesis limiting section 1200F through the buffer memory 1200D. In addition, the phonemes HMMs and the word dictionary stored in the voice recognition dictionary storage section 1700 includes information related to phonemes and words for each dialect. In the identification processing for a voice pattern, a word collation section 1200C identifies dialects. The identification information of dialects obtained here is stored in the RAM 232. The dialogue database 1500 and the voice recognition dictionary storage section 1700 constitute the dialogue voice database of the present embodiment.

Referring to the dialogue control section 1300, the candidate determination section 1200E compares the detected word hypotheses and the topic specifying information within a predetermined chat space, and judges whether there is a match between the former and the latter. When a match is found, the candidate determination section 1200E outputs the matched word hypothesis as a recognition result. On the other hand, when no match is found, the candidate determination section 1200E requests the word hypothesis limiting section 1200F to perform word hypothesis limiting.

An example of operation of the candidate determination section 1200E is described below. It is assumed that the word collation section 1200C outputs a plurality of word hypotheses "kantaku," "kataku" and "kantoku" (hereinafter, italic terms are Japanese words) and their respective likelihoods (recognition rates), and a predetermined chat space is related to "cinema," and the topic specifying information contain "kantoku (director)" but contain neither "kantaku (reclamation)" nor Ivkataku (pretext). It is also assumed that "kantaku" has the highest likelihood, "kantoku" has the lowest likelihood and "kataku" has average likelihood.

Under these circumstances, the candidate determination section 1200E compares the detected word hypotheses and the topic specifying information in the predetermined chat space, and judges that the word hypothesis' "kantoku" matches with the topic specifying information in the predetermined chat space, and then outputs and transfers the word hypothesis "kantoku" as the recognition result, to the dialogue control section 1300. This processing enables the word "kantoku (director)" related to the current topic "cinema" to be preferentially selected rather than the word hypotheses "kantaku" and "kataku" having higher likelihood (recognition rate), thus enabling output of the voice recognition result corresponding to the dialogue context.

On the other hand, when no match is found, in response to the request to limit the word hypotheses from the candidate determination section 1200E, the word hypothesis limiting section 1200F operates to output a recognition result. Based on a plurality of word hypotheses outputted from the word collation section 1200C through the buffer memory 1200D, the word hypothesis limiting section 1200F refers to statistical language models stored in the voice recognition dictionary storage section 1700, and performs word hypothesis limiting with respect to the word hypothesis of identical words having the same termination time and different start times per leading phoneme environment of the word, so as to be represented by a word hypothesis having the highest likelihood among the calculated total likelihoods from the speech start time to the termination time of the word. Thereafter, the word hypothesis limiting section 1200F outputs, as a recognition result, the word string of the hypothesis having the maximum total likelihood among the word strings of all of the word hypotheses after limiting. In the present embodiment, the leading phoneme environment of a word to be processed is preferably a three-phoneme list including the final phoneme of the word hypothesis preceding the word, and the first two phonemes of the word hypothesis of the word.

Figure 10:
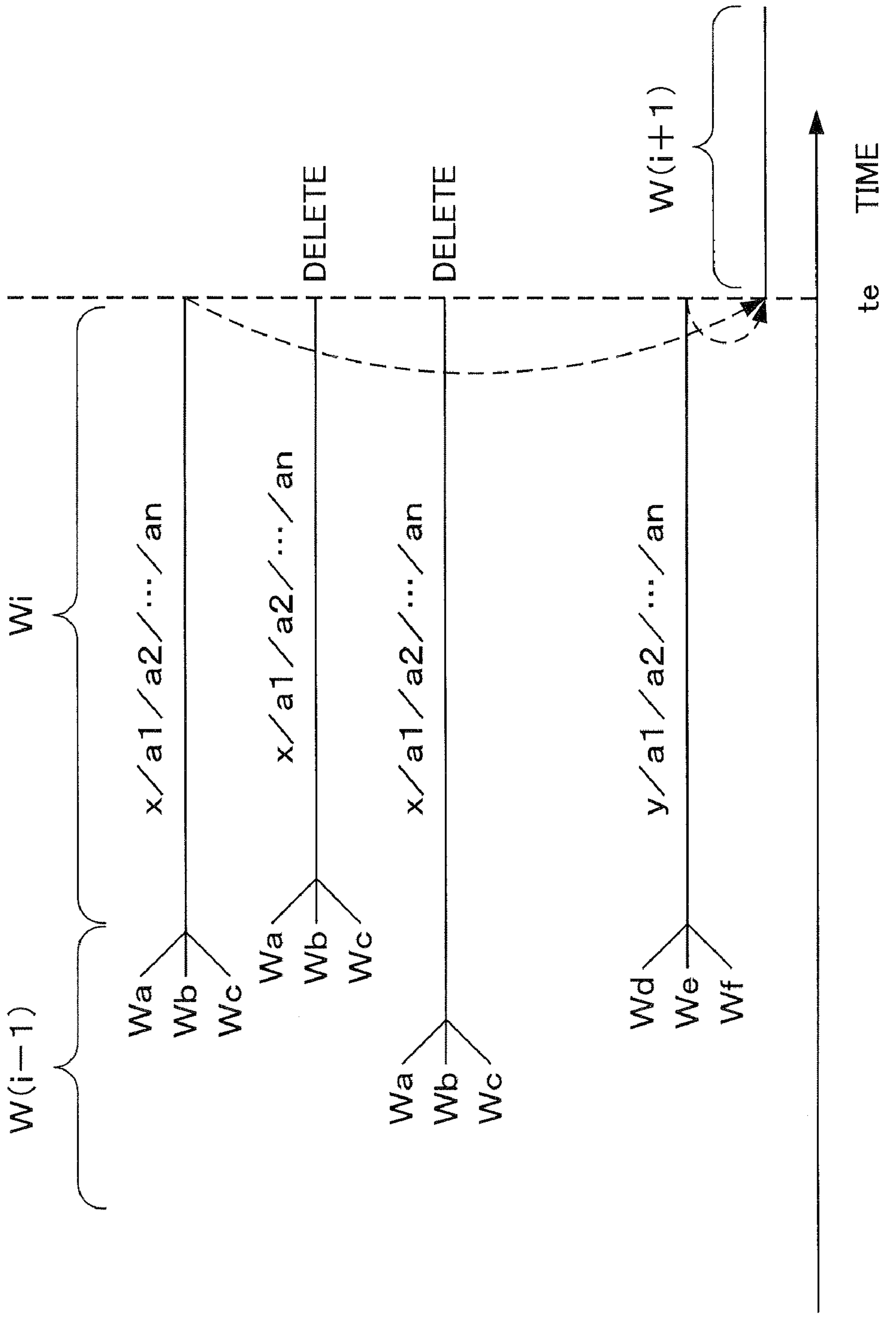
FIG. 10 is a timing chart showing an example of the processing of word hypothesis limiting unit.

An example of the word limiting processing by the word hypothesis limiting section 1200F is described by referring to FIG. 10. FIG. 10 is a timing chart showing an example of the processing of the word hypothesis limiting section 1200F.

For example, it is assumed that when the (i−1)th word Wi−1 is followed by the i-th word Wi composed of phonemes a1, a2, . . . , an, there are six hypotheses Wa, Wb, Wc, Wd, We and Wf as word hypotheses of the word Wi−1. Here, it is assumed that the final phoneme of the first three word hypotheses Wa, Wb and Wc is /x/, and the final phoneme of the second three word hypotheses Wd, We and Wf is /y/. When three hypotheses presupposing the word hypotheses Wa, Wb and Wc and a hypothesis presupposing the word hypotheses Wd, We and Wf are left at a termination time te, the highest likelihood hypothesis among the first three hypotheses identical in leading phoneme environment are left, and the rest are deleted.

The hypothesis presupposing the word hypotheses Wd, We and Wf is different from the three hypotheses in leading phoneme environment, that is, the final phoneme of the preceding word hypothesis is not x but y, and therefore the hypothesis presupposing the word hypotheses Wd, We and Wf is not deleted. In other words, only one hypothesis is left per final phoneme of the preceding word hypothesis.

In the present embodiment, the leading phoneme environment of the word is defined as a three-phoneme list including the final phoneme of the word hypothesis preceding the word, and the first two phonemes of the word hypothesis of the word. The invention is not limited thereto, and it may be a phoneme line including a phoneme string having the final phoneme of the preceding word hypothesis and having at least one phoneme of the preceding word hypothesis continuous with the final phoneme, and the first phoneme of the word hypothesis of the word. In the present embodiment, the characteristic extraction section 1200A, the word collation section 1200C, the candidate determination section 1200E and the word hypothesis limiting section 1200F are composed of a computer such as a microcomputer. The buffer memories 1200B and 1200D and the voice recognition dictionary storage section 1700 are composed of a memory device such as a hard disk memory.

Thus, in the present embodiment, the word collation section 1200C and the word hypothesis limiting section 1200F are used to perform voice recognition. The invention is not limited thereto, and it may be formed by, for example, a phoneme collation section that refers to the phonemes HMMs, and a voice recognition section that performs word voice recognition by using, for example, a one-pass DP algorithm in order to refer to the statistical language models. Although in the present embodiment, the voice recognition section 1200 is described as a part of the dialogue control circuit 1000, it is possible to construct an independent voice recognition unit formed by the voice recognition section 1200, the voice recognition dictionary storage section 1700 and the dialogue database 1500.

1.1.2.2. Operation Example of Voice Recognition Section

Figure 11:
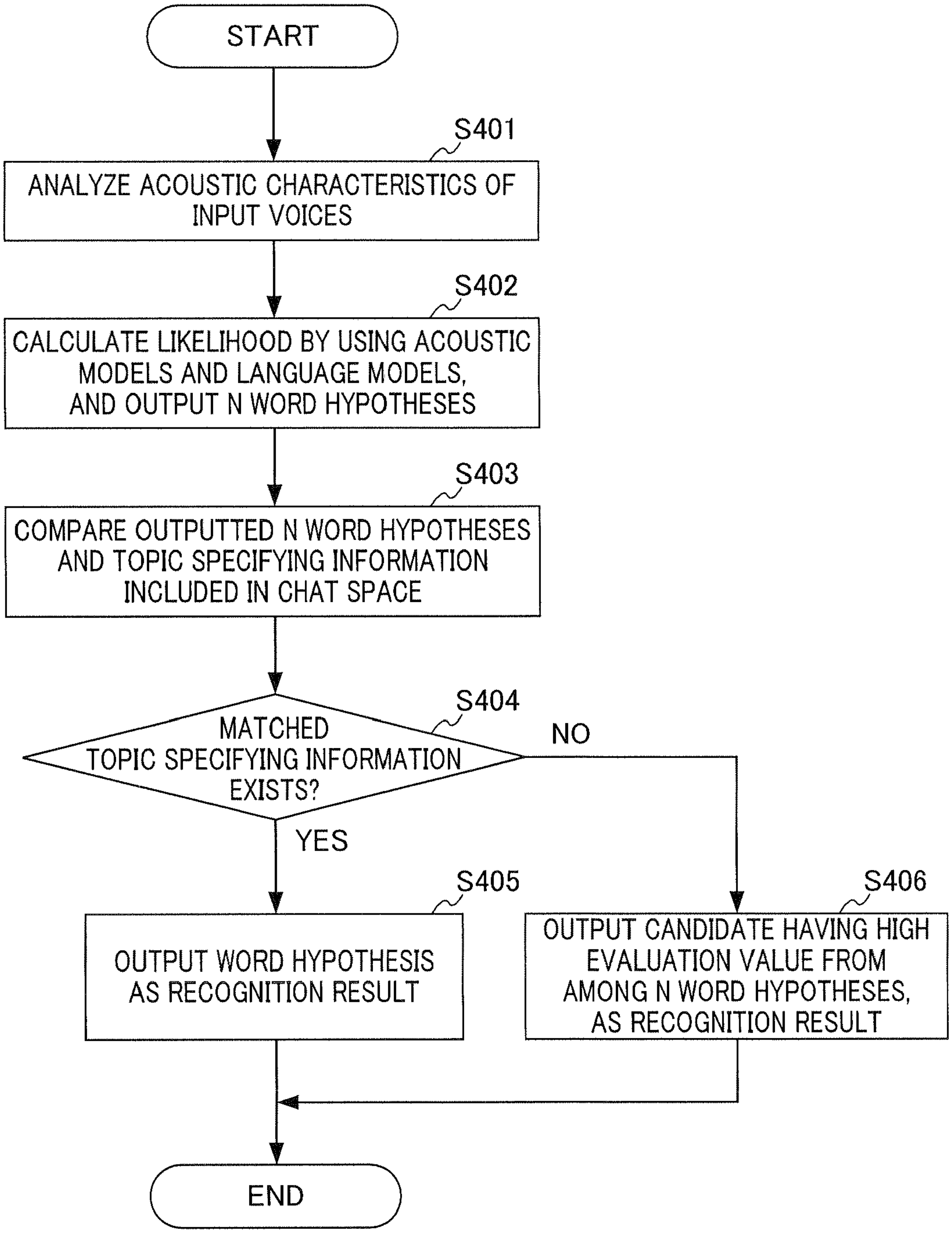
FIG. 11 is a flowchart showing an example of the operation of the voice recognition unit.

The operation of the voice recognition section 1200 is described next with reference to FIG. 11. FIG. 11 is a flow chart showing an example of operation of the voice recognition section 1200. Upon the receipt of a voice signal from the input section 1100, the voice recognition section 1200 generates a characteristic parameter by performing acoustic characteristic analysis of the inputted voice (Step S401). Then, the voice recognition section 1200 obtains a predetermined number of word hypotheses and their respective likelihoods by comparing the characteristic parameter with the phonemes HMMs and the language models stored in the voice recognition dictionary storage section 1700 (Step S402). Subsequently, the voice recognition section 1200 compares the obtained predetermined number of word hypotheses and the detected word hypotheses and the topic specifying information in a predetermined chat space, and judges whether there is a match between the detected word hypotheses and the topic specifying information in the predetermined chat space (Steps S403 and S404). When a match is found, the voice recognition section 1200 outputs the matched word hypothesis as a recognition result (Step S405). On the other hand, when no match is found, the voice recognition section 1200 outputs, as a recognition result, the word hypothesis having the highest likelihood among the likelihoods of the obtained word hypotheses (Step S406).

1.1.3. Voice Recognition Dictionary Storage Section

Returning to FIG. 8, the example of the configuration of the dialogue control section 1000 is continued. The voice recognition dictionary storage section 1700 stores character strings corresponding to standard voice signals. After the collation, the voice recognition section 1200 specifies a character string that corresponds to the word hypothesis corresponding to the voice signal, and outputs the specified character string as a character string signal, to the dialogue control section 1300.

1.1.4. Sentence Analysis Section

Figure 12:
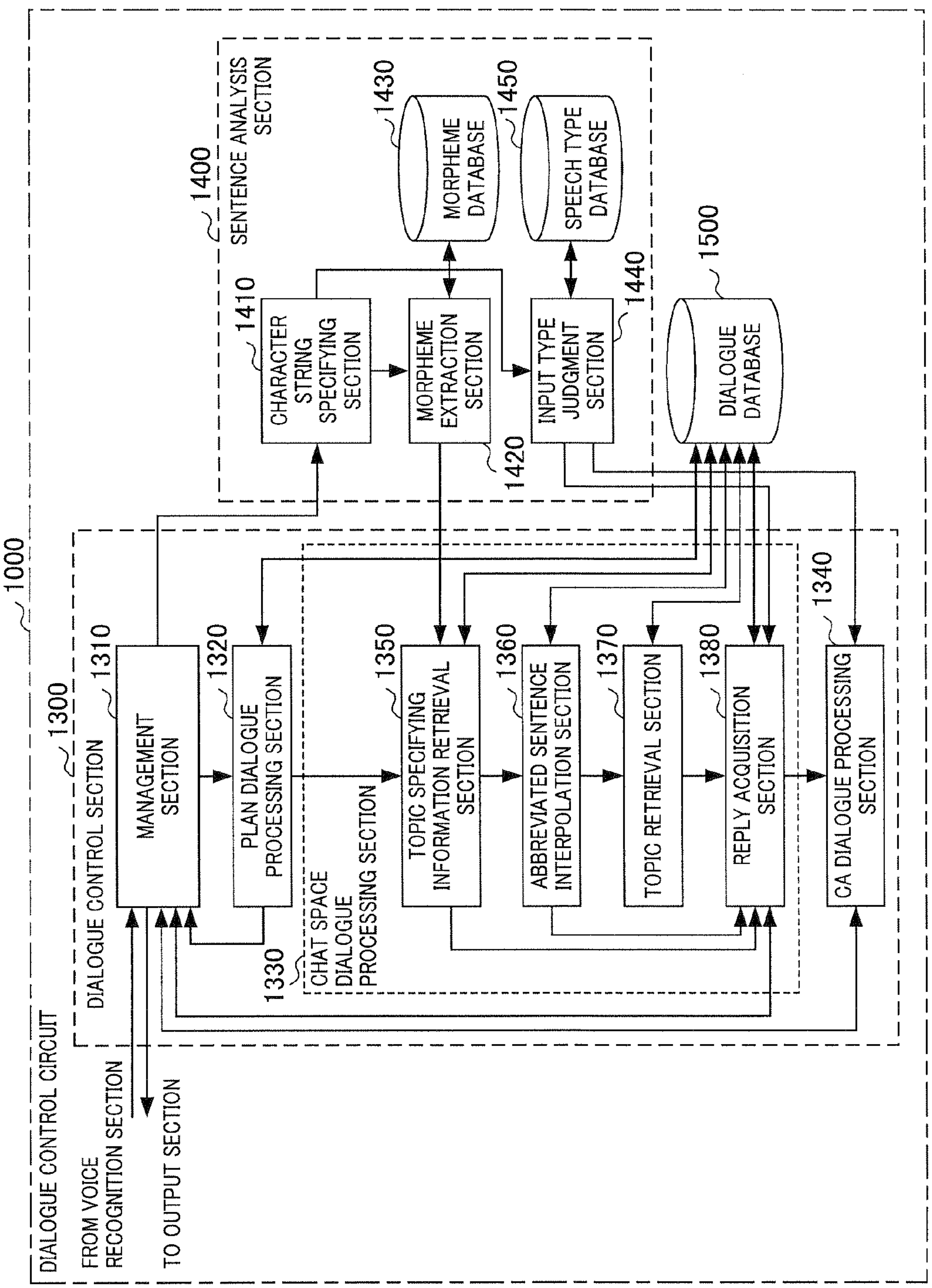
FIG. 12 is a partially enlarged block diagram of the dialogue control circuit.

An example of the configuration of the sentence analysis section 1400 is described below with reference to FIG. 12. FIG. 12 is a partially enlarged block diagram of the dialogue control circuit 1000, showing specific configuration examples of the dialogue control section 1300 and the sentence analysis section 1400. In FIG. 12, only the dialogue control section 1300, the sentence analysis section 1400 and the dialogue database 1500 are shown, and other components are not shown.

The sentence analysis section 1400 analyzes the character string specified by the input section 1100 or the voice recognition section 1200. In the present embodiment, as shown in FIG. 12, the sentence analysis section 1400 has a character string specifying section 1410, a morpheme extraction section 1420, a morpheme database 1430, an input type judgment section 1440 and a speech type database 1450. The character string specifying section 1410 delimits, on a per block basis, a series of character strings specified by the input section 1100 and the voice recognition section 1200. The term "a block" indicates a single sentence obtained by delimiting a character string as short as possible, so as to be grammatically understandable. Specifically, when a time interval exceeding a certain value is present in a series of character strings, the character string specifying section 110 delimits the character strings at that portion. The character string specifying section 1410 outputs the split individual character strings to the morpheme extraction section 1420 and the input type judgment section 1440. In the following description, the term "character string" indicates a character string on a per block basis.

1.1.4.1. Morpheme Extraction Section

The morpheme extraction section 1420 extracts, from the character strings in a block delimited by the character string specifying section 1410, individual morphemes constituting the minimum units of the character strings, as first morpheme information. In the present embodiment, the term "morphemes" indicates the minimum units of word compositions appearing in the character strings. Examples of the minimum units of word compositions are parts of speech such as a noun, adjective and verb.

In the present embodiment, the individual morphemes can be expressed by m1, m2, m3 . . . , as shown in FIG. 13. FIG. 13 is a diagram showing the relation between a character string and morphemes extracted from the character string. As shown in FIG. 13, the morpheme extraction section 1420, into which the character string has been inputted from the character string specifying section 141, collates the inputted character string with the morpheme group prestored in the morpheme database 1430 (this morpheme group is prepared as a morpheme dictionary in which the individual morphemes belonging to the corresponding part-of-speech classification are associated with index term, pronunciation, part-of-speech, conjugated form and the like). After performing the collation, the morpheme extraction section 1420 extracts from the character string of the morphemes (m1, m2, . . . ) corresponding to any one of the prestored morpheme group. The elements (n1, n2, n3, . . . ) other than the extracted morphemes are an auxiliary verb and the like.

The morpheme extraction section 1420 outputs the extracted morphemes as first morpheme information, to a topic specifying information retrieval section 1350. The first morpheme information may not be structured. The term "structured" indicates classifying and arranging the morphemes included in a character string based on the parts-of-speech or the like, that is, to convert the character string as a speech sentence, into data composed of morphemes arranged in a predetermined order, such as "subject," "object," and "predicate." The use of structured first morpheme information does not constitute an obstruction to the practice of the present embodiment.

1.1.4.2. Input Type Judgment Section

The input type judgment section 1440 judges the speech content type (the speech type) based on the character string specified by the character string specifying section 1410. The speech type is information specifying the speech content type and indicates, for example, "speech sentence type" in the present embodiment, as shown in FIG. 13. FIG. 13 is a diagram showing "speech sentence types," two-alphabet combinations indicating these speech sentence types, and examples of speech sentence corresponding to these speech sentence types, respectively.

In the present embodiment, as shown in FIG. 13, "speech sentence types" are composed of a declaration sentence (D), a time sentence (T), a location sentence (L) and a negation sentence (N). The sentences of these types are composed of a negative sentence or a question sentence. The term "declaration" indicates a sentence indicating the user's opinion or idea. In the present embodiment, the declaration is, for example, "I like horses" as shown in FIG. 13. The term "place sentence" indicates a sentence along with a locational concept. The term "time sentence" indicates a sentence along with a time concept. The term "negation sentence" indicates a sentence to negate a declaration sentence. Example sentences of the "speech sentence types" are shown in FIG. 13.

In the present embodiment, the input type judgment section 1440 judges "speech sentence type" by using a definition expression dictionary to judge as a declaration sentence, a negation expression dictionary to judge as a negation sentence, and the like, as shown in FIG. 13. Specifically, the input type judgment section 1440, to which the character string has been inputted from the character string specifying section 1410, collates the inputted character string with the individual dictionaries stored in the speech type database 1450. After performing the collation, the input type judgment section 1440 extracts elements related to the individual dictionaries from the character string.

The input type judgment section 1440 judges "speech sentence type" based on the extracted elements. For example, when an element of declaration related to a certain event is included in a character string, the input type judgment section 1440 judges the character string including the element as a declaration sentence. The input type judgment section 1440 outputs the judged "speech sentence type" to a reply acquisition section 1380.

1.1.5. Dialogue Database

Figure 16:
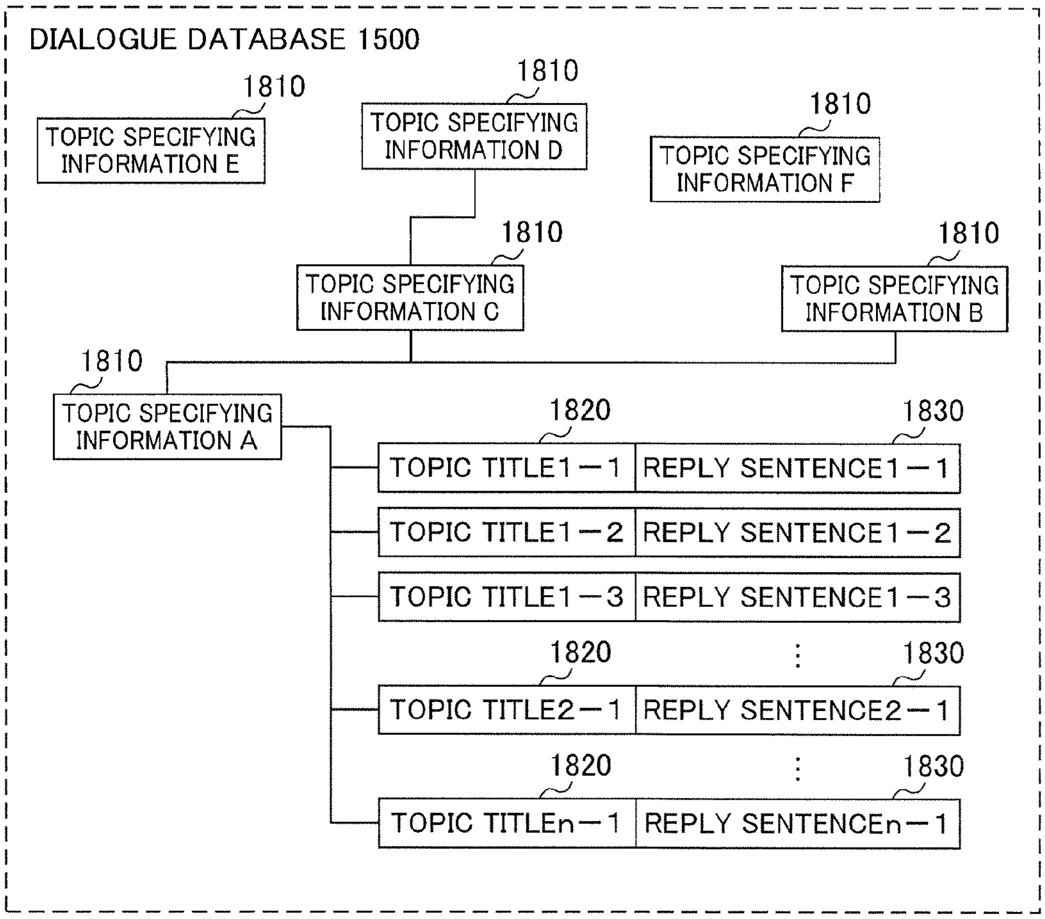
FIG. 16 is a conceptual diagram showing an example of the data configuration of data stored in a dialogue database.

A data configuration example of the data stored in the dialogue database 1500 is described below with reference to FIG. 16. FIG. 16 is a conceptual diagram showing a data configuration example of the data stored in the dialogue database 1500.

The dialogue database 1500 prestores a plurality of topic specifying information 1810 for specifying topics as shown in FIG. 16. This topic specifying information 1810 may be associated with other topic specifying information 1810. In the example shown in FIG. 16, when topic specifying information C (1810) is specified, other topic specifying information A (1810), topic specifying information B (1810) and topic specifying information D (1810) are determined, which are associated with the topic specifying information C (1810).

Specifically, in the present embodiment, the topic specifying information 1810 indicates input contents estimated to be inputted from a user, or "keywords" related to reply sentences to the user.

The topic specifying information 1810 are stored in association with one or a plurality of topic titles 1820. The individual topic title 1820 is composed of morphemes formed by a single character, a plurality of character strings or a combination of these. The individual topic title 1820 is stored in association with a reply sentence 1830 to the user. A plurality of reply types indicating the type of the reply sentence 1830 is associated with the reply sentence 1830.

Figure 17:
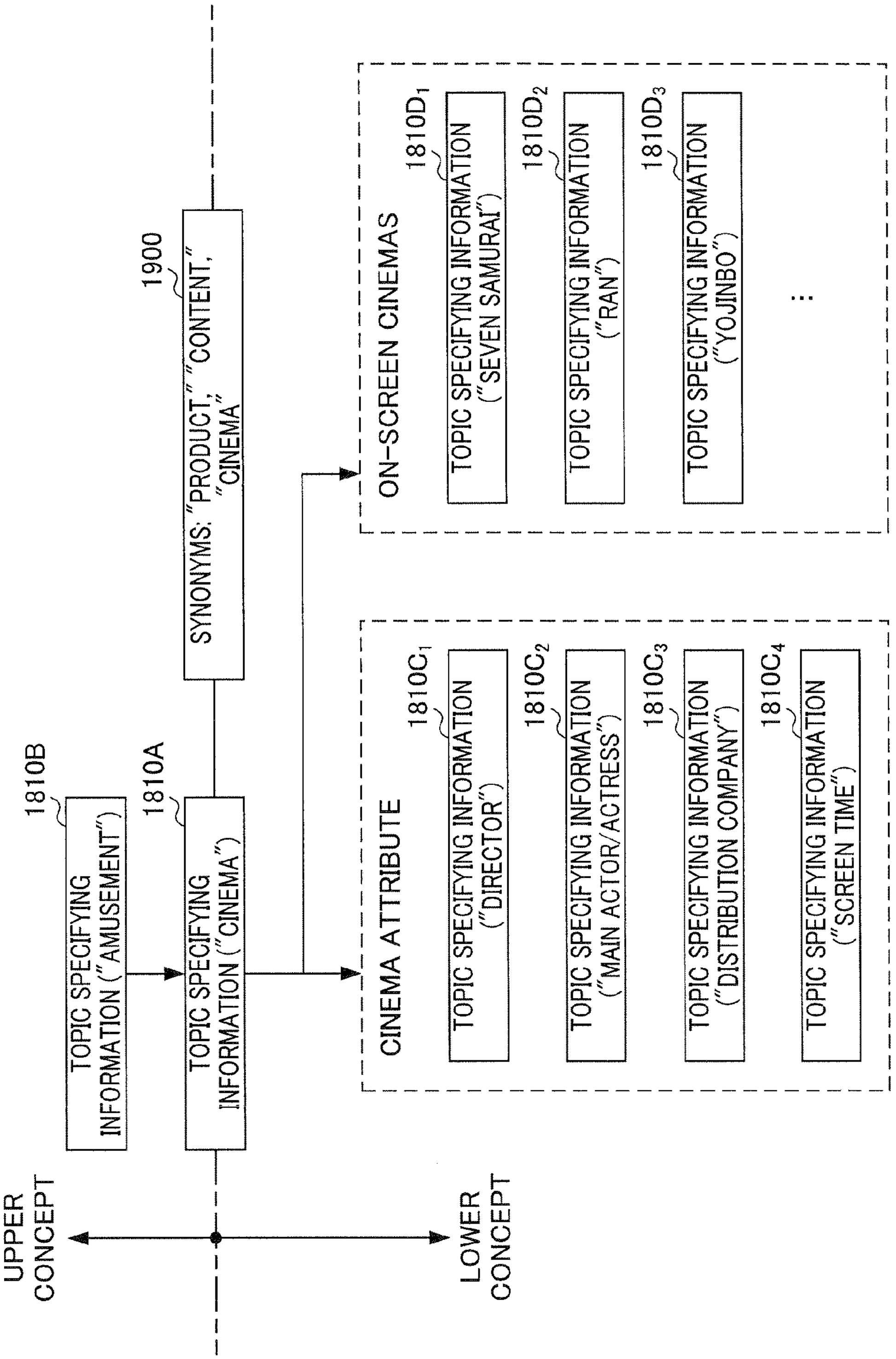
FIG. 17 is a diagram showing the association between certain topic specifying information and other topic specifying information.

Next, the association between certain topic specifying information 1810 and other topic specifying information 1810 is described below. FIG. 17 is a diagram showing the association between certain topic specifying information 1810A and other topic specifying information's 1810B, 1810$C_1$ to 1810$C_4$, 1810$D_1$ to 1810$D_3$ . . . . In the following description, the expression "to be stored in association with" indicates that reading of certain information X enables reading of information Y associated with the information X. For example, the state in which the data of the information X contains the information for reading the information Y (e.g., a pointer indicating the storage destination address of the information Y, the storage destination physical memory address of the information Y and a logical address) is defined so that the information Y is "stored in association with" the information X.

In the example shown in FIG. 17, the topic specifying information can be stored in association with other topic specifying information in terms of upper concept, lower concept, synonym, antonyms (omitted in the present embodiment) In the example shown in FIG. 16, as the upper concept topic specifying information of the topic specifying information 1810A (i.e. "cinema"), the topic specifying information 1810B (i.e. "amusement") are stored in association with the topic specifying information 1810A, and stored in the upper phase than the topic specifying information ("cinema"), for example.

As lower concept topic specifying information of the topic specifying information 1810A ("cinema"), topic specifying information 1810$C_1$ ("director"), topic specifying information 1810$C_2$ ("main actor/actress"), topic specifying information 1810$C_3$ ("distribution company"), topic specifying information 1810$C_4$ ("screen time"), topic specifying information 1810$D_1$ ("SEVEN SAMURAI"), topic specifying information 1810$D_2$ ("RAN"), topic specifying information 1810$D_3$ ("YOJINBO"), . . . are stored in association with the topic specifying information 1810A.

Synonyms 1900 are associated with the topic specifying information 1810A. This example shows that "product," "content," and "cinema" are stored as the synonym of the keyword "cinema" as the topic specifying information 1810A. Definition of the abovementioned synonyms enables handling of the assumption that the topic specifying information 1810A is included in a speech sentence or the like, in cases where the keyword "cinema" is not included but "product," "content," and "cinema" are included in the speech sentence.

In the dialogue control circuit 1000 of the present embodiment, when certain topic specifying information 1810 is specified by referring to the storage contents of the dialogue database 1500, it becomes possible to retrieve and extract at high speed other topic specifying information 1810 stored in association with the topic specifying information 1810, and the topic title 1820 and the replay sentence 1830 of the topic specifying information 1810.

Next, a data configuration example of the topic title 1820 (referred to also as "second morpheme information") is described with reference to FIG. 18. FIG. 18 is a diagram showing a data configuration example of the topic title 1820.

Topic specifying information 1810$D_1$, 1810$D_2$ and 1810$D_3$ have a plurality of different topic titles 1820$_1$, 1820$_2$ . . . , topic titles 1820$_3$, 1820$_4$ . . . , topic titles 1820$_5$, 1820$_6$, . . . , respectively. In the present embodiment, as shown in FIG. 18, the individual topic titles 1820 are information formed by first specifying information 1001, second specifying information 1002 and third specifying information 1003. Here, the first specifying information 1001 indicates a primary morpheme constituting a topic in this example. Examples of the first specifying information 1001 include a subject constituting a sentence. The second specifying information 1002 indicates a morpheme having a close association with the first specific information 1001 in this example. Examples of the second specifying information 1002 include an object. The third specifying information 1003 indicates a morpheme indicating movement against a certain matter (candidate), or a morpheme modifying a noun or the like in this example. Examples of the third specifying information 1003 include an adverb or an adjective. The respective meanings of the first, second and third specifying information 1001, 1002 and 1003 are not limited to the abovementioned contents, and the present embodiment can be established as long as other meanings (other parts of speech) are applied to the first, second and third specifying informations 1001, 1002 and 1003, and the sentence content can be recognized from these.

For example, when the subject is "SEVEN SAMURAI" and the adjective is "interesting," as shown in FIG. 18, the topic title (the second morpheme information) 1820$_2$ is composed of the morpheme "SEVEN SAMURAI" as the first specifying information 1001 and the morpheme "interesting" as the third specifying information 1003. The topic title 1820$_2$ includes no morpheme corresponding to the second specifying information 1002, and the symbol "*" indicating the absence of the corresponding morpheme is stored as the second specifying information 1002.

The topic title 1820$_2$ (SEVEN SAMURAI; *; interesting) has the meaning that SEVEN SAMURAI is interesting. The terms within the parentheses constituting the topic title 1820 are hereinafter arranged from the left in the following order, the first specifying information 1001, the second specifying information 1002 and the third specifying information. In the topic title 1820, the absence of morphemes included in the first to third specifying information is indicated by the symbol "*."

The number of specifying information constituting the topic title 1820 is not limited to three such as the abovementioned first to three specifying information. For example, other specifying information (fourth specifying information or more) may be added.

Next, the reply sentence 1830 is described with reference to FIG. 19. In the present embodiment, in order to perform a reply in accordance with the type of a speech sentence generated from a user as shown in FIG. 19, the reply sentences 1830 are classified into types (reply types) such as a declaration (D), time (T), location (L) and a negation (N), and prepared on a per type basis. Acknowledge sentences are indicated by "A" and question sentences are indicated by "Q."

A data configuration example of the topic specifying information 1810 is described with reference to FIG. 20. FIG. 20 shows a specific example of the topic title 1820 and the reply sentence 1830 associated to certain topic specifying information 1810 "horse." A plurality of topic titles (1820)1-1, 1-2, . . . are associated with the topic specifying information 1810 "horse." Reply sentences (1830)1-1, 1-2, . . . are stored in association with the topic titles (1820)1-1, 1-2, . . . . The reply sentence 1830 is prepared for each of the reply types 1840.

When a topic title (1820)1-1 (horse; *; like), which is the extraction of morphemes included in "I like horses," the reply sentence (1830)1-1 corresponding to the topic title (1820)1-1 is, for example, (DA; declaration acknowledge sentence "I also like horses.") or (TA; time acknowledge sentence "I like horses standing in a paddock." Referring to the output of the input type judgment section 1440, the reply acquisition section 1380 described later acquires a reply sentence 1830 associated with the topic title 1820.

Next plan designation information 1840 as information to designate a reply sentence (also called "next replay sentence") to be preferentially outputted to the user's speech, are associated with the individual reply sentences, respectively. The next plan designation information 1840 may be any information which can designate the next reply sentence. Examples thereof include a reply sentence ID that can specify at least one reply sentence from among all reply sentences stored in the dialogue database 1500.

In the present embodiment, the next plan designation information 1840 are defined as information to specify the next reply sentence on a per reply sentence basis (e.g., the reply sentence ID). Since the next plan designation information 1840 is designated for each of the topic titles 1820 and the topic specifying information 1810, as the next reply sentence (in this case, a plurality of reply sentences are designated as the next reply sentence), the next plan designation information 1840 are referred to as a next reply sentence group. The reply sentence actually outputted may be information to specify any reply sentence included in the reply sentence group. The present embodiment can be established even if the topic title ID, the topic specifying information ID or the like is used as time plan designation information.

1.1.6. Dialogue Control Section

Returning to FIG. 12, an example of the configuration of the dialogue control section 1300 is described below. The dialogue control section 1300 controls data sending/receiving among the individual components within the dialog control circuit 1000 (the voice recognition section 1200, the sentence analysis section 1400, the dialogue database 1500, the output section 1600 and the voice recognition dictionary storage section 1700), and also has a function of determining and outputting a reply sentence in response to the user's speech.

In the present embodiment, as shown in FIG. 12, the dialogue control section 1300 has a management section 1310, a plan dialogue processing section 1320, a chat space dialogue control processing unit 1330 and a CA dialogue processing section 1340. These components are described below.

1.1.6.1. Management Section

The management section 1310 has functions of storing a chat history and updating as needed. In response to the request from a topic specifying information retrieval section 1350, an abbreviated sentence interpolation section 1360, a topic retrieval section 1370 and the reply acquisition section 1380, the management section 1310 has a function of transferring the entire or a portion of the chat history stored therein to these components.

1.1.6.2. Plan Dialogue Processing Section

The plan dialogue processing section 1320 has functions of executing a plan and establishing a dialogue with a user according to the plan. The term "plan" indicates supplying the user with predetermined replies in a predetermined order. The plan dialogue processing section 1320 is described below.

The plan dialogue processing section 1320 has a function of outputting predetermined replies in a predetermined order, in response to the user's speech.

Figure 21:
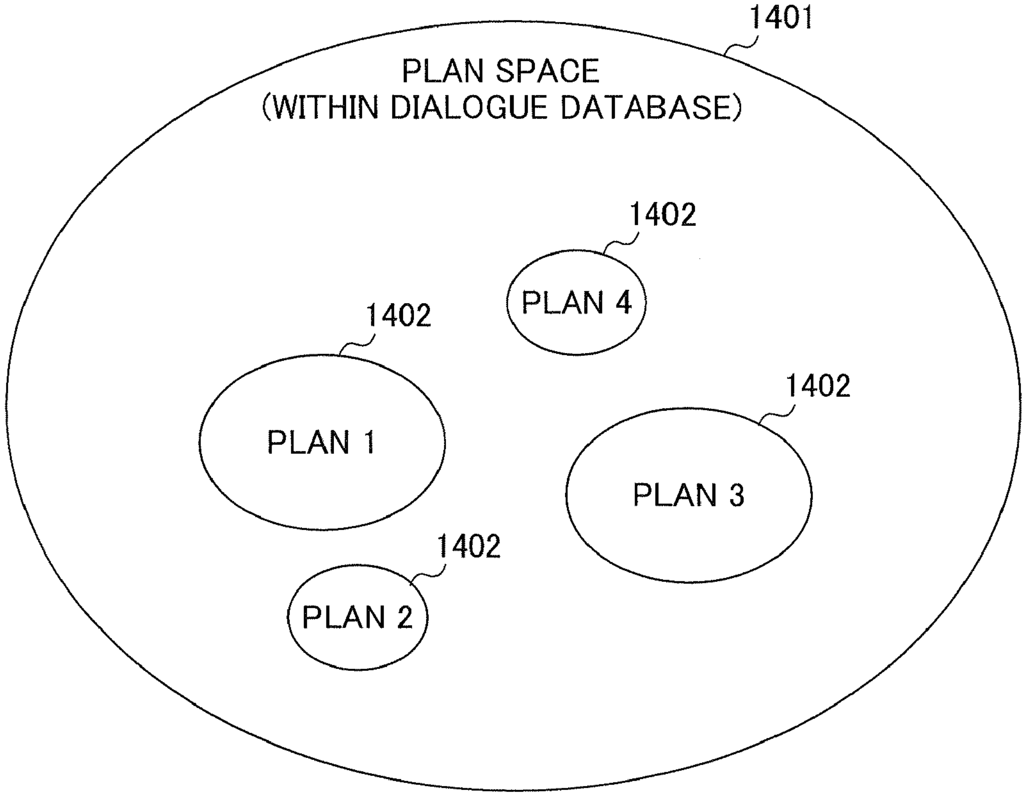
FIG. 21 is a conceptual diagram for explaining plan space.

FIG. 21 is a conceptual diagram for explaining the plan. As shown in FIG. 21, a plurality of various plans 1402, such as a plan 1, a plan 2, a plan 3 and a plan 4, are prepared in advance in a plan space 1401. The term "plan space 1401" indicates an aggregate of the plurality of the plans 1402 stored in the dialogue database 1500. At the activation of the system or at the start of the dialogue, the dialogue control circuit 1000 selects a predetermined plan for start, or selects any one of the plans 1402 from the plan space 1401 in accordance with the content of the user's speech, and performs the output of reply sentences to the user's speech by using the selected plan 1402.

Figure 22:
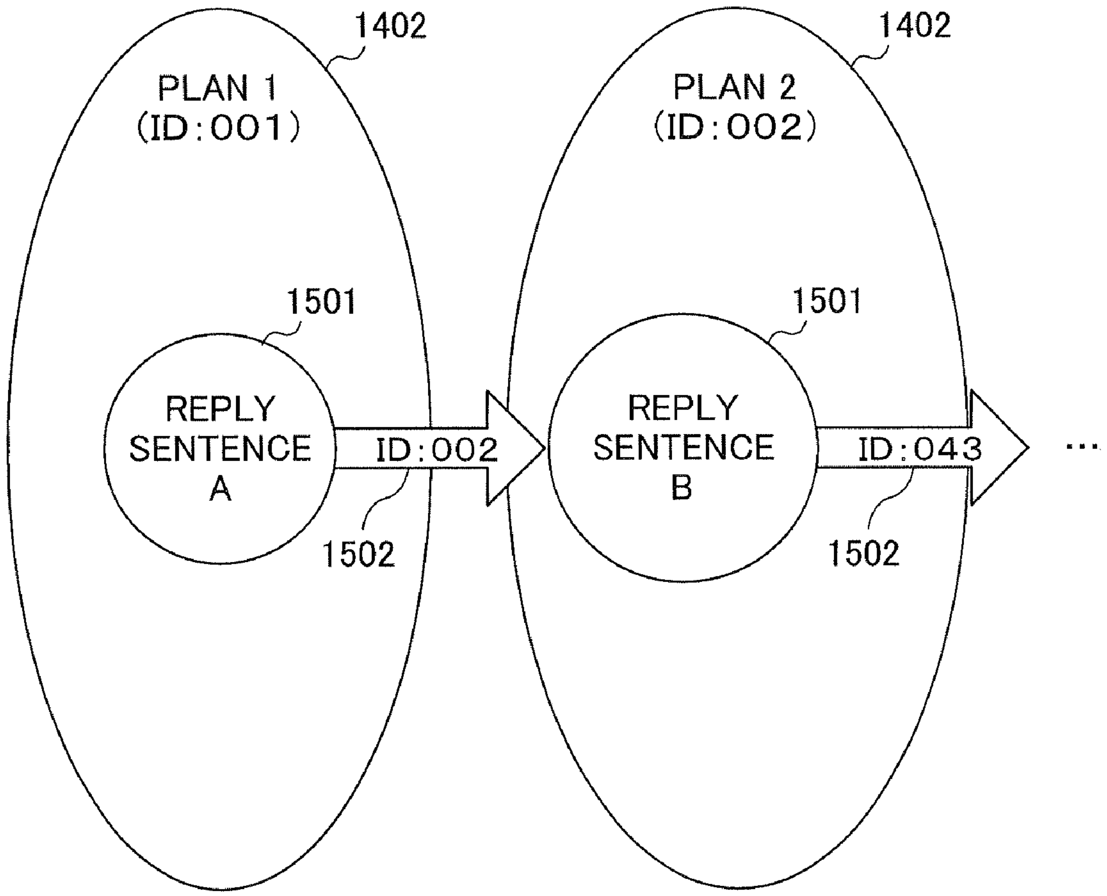
FIG. 22 is a diagram showing plan examples.

FIG. 22 is a diagram showing a configuration example of the plan 1402. The plan 1402 has a reply sentence 1501 and next plan designation information 1502 associated with the replay sentence 1501. The next plan designation information 1502 is information to specify the plan 1402 including a reply sentence (referred to as a next candidate reply sentence) to be outputted to the user after the reply sentence 1501 included in the plan 1402. In the present embodiment, the plan 1 has a reply sentence A (1501) that the dialogue control circuit 1000 outputs when executing the plan 1, and next plan designation information 1502 associated with the reply sentence A (1501). The next plan designation information 1502 is information "ID: 002" to specify the plan 1402 having a reply sentence B (1501) that is the next candidate reply sentence of the reply sentence A (1501). Similarly, the next plan designation information 1502 corresponds to the replay sentence B (1501), and when the reply sentence B (1501) is outputted, the plan 2 (1402) including the next candidate reply sentence is designated. Thus, the plans 1402 are chained by the next plan designation information 1502, achieving a plan dialogue to output a series of continuous contents to the user. That is, the individual plan is prepared by splitting the content required to inform the user (explanation, guidebook, questionnaire, etc.) into a plurality of reply sentences, and predetermining the order of these reply sentences. This enables providing the user these reply sentences sequentially in response to the user's speech. It is not necessarily required to immediately output the reply sentence 1502 included in the plan 1402 designated by the next plan designation information 1502 as long as the user's speech in response to the output of the immediately preceding reply sentence. In this plan, after inserting a dialogue of another topic, a reply sentence 1501 included in the plan 1402 designated by the next plan designation information 1502 may be outputted.

The reply sentence 1501 shown in FIG. 22 corresponds to any one of the reply sentence characteristic strings in reply sentences 1830 shown in FIG. 20. The next plan designation information 1502 shown in FIG. 22 corresponds to the next plan designation information 1840 shown in FIG. 20.

Figure 23:
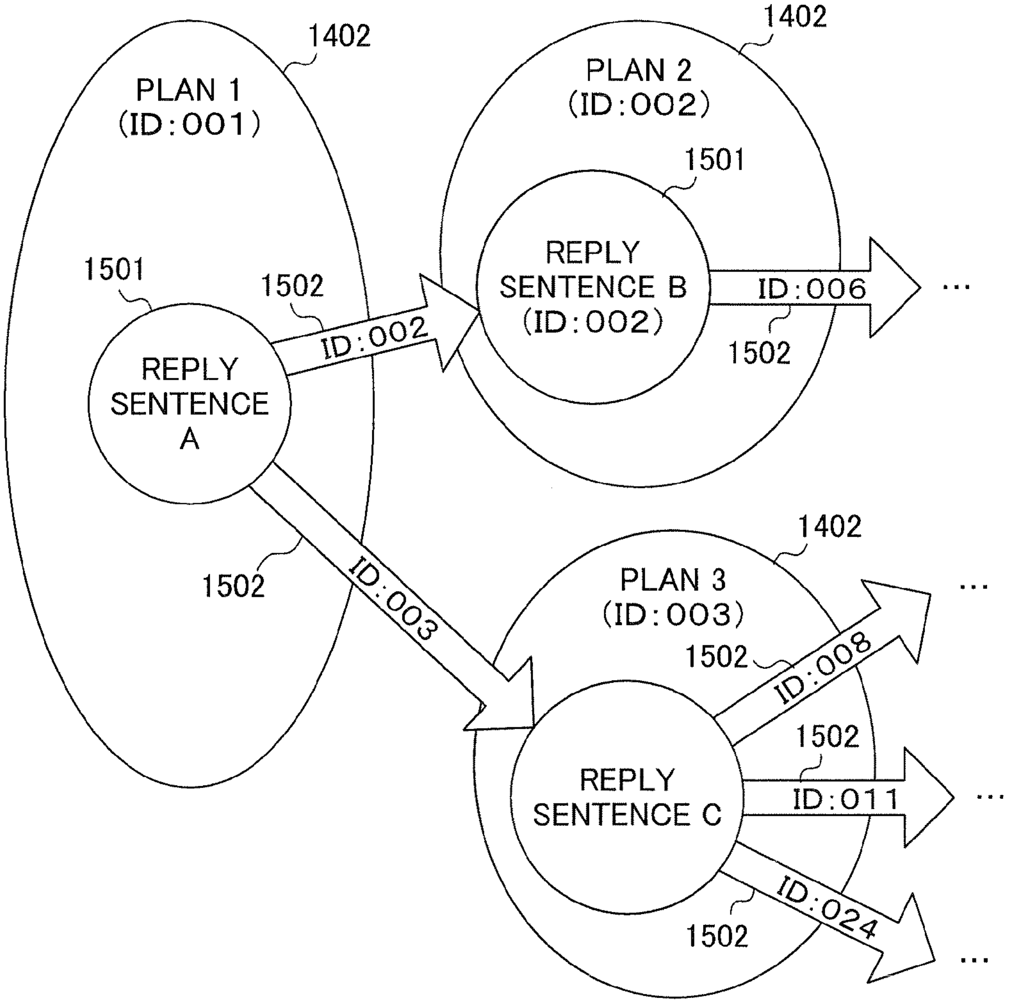
FIG. 23 is a diagram showing other plan examples.

The chaining of the plans 1402 is not limited to the 1-dimensional arrangement as shown in FIG. 22. FIG. 23 is a diagram showing an example of the plans 1402 having a different chaining method from that in FIG. 22. In the example shown in FIG. 23, a plan 1 (1402) has two next plan designation information 1502 so that it can designate two reply sentences 1501 serving as next candidate reply sentences, namely plans 1402. These two next plan designation information 1502 are provided so that two plans 1402 consisting of a plan 2 (1402) having a reply sentence B (1501), and a plan 3 (1402) having a reply sentence C (1501), as plans 1402 having a next candidate reply sentence are determined when outputting a certain reply sentence A (1501). The reply sentence B and the reply sentence C are selective alternatives, that is, when one of these is outputted, the other is not outputted, and the plan 1 (1402) is terminated. Thus, the chaining of the plans 1402 is not limited to a 1-dimensional permutation and a tree-like chaining or a mesh-like chaining may be used.

No limitation is imposed on the number of candidate reply sentences associated to the individual plans. In the plan 1402 as the termination of the chat, no next plan designation information 1502 may exist in some cases.

Figure 24:
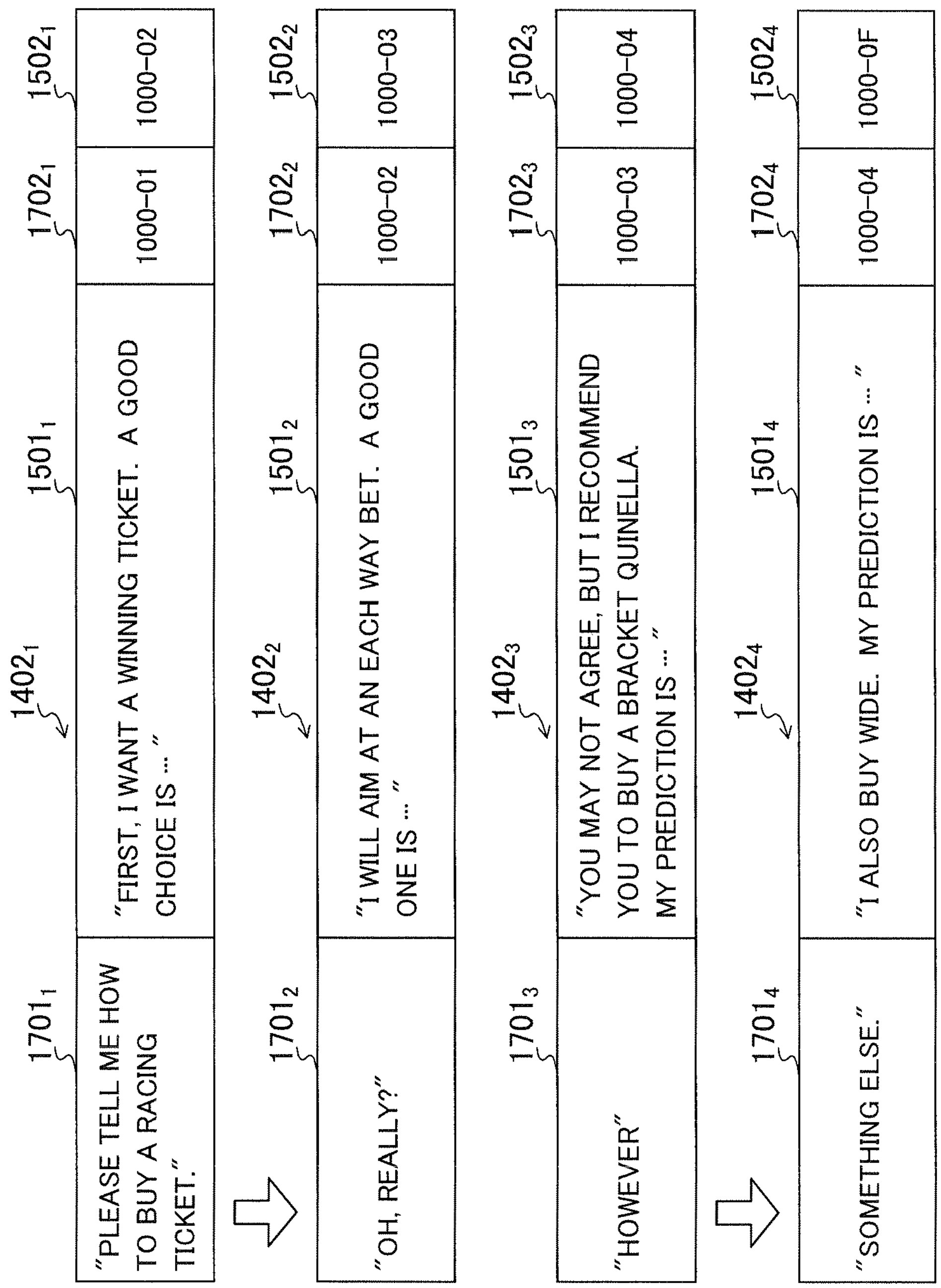
FIG. 24 is a diagram showing a specific example of plan dialogue processing.

FIG. 24 shows a specific example of a certain series of plans 1402. This series of plans 1402$_1$ to 1402$_4$ correspond to four reply sentences 1501$_1$ to 1501$_4$ in order to inform the user of the information on how to buy a horse race ticket. These four reply sentences 1501$_1$ to 1501$_4$ form a complete speech (an explanation). The individual plans 1402$_1$ to 1402$_4$ have ID data 1702$_1$ to 1702$_4$: namely, "1000-01," "1000-02," "1000-03" and "1000-04," respectively. Here, the numbers after the hyphen in the ID data are information indicating the order of output. The individual plans 1402$_1$ to 1402$_4$ have next plan designation information 1502$_1$ to 1502$_4$, respectively. The content of the next plan designation information 1502$_4$ is data, "1000-0F," where the number and alphabet "0F" after the hyphen is information indicating that there is no succeeding plan to be outputted, and this reply sentence is the end of the series of sentences (the explanation).

In this example, when the user's speech is "how to buy a horse race ticket," the plan dialogue processing section 1320 starts executing the series of plans. That is, when the plan dialogue processing section 1320 receives the user's speech "Please tell me how to buy a horse racing ticket.", the plan dialogue processing section 1320 retrieves the plan space 1401 to check whether there is the plan 1402 having the reply sentence 1501$_1$ corresponding to the user's speech "Please tell me how to buy a horse race ticket." In this example, a user speech character string 1701$_1$ corresponds to "Please tell me how to buy a horse racing ticket" corresponds to the plan 1402$_1$.

Upon finding a plan 1402$_1$, the plan dialogue processing section 1320 obtains a reply sentence 1501$_1$ included in the plan 1402$_1$, and outputs the reply sentence 1501$_1$ as a reply to the user's speech, and specifies the next candidate reply sentence based on the next plan designation information 1502$_1$.

After outputting the reply sentence 1501$_1$ and receiving the user's speech through the input section 1100 or the voice recognition section 1200, the plan dialogue processing section 1320 executes the plan 1402$_2$. That is, the plan dialogue processing section 1320 executes the plan 1402$_2$ designated by the next plan designation information 1501$_1$: namely, judges whether to output the second reply sentence 1501$_2$. Specifically, the plan dialogue processing section 1320 compares a user dialogue character string (referred to also as an example sentence) 1701$_2$ associated with the reply sentence 1501$_2$, or a topic title 1820 (not shown in FIG. 24) with the received user's speech, and judges whether a match occurs. When a match is found, the plan dialogue processing section 1320 outputs the second reply sentence 1501$_2$. Since the next plan designation information 1502$_2$ is described in the plan 1402$_2$ including the second reply sentence 1501$_2$, the next candidate reply sentence can be specified.

Similarly, in response to the user's speech generated continuously thereafter, the plan dialogue processing section 1320 can output the third reply sentence 1501$_3$ and the fourth reply sentence 1501$_4$ by sequentially advancing to the plan 1403$_3$ and then the plan 1402$_4$. When the output of the fourth reply sentence 1501$_4$ as the final reply sentence is completed, the plan dialogue processing section 1320 terminates the plan execution.

Thus, the sequential execution of the plans 1402$_1$ to 1402$_4$ enables providing the user with the prepared dialogue contents in the predetermined order.

1.1.6.3. Chat Space Dialogue Control Processing Section

Returning to FIG. 12, the description of the configuration example of the dialogue control section 1300 is continued. The chat space dialogue control processing section 1330 has the topic specifying information retrieval section 1350, the abbreviated sentence interpolation section 1360, the topic retrieval section 1370 and the reply acquisition section 1380. The abovementioned management section 1310 controls the entirety of the dialogue control section 1300.

The term "chat history" indicates information to specify the topic and the subject of the dialogue between the user and the dialogue control circuit 1000, and includes at least one of "marked topic specifying information," "marked topic title," "user input sentence topic specifying information" and "reply sentence topic specifying information." This "marked topic specifying information," "marked topic title," and "reply sentence topic specifying information" are not limited to those determined by the immediately preceding dialogue. Alternatively, the "marked topic specifying information," the "marked topic title," and the "reply sentence topic specifying information," which have been used in a predetermined period of time in the past or the accumulated records of these, may be used.

The components constituting the chat space dialogue control processing section 1330 are described below.

1.1.6.3.1. Topic Specifying Information Retrieval Section

The topic specifying information retrieval section 1350 collates first morpheme information extracted by the morpheme extraction section 1420 with the individual topic specifying information, and retrieves the topic specifying information matched with the first morpheme information from among this topic specifying information. Specifically, when the first morpheme information inputted from the morpheme extraction section 1420 is composed of two morphemes "horse" and "like," the topic specifying information retrieval section 1350 collates the inputted first morpheme information with the topic specifying information group.

When the morpheme (e.g., "horse") constituting the first morpheme information is included in a marked topic title 1820 focus (the expression "1820 focus" is for the purpose of determining it from the topic titles retrieved previously and other topic titles), the topic specifying information retrieval section 1350, after performing the collation, then outputs the marked topic title 1820 focus to the reply acquisition section 1380. On the other hand, when any morpheme constituting the first morpheme information is not included in a marked topic title 1820 focus, the topic specifying information retrieval section 1350 determines a user input sentence topic specifying information based on the first morpheme information, and outputs the inputted first morpheme information and the user input sentence topic specifying information to the abbreviated sentence interpolation section 1360. The term "user input sentence topic specifying information" indicates topic specifying information equivalent to the morpheme corresponding to the content of the user's topic among the morphemes included in the first morpheme information, or topic specifying information equivalent to the morpheme likely corresponding to the content of the user's topic among the morphemes included in the first morpheme information.

1.1.6.3.2. Abbreviated Sentence Interpolation Section

The abbreviated sentence interpolation section 1360 generates a plurality of types of interpolated first morpheme information by interpolating the abovementioned first morpheme information by using the previously retrieved topic specifying information 1810 (hereinafter referred to as "marked topic specifying information") and the topic specifying information 1810 included in the previous replay sentence (hereinafter referred to as "reply sentence topic specifying information"). For example, when the user's speech is the sentence "I like," the abbreviated sentence interpolation section 1360 generates the interpolated first morpheme information "horse, I like" by incorporating the marked topic specifying information "horse" into the first morpheme information "like."

That is, when the first morpheme information is "W" and the aggregation of the marked topic specifying information and the reply sentence topic specifying information is "D," the abbreviated sentence interpolation section 1360 generates the interpolated morpheme information by incorporating the elements of the aggregation "D" into the first morpheme information "W."

Therefore, in cases where the sentence formed by the first morpheme information is an abbreviated sentence and its meaning is somewhat unclear, the abbreviated sentence interpolation section 1360 can use the aggregation "D" to incorporate the elements of the aggregation "D" (e.g., "horse") into the first morpheme information "W." As a result, the abbreviated sentence interpolation section 1360 can interpolate the first morpheme information "like" to complement the first morpheme information "horse, like." Here, the interpolated first morpheme information "horse, like" corresponds to the user's speech "I like horses."

That is, the abbreviated sentence interpolation section 1360 can interpolate abbreviated sentences by using the aggregation "D," even when the user's speech content is an abbreviated sentence. Thus, even if a sentence composed of the first morpheme information is an abbreviated sentence, the abbreviated sentence interpolation section 1360 can complement the abbreviated sentence.

Furthermore, based on the aggregation "D," the abbreviated sentence interpolation section 1360 retrieves a topic title 1820 matched with the interpolated first morpheme information. When a match is found, the abbreviated sentence interpolation section 1360 outputs the matched topic title 1820 to the reply acquisition section 1380. Based on the proper topic title 1820 retrieved by the abbreviated sentence interpolation section 1360, the reply acquisition section 1380 can output the reply sentence 1830 most suitable for the user's speech content.

In the abbreviated sentence interpolation section 1360, the incorporation into the first morpheme information is not limited to the aggregation "D."

Alternatively, based on a marked topic title, the abbreviated sentence interpolation section 1360 may incorporate a morpheme included in any one of the first, second or third specifying information constituting the marked topic title, into the extracted first morpheme information.

1.1.6.3.3. Topic Retrieval Section

When the abbreviated sentence interpolation section 1360 fails to determine a topic title 1810, the topic retrieval section 1370 collates the first morpheme information with the individual topic titles 1810 corresponding to the user's input sentence topic specifying information, and retrieves a topic title 1810 most suitable for the first morpheme information from among these topic titles 1810. More specifically, upon receipt of a retrieval instruction signal from the abbreviated sentence interpolation section 1360, the topic retrieval section 1370 retrieves, based on user's input sentence topic specifying information and first morpheme information contained in the inputted retrieval instruction signal, a topic title 1810 most suitable for the first morpheme information from among individual topic titles associated with the user's input sentence topic specifying information. The topic retrieval section 1370 outputs the retrieved topic title 1810 as a retrieval result signal to the reply acquisition section 1380.

As described above, FIG. 20 shows specific examples of the topic title 1820 and the reply sentence 1830 associated with certain topic specifying information 1810 (i.e. "horse"). As shown in FIG. 20, for example, since the topic specifying information 1810 ("horse") is included in the inputted first morpheme information "horse, like," the topic retrieval section 1370 specifies the topic specifying information ("horse"), and then collates individual topic titles (1820)1-1, 1-2, . . . associated with the topic specifying information 1810 ("horse") with the inputted first morpheme information "horse, like." Based on the collation result, the topic retrieval section 1370 specifies a topic title (1820)1-1 (horse; *; like) matched with the inputted first morpheme information "horse, like" from among the individual topic titles (1820)1-1 to 1-2. The topic retrieval section 1340 outputs the retrieved topic title (1820)1-1 (horse; *; like) as a retrieval signal to the reply acquisition section 1380.

1.1.6.3.4. Reply Acquisition Section

Based on the topic title 1820 retrieved by the abbreviated sentence interpolation section 1360 or the topic retrieval section 1370, the reply acquisition section 1380 acquires the reply sentence associated with the topic title 1820. Furthermore, based on the topic title 1820 retrieved by the topic retrieval section 1370, the reply acquisition section 1380 collates individual reply types associated with the topic title 1820, with the speech type judged by the input type judgment section 1440. After the collation, the reply acquisition section 1380 retrieves a reply type matched with the judged speech type from among the individual reply types.

In the example shown in FIG. 20, when the topic title retrieved by the topic retrieval section 1370 is the topic type 1-1 (horse; *; like), the reply acquisition section 1380 specifies a reply type (DA) matched with the "speech sentence type" (e.g., DA) judged by the input type judgment section 1440, from among the reply sentence 1-1 (DA, TA, etc.) associated with the topic title 1-1. Based on the specified reply type (DA), the reply acquisition section 1380 acquires the reply sentence 1-1 ("I also like horses.") associated with the reply type (DA) Here, in the abovementioned "DA," "TA" and the like, "A" indicates acknowledgement format. Accordingly, when "A" is included in the topic types and the reply types, it indicates an acknowledgement of a certain event. Alternatively, the topic types and the reply types may include, for example, the types "DQ" and "TQ." Here, "Q" in the "DQ" and "TQ" indicates a question about a certain event.

When a reply type is formed in the question format (Q), reply sentences associated with the reply type are formed in the acknowledgement format (A). Examples of the reply sentences formed in the acknowledgement format (A) include sentences to reply to question items. For example, when a speech sentence is "Have you ever operated a slot machine?," the speech type of the speech sentence is the question format (Q). Examples of a reply sentence associated to the above question format (Q) include "I have operated a slot machine" (the acknowledgement format (A)).

On the other hand, when a speech type is formed in the acknowledge format (A), reply sentences associated to the reply type are formed in the question format (Q). Examples of the reply sentences formed in the question format (Q) include question sentences to inquire about the speech content and question sentences to learn a specific matter. For example, when a speech sentence is "I enjoy playing slot machines," the speech type of this speech sentence is the acknowledge format (A). Examples of reply sentences associated with the above acknowledgement format (A) include "Are you interested in playing a pachinko machine? (the question sentence (Q) to find out a specific matter).

The reply acquisition section 1380 outputs the acquired reply sentence 1830 as a reply sentence signal to the management section 1310. Upon the receipt of the reply sentence signal, the management section 1310 outputs the received reply sentence signal to the output section 1600.

1.1.6.4. CA Dialogue Processing Section

The CA dialogue processing section 1340 has a function of outputting a reply sentence in response to the user's speech content in order to continue the dialogue with the user when neither the plan dialogue processing section 1320 nor the chat space dialogue control processing section 1330 determines a reply sentence with respect to the user's speech.

Returning to FIG. 8, the description of the configuration example of the dialogue control circuit 1000 is resumed.

1.1.7. Output Section

The output section 1600 outputs reply sentences acquired by the reply acquisition section 1380. Examples of the output section 1600 include a speaker and a display. More specifically, when a reply sentence is inputted from the management section 1310 to the output section 1600, the output section 1600 generates a voice output based on the inputted reply sentence, such as "I also like horses." Thus, the description of the configuration example of the dialogue control circuit 1000 is completed.

2. Dialogue Control Method

The dialogue control circuit 1000 having the foregoing configuration performs the following operations to execute a dialogue control method.

The operation of the dialogue control circuit 1000 of the present embodiment, particularly the operation of the dialogue control section 1300, is described below.

Figure 25:
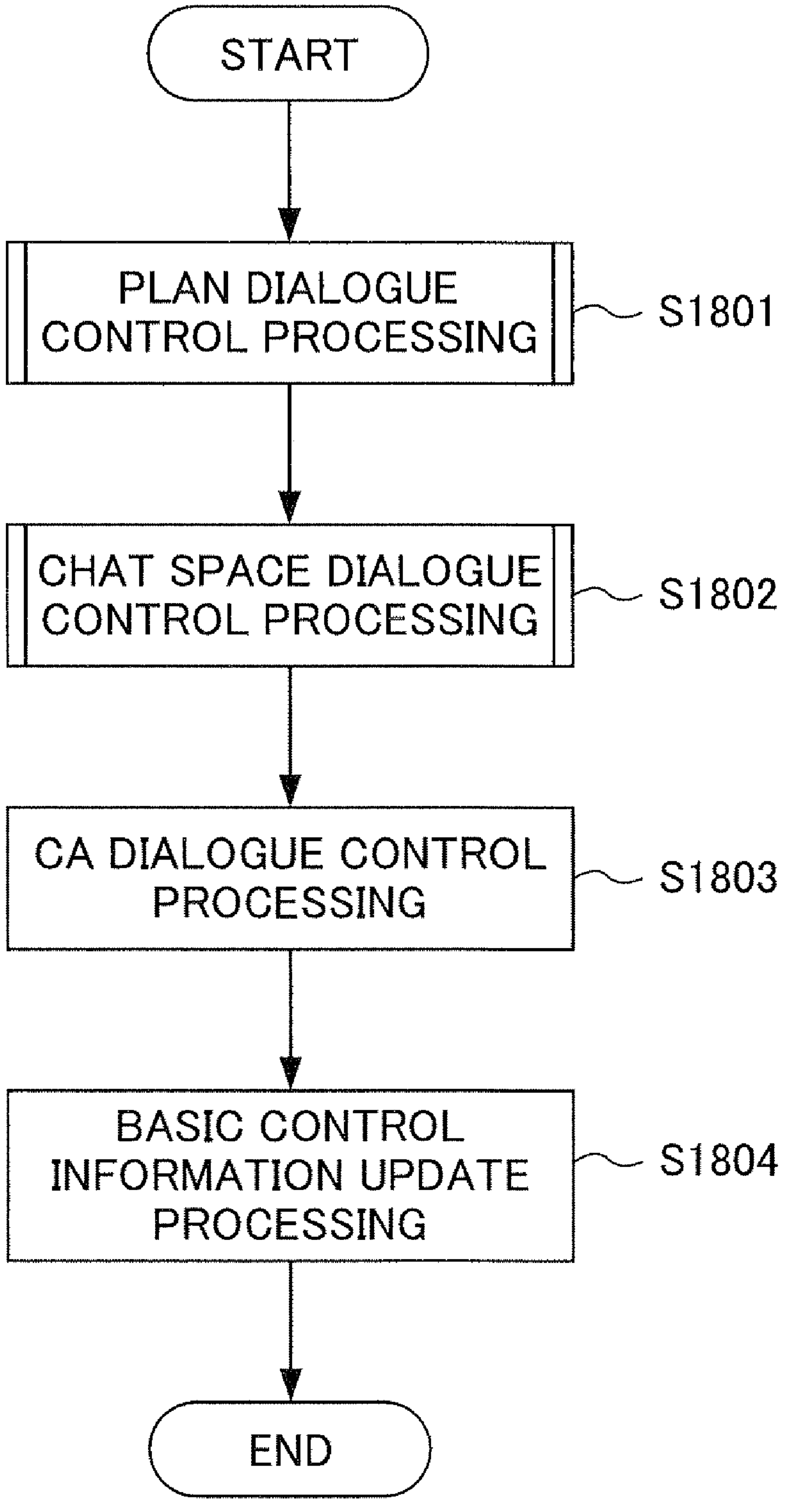
FIG. 25 is a flow chart showing an example of the main processing of a dialogue control section.

FIG. 25 is a flow chart showing an example of main processing of the dialogue control section 1300. The main processing is performed whenever the dialogue control section 1300 accepts the user's speech. By performing the main processing, a reply sentence to the user's speech is outputted to establish the dialogue (talk) between the user and the dialogue control circuit 1000.

In the main processing, the dialogue control section 1300, more particularly the plan dialogue processing section 1320, firstly performs a plan dialogue control processing (S1801). The plan dialogue control processing is for executing plans.

Figure 26:
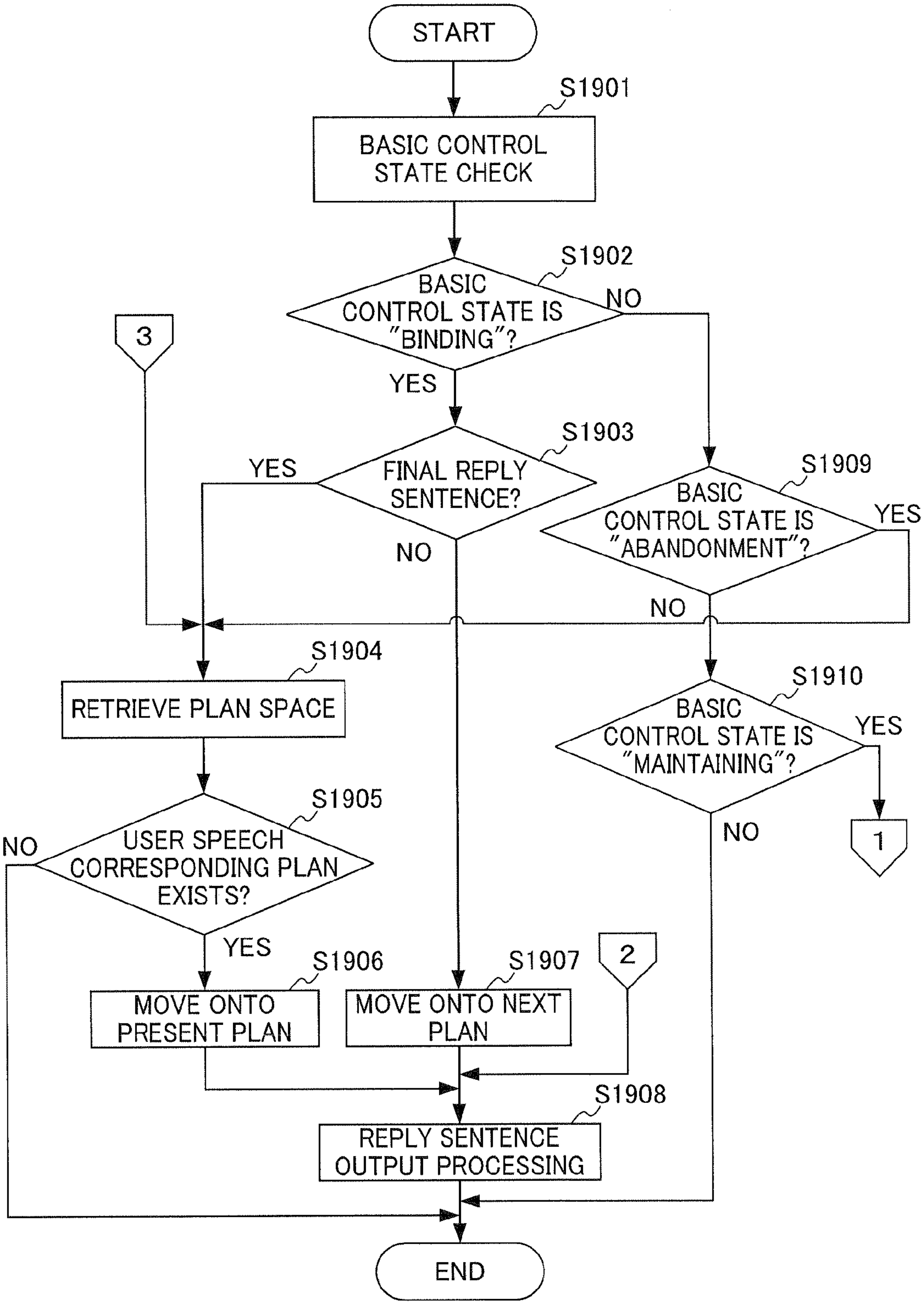
FIG. 26 is a flow chart showing an example of plan dialogue control processing.
Figure 27:
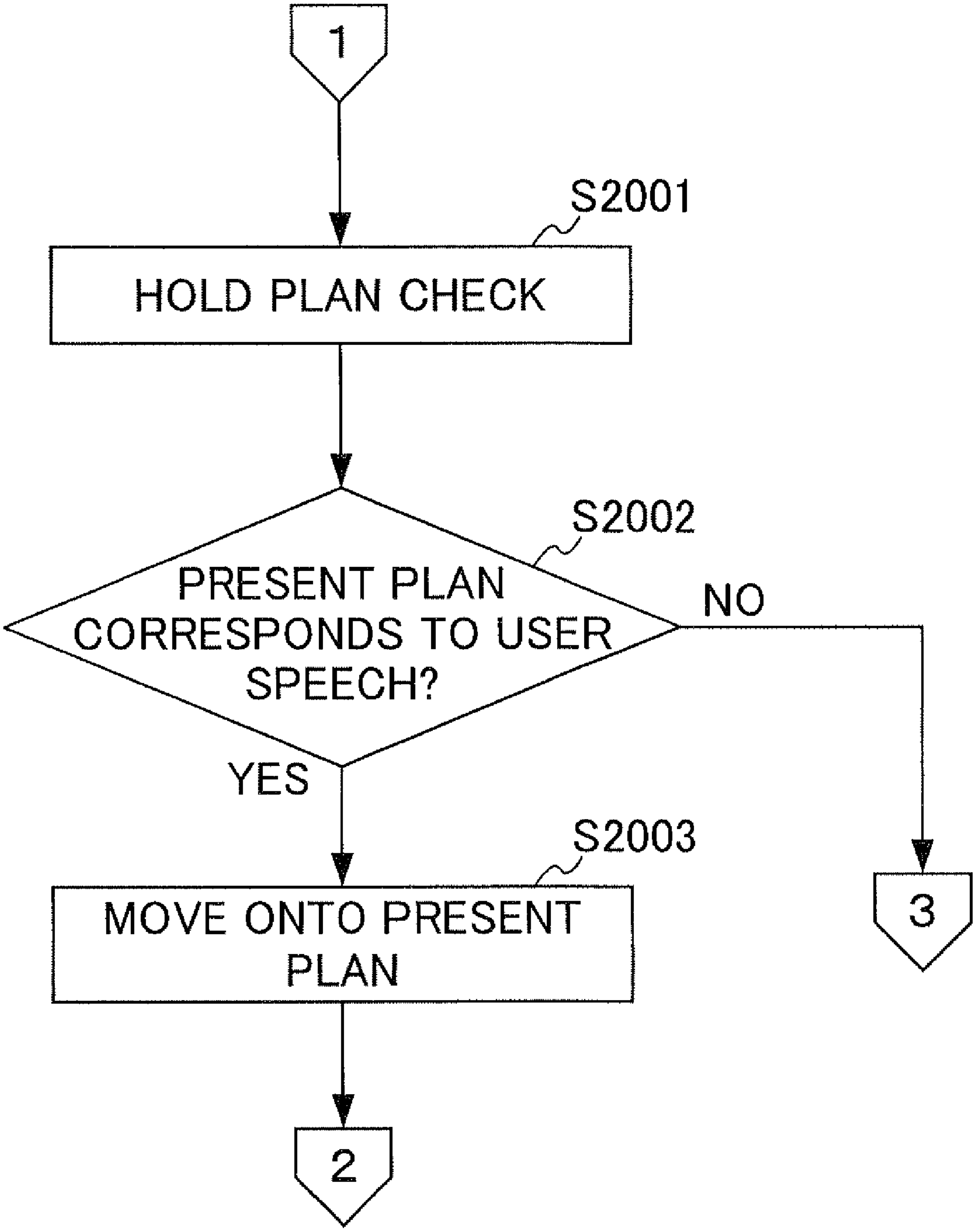
FIG. 27 is a flow chart showing the example of the plan dialogue control processing subsequent to FIG. 25.

FIGS. 26 and 27 are flow charts showing an example of the plan dialogue control processing. An example of the plan dialogue control processing is described with reference to FIGS. 26 and 27.

When the plan dialogue processing is started, the plan dialogue processing section 1320 firstly checks basic control state information (S1901). As the basic control state information, information as to whether or not the plan 1402 has been executed is stored in a predetermined storage region. The basic control state information has a function of describing the basic control state of a plan.

Figure 28:
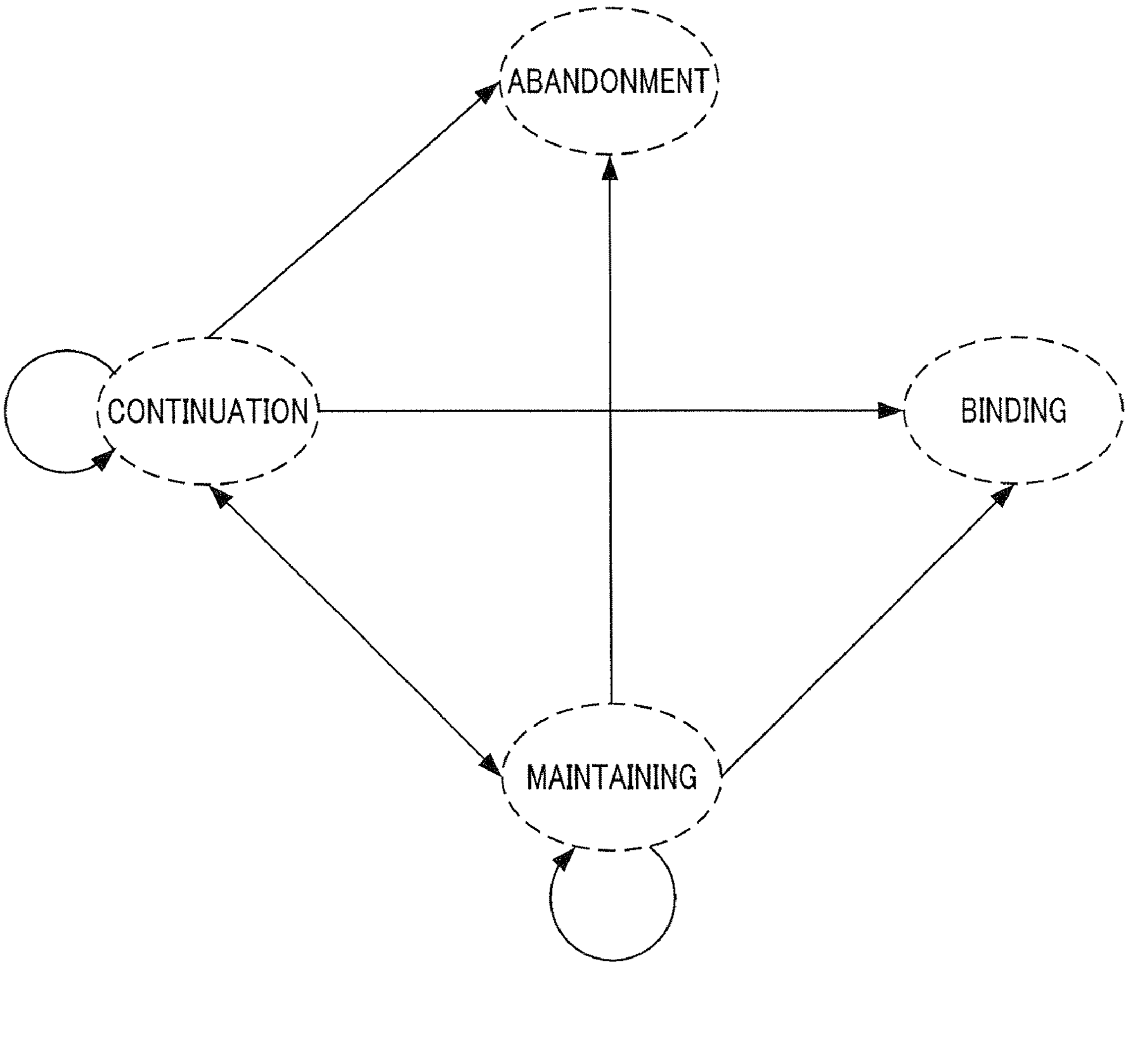
FIG. 28 is a diagram showing a basic control state.

FIG. 28 is a diagram showing four basic control states which can occur in the plan of a type called scenario. These basic control states are described below.

(1) Binding

The basic control state "binding" occurs when the user's speech matches the execution plan 1402; more specifically, the topic title 1820 and the example sentence 1701 correspond to the plan 1402. When the binding occurs, the plan dialogue processing section 1320 terminates the present plan 1402 and moves onto a plan 1402 corresponding to a reply sentence 1501 designated by the next plan designation information 1502.

(2) Abandonment

The basic control state "abandonment" is set when determined that the user's speech requests for termination of the plan 1402, or when the user's interest is turned to a matter other than the execution plan. When the basic control state information indicates "abandonment," the plan dialogue processing section 1320 retrieves the plans 1402 other than the abandoned plan 1402 to find a plan 1402 associated with the user's speech. When such a plan 1402 is found, the execution thereof is started. When nothing is found, the plan execution is terminated.

(3) Maintaining

The basic control state "maintaining" is described in the basic control state information when determined that the user's speech corresponds to neither the topic title 1820 (refer to FIG. 20) nor the example sentence 1701 (refer to FIG. 24), and the user's speech does not correspond to the basic control state "abandonment."

In the basic control state "maintaining," upon acceptance of the user's speech, the plan dialogue processing section 1320 firstly considers whether to resume the paused or stopped plan 1402. When the user's speech is unsuitable to resume the plan 1402, for example, when the user's speech is associated with neither the topic title 802 nor the example sentence 1702 corresponding to the plan 1402, the plan dialogue processing section 1320 starts to execute another plan 1402 or perform chat space dialogue control processing described later (S1902) When the user's speech is suitable to resume the plan 1402, the plan dialogue processing section 1320 outputs a reply sentence 1501 based on the stored next plan designation information 1502.

When the basic control state is "maintaining," in order to output reply sentences other than the reply sentence 1501 corresponding to the abovementioned plan 1402, the plan dialogue processing section 1320 retrieves other plans 1402 or performs the chat space dialogue control processing described later. On the other hand, when the user's speech is again related to a plan 1402, the plan dialogue processing section 1320 resumes the execution of the plan 1402.

(4) Continuation

The basic control state "continuation" is set when judged that the user's speech does not correspond to any reply sentences 1501 included in the execution plan 1402, and the user's speech does not correspond to the basic control state "abandonment," and the user's intention interpretable from the user's speech is unclear.

In the basic control state "continuation," upon acceptance of the user's speech, the plan dialogue processing section 1320 firstly considers whether to resume the paused or stopped plan 1402. When the user's speech is unsuitable to resume the plan 1402, the plan dialogue processing section 1320 performs CA dialogue control processing described later and the like in order to output a reply sentence to urge the user's continued speech.

Returning to FIG. 26, the description of the plan dialogue control processing is continued. After referring to the basic control state information, the plan dialogue processing section 1320 determines whether the basic control state indicated by the basic control state information is "binding" (S1902). When the judgment result is "binding" (YES in S1902), the plan dialogue processing section 1320 determines whether the reply sentence 1501 is the final reply sentence in the execution plan 1402 indicated by the basic control state information (S1903).

When the judgment result is the output completion of the final reply sentence 1501 (YES in S1903), all the contents to be replied to the user in the present plan 1402 have been transferred. Therefore, in order to judge whether to start another plan 1402, the plan dialogue processing section 1320 retrieves whether any plan 1402 associated with the user's speech is present in the plan space (S1904) When the retrieval result is the absence of such a plan 1402 (NO in S1905), there is no plan 1402 to be provided to the user. Therefore, the plan dialogue processing section 1320 directly terminates the plan dialogue control processing.

On the other hand, when the retrieval result is the presence of such a plan 1402 (YES in S1905), the plan dialogue processing section 1320 moves onto this plan 1402 (S1906). This is because, by the presence of the plan 1402 provided to the user, the section 1320 starts the execution of this plan 1402 (the output of a reply sentence 1501 included in this plan 1402).

Then, the plan dialogue processing section 1320 outputs the reply sentence 1501 of the above plan 1402 (S1908). The outputted reply sentence 1501 becomes the reply to the user's speech, so that the plan dialogue processing section 1320 provides proper information to the user. After the reply sentence output processing (S1908), the plan dialogue processing section 1320 terminates the plan dialogue control processing.

On the other hand, when in the judgment as to whether the previously outputted reply sentence 1501 is the final reply sentence 1501 (S1903), it is not the final (NO in S1903), the plan dialogue processing section 1320 moves onto the plan 1402 that follows the previously outputted reply sentence 1501: namely, a reply sentence specified by the next plan designation information 1502 (S1907).

Thereafter, the plan dialogue processing section 1320 replies to the user's speech by outputting a reply sentence 1501 included in the above plan 1402. The outputted reply sentence 1501 becomes the reply to the user's speech, so that the plan dialogue processing section 1320 provides proper information to the user. After the reply sentence output processing (S1908), the plan dialogue processing section 1320 terminates the plan dialogue control processing.

Meanwhile, when in the judgment processing in S1902, the basic control state is not "binding" (NO in S1902), the plan dialogue processing section 1320 judges whether the basic control state indicated by the basic control state information is "abandonment" (S1909). When the judgment result is "abandonment" (YES in S1909), there is no plan 1402 to be continued. Therefore, in order to judge whether there is a new other plan 1402 to be started, the plan dialogue processing section 1320 retrieves whether any plan 1402 associated with the user's speech is present in the plan space 1401 (S1904). Thereafter, similarly to the abovementioned processing in the case of YES in S1903, the plan dialogue processing section 1320 executes the processing from S1905 to S1908.

On the other hand, when in the judgment as to whether the basic control state indicated by the basic control state information is "abandonment" (S1909), the judgment result is not "abandonment" (NO in S1909), the plan dialogue processing section 1320 determines whether the basic control state indicated by the basic control information is "maintaining" (S1910).

When the judgment result is "maintaining" (YES in S1910), the plan dialogue processing section 1320 checks whether the user's attention is directed to the paused or stopped plan 1402. If so, the plan dialogue processing section 1320 operates to resume the paused or stopped plan 1402. That is, the plan dialogue processing section 1320 checks the paused or stopped plan 1402 (S2001 in FIG. 27) to judge whether the user's speech is associated with the paused or stopped plan 1402 (S2002).

When the user's speech is judged as being associated with this plan 1402 (YES in S2002), the plan dialogue processing section 1320 moves onto the plan 1402 associated with the user's speech (S2003), and then executes reply sentence output processing (S1908 in FIG. 26) to output a reply sentence 1501 included in this plan 1402. This operation enables the plan dialogue processing section 1320 to resume the paused or stopped plan 1402 in response to the user's speech, and transfers all of the contents contained in the prepared plan 1402 to the user.

On the other hand, when in the above step S2002 (refer to FIG. 27), the paused or stopped plan 1402 is determined as not being associated with the user's speech (NO in S2002), in order to judge whether there is a new other plan 1402 to be started, the plan dialogue processing section 1320 retrieves whether any plan 1402 associated with the user's speech is present in the plan space 1401 (S1904 in FIG. 26). Similarly to the processing in the case of YES in S1903, the plan dialogue processing section 1320 executes the processing from S1905 to S1909.

When in S1910, the basic control state indicated by the basic control state information is determined as not "maintaining" (NO in S1910), this indicates "continuation." In this case, the plan dialogue processing section 1320 terminates the plan dialogue control processing without outputting any reply sentence. Thus, the description of the plan dialogue control processing is completed.

Returning to FIG. 25, the description of the main processing is continued. Upon the termination of the plan dialogue control processing (S1801), the dialogue control section 1300 starts chat space dialogue control processing (S1802). However, when a reply sentence is outputted in the plan dialogue control (S1801), the dialogue control section 1300 performs neither the chat space dialogue control processing (S1802) nor the CA dialogue control processing described later (S1803), and performs basic control information update processing (S1904) and terminates the main processing.

Figure 29:
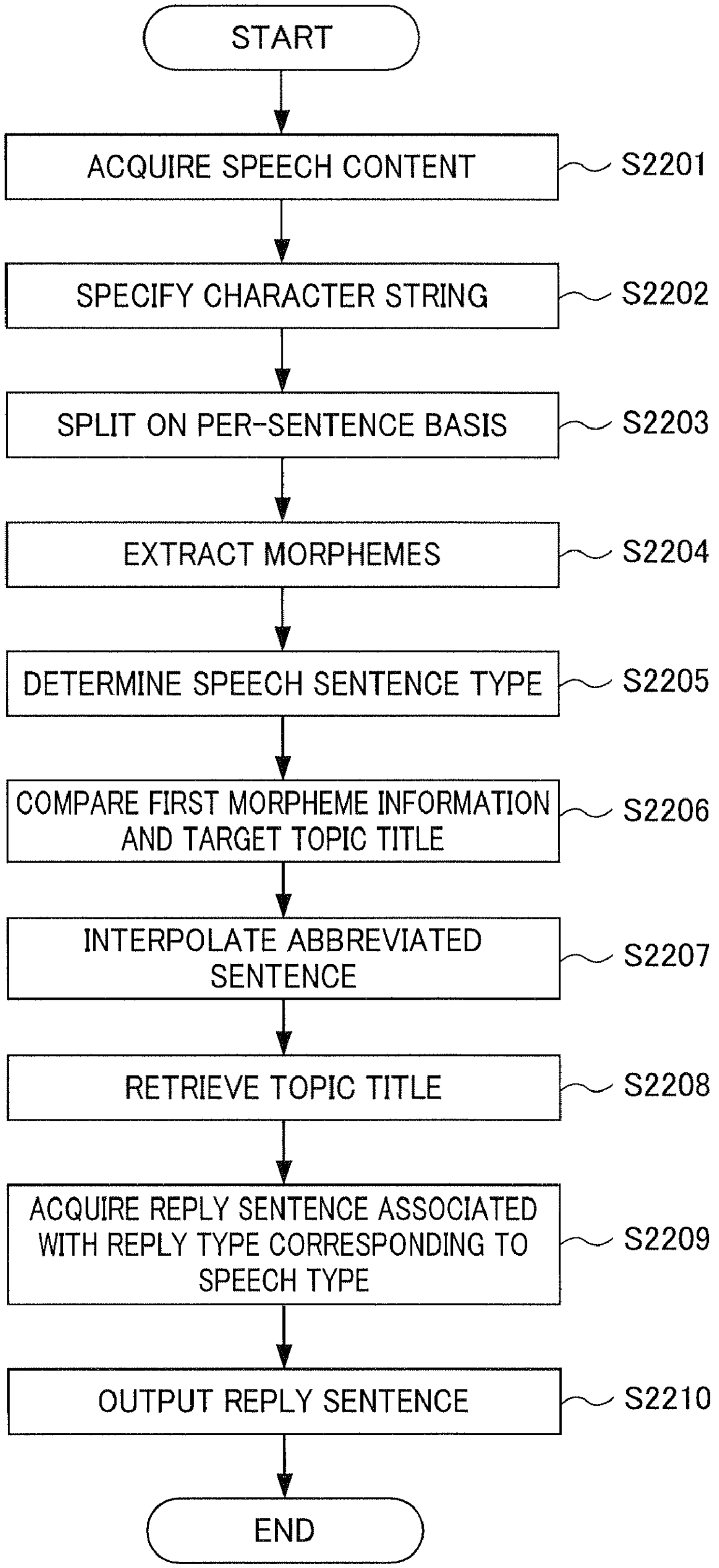
FIG. 29 is a flowchart showing an example of chat space dialogue control processing.

FIG. 29 is a flowchart showing an example of the chat space dialogue control processing according to the present embodiment. Firstly, the input section 1100 acquires the user's speech content (Step S2201). Specifically, the input section 1100 collects, through the microphone 60, the sounds constituting the user's speech. The input section 1100 outputs the collected sounds as voice signals to the voice recognition section 1200. Alternatively, the input section 1100 may acquire a character string inputted by the user (e.g., character data inputted in text format), instead of the user's sounds. In this case, the input section 1100 functions as a character input device such as a keyboard or a touch panel, instead of the microphone 60.

Based on the speech content acquired by the input section 1100, the voice recognition section 1200 performs the step of specifying the character string (Step S2202). More specifically, based on the voice signals inputted thereto from the input section 1100, the voice recognition section 1200 specifies a word hypothesis (candidate) corresponding to the voice signals. The voice recognition section 1200 acquires the character string corresponding to the specified word hypothesis (candidate), and outputs the acquired character string as a character string signal to the dialogue control section 1300: more specifically, the chat space dialogue control processing section 1330.

Then, the character string specifying section 1410 performs the step of splitting the specified series of character strings on a per sentence basis (Step S2203). More specifically, the character string signals (or morpheme signals) are inputted from the management section 1310 to the character string specifying section 1410. When a time interval exceeding a certain value is present in the inputted series of character strings, the character string specifying section 1410 splits the character string at this position. The character string specifying section 1410 outputs the split individual character strings to the morpheme extraction section 1420 and the input type judgment section 1440. When a character string is inputted from the keyboard, the character string specifying section 1410 preferably splits the character string at the position of a comma or space.

Thereafter, based on the character string specified by the character string specifying section 1410, the morpheme extraction section 1420 performs the step of extracting the individual morphemes constituting the minimum units of the character string, as first morpheme information (Step S2204). More specifically, the morpheme extraction section 1420 collates the character string inputted from the character string specifying section 1410, with the morpheme group prestored in the morpheme database 1430. In the present embodiment, the morpheme group is prepared as a morpheme dictionary in which the individual morphemes belonging to the corresponding part-of-speech classification are described along with an index term, pronunciation, part-of-speech, conjugated form and the like. After performing the collation, the morpheme extraction 1420 extracts from the character string the morphemes (m1, m2 . . . ) corresponding to any one of the prestored morpheme groups. The morpheme extraction section 1420 outputs the extracted morphemes as first morpheme information, to the topic specifying information retrieval section 1350.

Then, the input type judgment section 1440 performs the step of determining "speech sentence type" based on the individual morphemes constituting the sentence specified by the character string specifying section 1410 (Step S2205). More specifically, the input type judgment section 1440, to which the character string has been inputted from the character string specifying section 1410, collates the inputted character string with the individual dictionaries stored in the speech type database 1450, and extracts elements related to the individual dictionaries from the character string. After extracting these elements, the input type judgment section 1440 determines the correspondence between these extracted elements and "speech sentence types," respectively. The input type judgment section 1440 outputs the judged "speech sentence types" (speech types) to the reply acquisition section 1380.

Then, the topic specifying information retrieval section 1350 performs the step of comparing the first morpheme information extracted by the morpheme extraction section 1420 with a marked topic title 1820 focus (Step S2206). When a match is found between the former and the latter, the topic specifying information retrieval section 1350 outputs the topic title 1820 to the reply acquisition section 1380. On the other hand, when no match is found between the former and the latter, the topic specifying information retrieval section 1350 outputs the inputted first morpheme information and the user input sentence specifying information as a retrieval instruction signal to the abbreviate sentence interpolation section 1360.

Then, based on the first morpheme information inputted from the topic specifying information retrieval section 1350, the abbreviate sentence interpolation section 1360 performs the step of incorporating the marked topic specifying information and the reply sentence topic specifying information into the inputted first morpheme information (Step S2207). More specifically, when the first morpheme information is "W" and the aggregation of the marked topic specifying information and the reply sentence topic specifying information is "D," the abbreviated sentence interpolation section 1360 generates the interpolated morpheme information by incorporating the elements of the aggregation "D" into the first morpheme information "W." and collates the interpolated first morpheme information with all topic titles 1820 associated with the aggregation "D," and retrieves whether there is a topic title 1820 matching with the interpolated first morpheme information. When such a topic title 1820 is found, the abbreviate sentence interpolation section 1360 outputs this topic title 1820 to the reply acquisition section 1380. On the other hand, when such a topic title 1820 is not found, the abbreviate sentence interpolation section 1360 transfers the first morpheme information and the user input sentence topic specifying information to the topic retrieval section 1370.

Then, the topic retrieval section 1370 performs the step of collating the first morpheme information with the user input sentence topic specifying information, and retrieving a topic title 1820 suitable for the first morpheme information from among the individual topic titles 1820 (Step S2208). More specifically, the retrieval instruction signal is inputted from the abbreviated sentence interpolation section 1360 to the topic retrieval section 1370. Based on the user input sentence topic specifying information and the first morpheme information contained in the inputted retrieval instruction signal, the topic retrieval section 1370 retrieves a topic title 1820 suitable for the first morpheme information from among the individual topic titles 1820 associated with the user input sentence topic specifying information. The topic retrieval section 1370 outputs the topic title 1820 obtained by the retrieval, as a retrieval result signal, to the reply acquisition section 1380.

Based on the topic title 1820 retrieved by the topic specifying information retrieval section 1350 or the abbreviated sentence interpolation section 1360 or the topic retrieval section 1370, the reply acquisition section 1380 collates the user's speech type determined by the sentence analysis section 1400 with the individual reply types associated with the topic title 1820, and selects a reply sentence 1830 (Step S2209).

More specifically, the reply sentence 1830 is selected in the following manner. That is, the retrieval result signal from the topic retrieval section 1370 and the "speech sentence type" from the input type judgment section 1440 are inputted to the reply acquisition section 1380. Based on the "topic title" corresponding to the inputted retrieval result signal and the inputted "speech sentence type," the reply acquisition section 1380 specifies a reply type matching with the "speech sentence type" (DA or the like) from among the reply type group associated with this "topic title."

Then, the reply acquisition section 1380 outputs the reply sentence 1830 acquired in Step S2209, through the management section 1310 to the output section 1600 (Step S2210). Upon the receipt of the reply sentence from the management section 1310, the output section 1600 outputs the inputted reply sentence 1830.

Thus, the description of the chat space dialogue control processing is completed. Returning to FIG. 25, the description of the main processing is resumed. The dialogue control section 1300 terminates the chat space dialogue control processing, and then executes the CA dialogue control processing (S1803). However, the reply sentence output is performed in the plan dialogue control processing (S1801) and the chat space dialogue control processing (S1801), and the dialogue control section 1300 does not perform the CA dialogue control processing (S1803), but performs the basic control information update processing (S1804) to terminate the main processing.

The CA dialogue control processing (S1803) is to determine whether the user's speech is "explaining something," "confirming something, "attacking or reproaching" or "others than these," and outputs a reply sentence in accordance with the user's speech content and the judgment result. Even if neither the plan dialogue control processing nor the chat space dialogue control processing can output a reply sentence suitable for the user's speech, the execution of the CA dialogue control processing enables the output of a reply sentence to achieve a continuous dialogue flow with the user, i.e. a so-called "connector."

Figure 30:
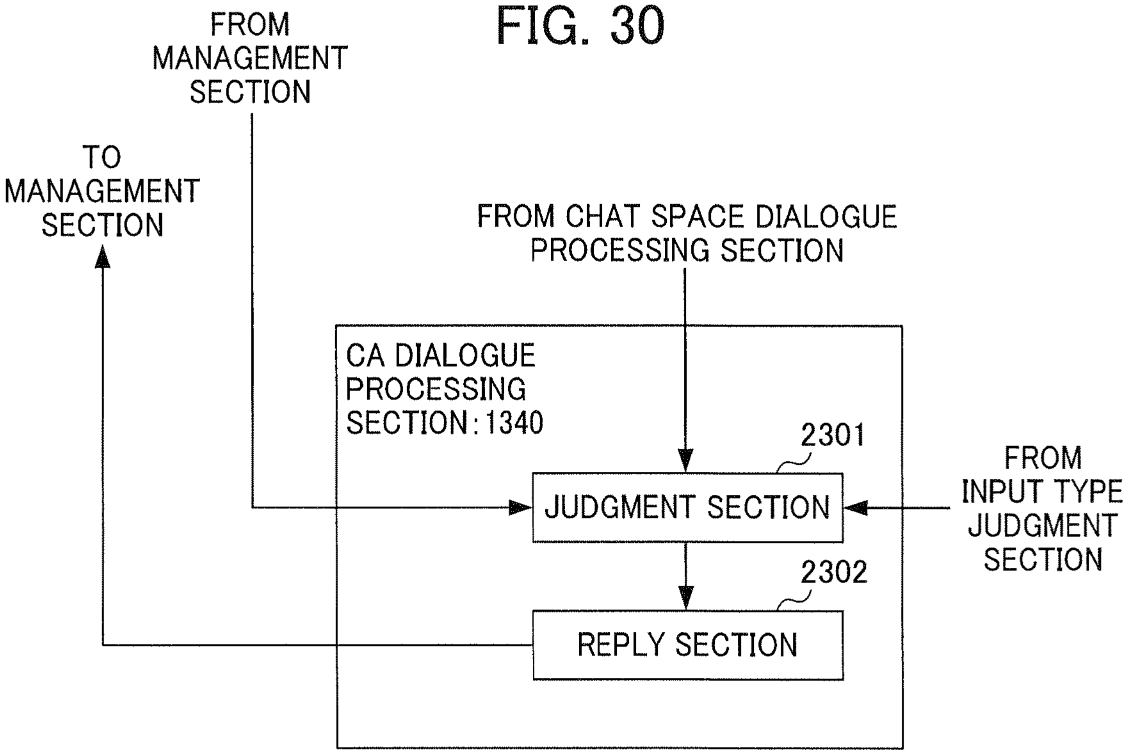
FIG. 30 is a functional block diagram showing a configuration example of a CA dialogue processing unit.

FIG. 30 is a functional block diagram showing an example of the configuration of the CA dialogue processing section 1340. The CA dialogue processing section 1340 has a judgment section 2301 and a reply section 2302. The judgment section 2301 receives a user speech sentence from the management section 1310 or the chat space dialogue control processing section 1330, and also receives a reply sentence output instruction. This reply sentence output instruction is generated when neither the plan dialogue processing section 20 nor the chat space dialogue control processing section 1330 will or can output a reply sentence. The judgment section 2301 receives the input type, namely the user's speech type (refer to FIG. 29), from the sentence analysis section 1400 (more specifically, the input type judgment section 1440). Based on this, the judgment section 2301 judges the user's speech intention. For example, when the user's speech is the sentence "I like horse," based on the facts that the independent words of "horse" "like" included in this sentence, and the user's speech type is declaration acknowledgement (DA), the judgment section 2301 judges that the user described "horses" and "like."

In response to the judgment result from the judgment section 2301, the reply section 2302 determines and outputs a reply sentence. In this example, the reply section 2302 has an explanatory dialogue corresponding sentence table, a confirmative dialogue corresponding sentence table, an attacking or reproaching dialogue corresponding sentence table and a reflective dialogue table.

The explanatory dialogue corresponding sentence table is a table storing a plurality of types of reply sentences to be outputted as a reply to the case where the user's speech is determined to be explaining something. As an example of the reply sentence, a reply sentence is prepared so as not to be asked once more, such as "Oh, really?"

The confirmative dialogue corresponding sentence table is a table storing a plurality of types of reply sentences to be outputted as a reply to the case where the user's dialogue is determined to be confirming or inquiring something. As an example of the reply sentence, a reply sentence is prepared so as not to be asked once more, such as "I can't really say."

The attacking or reproaching dialogue corresponding sentence table is a table storing a plurality of types of reply sentences to be outputted as a reply to the case where the user's dialogue is determined to be attacking or reproaching the dialogue control circuit. As an example of the reply sentence, there is prepared a reply sentence, such as "I am sorry."

In the reflective dialogue table, reply sentences are prepared such as a user's speech "I am not interested in '*'". Here, the symbols '*' indicate to store an independent word included in the user's speech.

The reply section 2302 determines a reply sentence by referring to the explanatory dialogue corresponding sentence table, the confirmative dialogue corresponding sentence table, the attacking or reproaching dialogue corresponding sentence table and the reflective dialogue sentence table, and transfers the determined reply sentence to the management section 1310.

Figure 31:
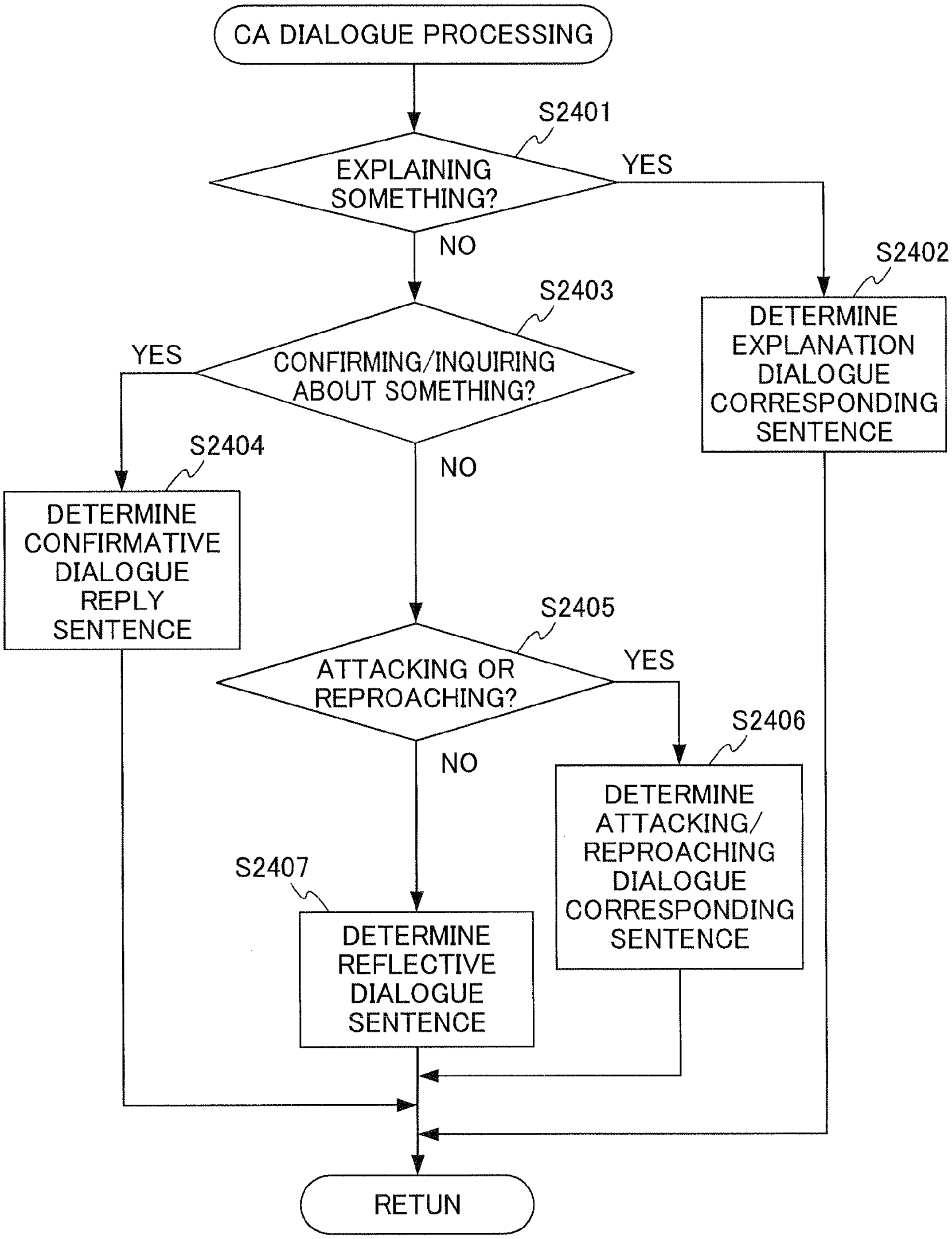
FIG. 31 is a flowchart showing an example of CA dialogue processing.

Next, a specific example of the CA dialogue processing (S1803) to be executed by the abovementioned CA dialogue processing section 1340 is described below. FIG. 31 is a flow chart showing the specific example of the CA dialogue processing. As described earlier, when a reply sentence output is performed in the plan dialogue control processing (S1801) and the chat space dialogue control processing (S1802), the dialogue control section 1300 does not perform the CA dialogue control processing (S103). That is, the CA dialogue control processing (S1003) performs a reply sentence output only when a reply sentence output is held in the plan dialogue control processing (S1801) and the chat space dialogue control processing (S1802).

In the CA dialogue processing (S1803), the CA dialogue processing section 1340 (the judgment section 2301) firstly determines whether the user's speech is explaining something (S2401). If the judgment result is positive (YES in S2401), the CA dialogue processing section 1340 (the reply section 2302) determines a reply sentence by way of referring to the explanatory dialogue corresponding sentence table, or the like (S2402).

On the other hand, if the judgment result is negative (NO in S2401), the CA dialogue processing section 1340 (the judgment section 2301) determines whether the user's speech is confirming or inquiring about something (S2404). If the judgment result is positive (YES in S2403), the CA dialogue processing section 1340 (the reply section 2302) determines a reply sentence by way of referring to the confirmative dialogue corresponding sentence table, or the like (S2404).

On the other hand, if the judgment result is negative (NO in S2403), the CA dialogue processing section 1340 (the judgment section 2301) determines whether the user's speech is an attacking or reproaching sentence (S2405). If the judgment result is positive (YES in S2405), the CA dialogue processing section 1340 (the reply section 2302) determines a reply sentence by way of referring to the attacking or reproaching dialogue corresponding sentence table, or the like (S2406).

On the other hand, if the judgment result is negative (NO in S2405), the CA dialogue processing section 1340 (the judgment section 2301) requests the reply section 2302 to determine a reflective dialogue reply sentence. In response to this, the CA dialogue processing section 1340 (the reply section 2302) determines a reply sentence by way of referring to the reflective dialogue corresponding sentence table, or the like (S2407).

Thus, the CA dialogue processing (S1903) is terminated. Due to the CA dialogue processing, the dialogue control circuit 1000 can generate a reply to permit maintaining the dialogue establishment in response to the user's speech state.

Returning to FIG. 25, the description of the main processing of the dialogue control section 1300 is continued. Upon the termination of the CA dialogue processing (S1803), the dialogue control section 1300 performs basic control information update processing (S1804). In this processing, the dialogue control section 1300, more specifically the management section 1310, sets the basic control information to "binding" when the plan dialogue processing section 1320 performs a reply sentence output, sets the basic control information to "abandonment" when the chat space dialogue processing section 1330 performs a reply sentence output, and sets the basic control information to "continuation" when the CA dialogue processing section 1340 performs a reply sentence output.

The basic control information set by the basic control information update processing is referred to and used for the plan continuation or resuming in the abovementioned plan dialogue control processing (S1801).

Thus, by executing the main processing whenever the user's speech is accepted, the dialogue control circuit 1000 can perform the prepared plan in response to the user's speech, and also reply suitably to any topic not included in the plan.

B. Second Type of Dialogue Control Circuit

The second type of dialogue control circuit applicable as the dialogue control circuit 1000 is described below. The second type of dialogue control circuit is capable of handling a plan called forced scenario, which is a plan to output predetermined reply sentences in a predetermined order, irrespective of the user's speech content. The second type of dialogue control circuit has substantially the same configuration as the first type of dialogue control circuit shown in FIG. 8. Similar reference numerals are used to describe similar components. In this dialogue control circuit, at least part of the plans 1402 stored in the dialogue database 1500 are N plans storing, for example, the first to the Mth reply sentences sequentially outputted. The Mth plan in these N plans has candidate designation information to designate the M+1th reply sentence (M and N are integers, and $1 \leqq M \leqq N$). In the following, a description of the second type of dialogue control circuit is made only of the parts different from the first type of dialogue control circuit, and its configuration and operation similar thereto are omitted here.

FIG. 32 shows a specific example of a plan 1402 of the type called forced scenario. The series of plans 1402$_{11}$ to 1402$_{16}$ correspond to reply sentences 1501$_{11}$ to 1501$_{16}$ constituting a questionnaire related to horses. The user's speech character strings 1701$_{11}$ to 1701$_{16}$ are represented by the symbol "*", and the symbol "*" also indicates to correspond to all users.

In this example, the plan 1402$_{10}$ in FIG. 32 becomes an opportunity to start the forced scenario, and is not regarded as a part of the forced scenario.

These plans 1402$_{10}$ to 1402$_{16}$ have ID data 1702$_{10}$ to 1702$_{16}$: namely, "2000-01," "2000-02," "2000-03," "2000-04," "2000-05," "2000-06" and "2000-07," respectively. These plans 1402$_{10}$ to 1402$_{16}$ have next plan designation information 1502$_{10}$ to 1502$_{16}$, respectively. The content of the next plan designation information 1502$_{16}$ is the data "2000-0F", where the number and alphabet "0F" after the hyphen is the information indicating that there is no plan to be outputted next and this reply sentence is the end of the questionnaire.

In the present example, in the course of the dialogue between the user and the dialogue control circuit, when the user generates (or inputs) the user's speech "I want a horse," the plan dialogue processing section 1320 starts to execute the abovementioned series of plans. That is, when the dialogue control circuit, more specifically the plan dialogue processing section 1320, accepts the user's speech "I want a horse," the plan dialogue processing section 1320 retrieves the plan space 1401 to check whether there is a plan 1402 having a reply sentence 1501 associated with the user's speech "I want a horse."

In the present example, it is assumed that the user's speech character string 1701$_{10}$ corresponds to the plan 1402$_{10}$.

When the plan 1402$_{10}$ is found, the plan dialogue processing section 1320 acquires the reply sentence 1501$_{10}$ included in the plan 1402$_{10}$, and outputs the reply sentence 1501$_{10}$ as the reply to the user's speech, "Please answer a simple questionnaire. There are five questions. Please input 'I will answer the questionnaire' if you agree." The plan dialogue processing section 1320 also designates the next candidate reply sentence based on the next plan designation information 1502$_{10}$. In the present example, the next plan designation information 1502$_{10}$ contains the ID data "2000-02." The plan dialogue processing section 1320 stores and holds the reply sentence of the plan 1402$_{11}$ corresponding to the ID data "2000-02" as the next candidate reply sentence.

With respect to the abovementioned reply sentence, "Please answer a simple questionnaire. There are five questions. Please input "I will answer the questionnaire" if you agree," when the user's reply, namely the user's speech is not "I will answer the questionnaire," the plan dialogue processing section 1320 or the chat space dialogue control processing section 330 or the CA dialogue processing section 1340 performs a certain reply sentence output to the user's speech, and the questionnaire is not started.

On the other hand, when the user's speech is "I will answer the questionnaire," the plan dialogue processing section 1320 selects and performs the plan 1402$_{11}$ designated as the next candidate reply sentence. That is, the plan dialogue processing section 1320 outputs a reply as the reply sentence 1501$_{11}$ included in the plan 1402$_{11}$, and specifies the next candidate reply sentence based on the reply sentence 1501$_{11}$ included in the plan 1402$_{11}$. In the present example, the next plan specifying information 1502$_{11}$ contains the ID data "2000-03." The plan dialogue processing section 1320 uses, as the next candidate reply sentence, a reply sentence included in the plan 1402$_{12}$ corresponding to the ID data "2000-03." Thus, the execution of the questionnaire as the forced scenario is started.

When the user generates a reply to the reply sentence outputted from the dialogue control circuit, "Thank you. This is the first question. Would you choose to buy a young horse or an old horse?" the plan dialogue processing section 1320 selects and performs the plan 1402$_{12}$ designated as the next candidate reply sentence. That is, the plan dialogue processing section 1320 outputs a reply, "The second question. Would you prefer a Japanese horse or a foreign horse?" as the reply sentence 1501$_{12}$ included in the plan 1401$_{12}$, and specifies the next candidate reply sentence based on the next plan designating information 1502$_{12}$ included in the plan 1402$_{12}$. In the present example, the next plan designation information 1502$_{12}$ is the ID "2000-04," and the plan 1402$_{13}$ having this ID is selected as the next candidate reply sentence.

In the plan of the type called forced scenario, all of the contents of the user' speech character string 1701 are a description "*" indicating the user's speech content. Therefore, irrespective of the user's speech content, the plan dialogue processing section 1320 executes the selected plan. For example, even if the user's speech seems not to be the answer to the questionnaire, such as "I do not know." and "Let's stop.", the output of the reply sentence as the next question is continued.

Thereafter, whenever the user's speech is accepted, the dialogue control circuit, more specifically the plan dialogue processing section 1320, sequentially performs the execution of the plan $\mathbf{1402}_{13}$, the plan $\mathbf{1402}_{14}$, the plan $\mathbf{1402}_{15}$ and the plan $\mathbf{1402}_{16}$, irrespective of the user's speech content. That is, whenever the user's speech is accepted, the dialogue control circuit, the dialogue control circuit, more specifically the plan dialogue processing section 1320, sequentially outputs, irrespective of the user's speech content, "The third question. What type of horse would you like? A pureblood horse, a thoroughbred horse, a light type or a pony?" "The fourth question. How much would you pay for it?" and "The fifth question. If you bought a horse, when would you buy it? That is all. Thank you very much." which corresponds to the reply sentences $\mathbf{1501}_{13}$ to $\mathbf{1501}_{16}$ of the plan $\mathbf{1402}_{13}$, the plan $\mathbf{1402}_{14}$, the plan $\mathbf{1402}_{15}$ and the plan $\mathbf{1402}_{16}$, respectively.

From the next plan specification information $\mathbf{1502}_{16}$ included in the plan $\mathbf{1402}_{16}$, the plan dialogue processing section 1320 recognizes the present reply sentence as the end of the questionnaire, and terminates the plan dialogue processing.

FIG. 33 is a diagram showing another example of the plan of the type called forced scenario.

The example shown in FIG. 32 is a dialogue control mode in which the questions of the questionnaire are advanced irrespective of whether or not the user's speech is the reply to the questionnaire. On the other hand, the example shown in FIG. 33 is a dialogue control mode in which the procedure advances to the next question of the questionnaire only when the user's speech is the reply to the questionnaire, and if not, the question is repeated in order to acquire the reply to the questionnaire.

Similar to the example of FIG. 31, the example shown in FIG. 32 is plans having reply sentences constituting a questionnaire related to horses. In this questionnaire, the plans corresponding to the first question (refer to the plan $\mathbf{1402}_{11}$ in FIG. 31), the second question (refer to the plan $\mathbf{1402}_{12}$ in FIG. 31) and the third question (refer to the plan $\mathbf{1402}_{13}$ in FIG. 31) are shown, and the plans corresponding to the fourth and the succeeding questions are omitted. The user's speech character string $\mathbf{1701}_{24}$ is data indicating that the user's speech is neither "a young horse" nor "an old horse." Similarly, the user's speech character string $\mathbf{1701}_{27}$ is data indicating that the user's speech is neither "a Japanese horse" nor "a foreign horse."

It is assumed in the example shown in FIG. 33 that the user's speech "I will reply to the questionnaire." is generated. Upon this, the plan dialogue processing section 1320 retrieves the plan space 1401 and finds a plan $\mathbf{1402}_{21}$. The plan dialogue processing section 1320 then acquires a reply sentence $\mathbf{1501}_{21}$ included in the plan $\mathbf{1402}_{21}$, and as the reply to the user's speech, outputs the reply sentence $\mathbf{1501}_{21}$ "Thank you. This is the first question. Would you choose to buy a young horse or an old horse?" The plan dialogue processing section 1320 also specifies the next candidate reply sentence based on the next plan designation information $\mathbf{1502}_{21}$. In the present example, the next plan designation information $\mathbf{1502}_{21}$ contains three ID data "2000-02," "2000-03" and "2000-04." The plan dialogue processing section 1320 stores and holds, as the next candidate reply sentences, the reply sentences of the plan $\mathbf{1402}_{22}$, the plan $\mathbf{1402}_{23}$ and the plan $\mathbf{1402}_{24}$ corresponding to these ID data "2000-02," "2000-03" and "2000-04," respectively.

When the user's speech "a young horse" is generated in response to the reply sentence outputted from the dialogue control circuit "Thank you. This is the first question. Would you choose to buy a young horse or an old horse?", the plan dialogue processing section 1320 selects and performs the plan $\mathbf{1402}_{22}$ having the user's speech character string $\mathbf{1701}_{22}$ associated with the user's speech, from among these three plans $\mathbf{1402}_{22}$, $\mathbf{1402}_{23}$ and $\mathbf{1402}_{24}$ designated as the next candidate reply sentences. That is, the plan dialogue processing section 1320 outputs the reply "The second question. Would you prefer a Japanese horse or a foreign horse?" that is the reply sentence $\mathbf{1501}_{22}$ included in the plan $\mathbf{1402}_{22}$, and specifies the next candidate reply sentence based on the next plan designation information $\mathbf{1502}_{22}$ included in the plan $\mathbf{1402}_{22}$. In the present example, the next plan designation information $\mathbf{1502}_{22}$ contains three ID data "2000-06" "2000-07" and "2000-08." The plan dialogue processing section 1320 uses, as the next candidate reply sentences, the reply sentences of these three plans $\mathbf{1402}_{25}$, $\mathbf{1402}_{26}$ and $\mathbf{1402}_{27}$ corresponding to the three ID data "2000-06," "2000-07" and "2000-08," respectively. That is, the dialogue control circuit completes the collection of "a young horse" as the answer to the first question of the questionnaire, and executes the dialogue control to advance to the second question.

On the other hand, when the user's speech "an old horse" is generated in response to the reply sentence outputted from the dialogue control circuit "Thank you. This is the first question. Would you choose to buy a young horse or an old horse?", the plan dialogue processing section 1320 selects and performs the plan $\mathbf{1402}_{23}$ having the user's speech character string $\mathbf{1701}_{23}$ associated with the user's speech, from among these three plans $\mathbf{1402}_{22}$, $\mathbf{1402}_{23}$ and $\mathbf{1402}_{24}$ designated as the next candidate reply sentences. That is, the plan dialogue processing section 1320 outputs the reply "The second question. Would you prefer a Japanese horse or a foreign horse?" that is the reply sentence $\mathbf{1501}_{22}$ included in the plan $\mathbf{1402}_{23}$, and specifies the next candidate reply sentence based on the next plan designation information $\mathbf{1502}_{23}$ included in the plan $\mathbf{1402}_{23}$. Similarly to the abovementioned next plan designation information $\mathbf{1502}_{22}$, the next plan designation information $\mathbf{1502}_{23}$ contains three ID data "2000-06" "2000-07" and "2000-08." The plan dialogue processing section 1320 uses, as the next candidate reply sentences, the reply sentences of these three plans $\mathbf{1402}_{25}$, $\mathbf{1402}_{26}$ and $\mathbf{1402}_{27}$ corresponding to the three ID data "2000-06," "2000-07" and "2000-08," respectively. That is, the dialogue control circuit completes the collection of "an old horse" as the answer to the first question of the questionnaire, and executes the dialogue control to advance to the second question.

On the other hand, when the user's speech is neither "a young horse" nor "an old horse," specifically when "I do not know." or "I do not care" is generated in response to the reply sentence outputted from the dialogue control circuit, "Thank you. This is the first question. Would you choose to buy a young horse or an old horse?", the plan dialogue processing section 1320 selects and performs the plan $\mathbf{1402}_{24}$ having the user's speech character string $\mathbf{1701}_{24}$ associated with the user's speech, from among these three plans $\mathbf{1402}_{22}$, $\mathbf{1402}_{23}$ and $\mathbf{1402}_{24}$ designated as the next candidate reply sentences. That is, the plan dialogue processing section 1320 outputs the reply "The first question. Would you prefer a young horse or an old horse?" that is the reply sentence $\mathbf{1501}_{24}$ included in the plan $1402_{24}$, and specifies the next candidate reply sentence based on the next plan designation information $1502_{24}$ included in the plan $1402_{24}$. In the present example, the next plan designation information $1502_{24}$ contains three ID data "2000-03" "2000-04" and "2000-05." The plan dialogue processing section 1320 uses, as the next candidate reply sentences, the reply sentences of the plan $1402_{22}$, the plan $1402_{23}$ and the plan $1402_{24}$ corresponding to the three ID data "2000-03," "2000-04" and "2000-05," respectively. That is, the dialogue control circuit executes the dialogue control to repeat the first question of the questionnaire to the user in order to collect the answer to the first question. In other words, the dialogue control circuit, more specifically the plan dialogue processing section 1320, repeats the first question to the user until the user generates either "a young horse" or "an old horse."

Next, a description is provided of the processing after the plan dialogue processing section 1320 executes the previous plan $1402_{22}$ or $1402_{23}$, and outputs the reply sentence "The second question. Would you prefer a Japanese horse or a foreign horse?". When the user's speech "a Japanese horse" is generated in response to the reply sentence outputted from the dialogue control circuit, "The second question. Would you prefer a Japanese horse or a foreign horse?", the plan dialogue processing section 1320 selects and performs the plan $1402_{25}$ having the user's speech character string $1701_{25}$ associated with the user's speech, from among these three plans $1402_{25}$, $1402_{26}$ and $1402_{27}$ designated as the next candidate reply sentences. Specifically, the plan dialogue processing section 1320 outputs the reply "The third question. What type of horse would you like? A pureblood horse, a thoroughbred horse, a light type or a pony?" would you prefer a Japanese horse or a foreign horse?" that is the reply sentence $1501_{25}$ included in the plan $1402_{25}$, and specifies the next candidate reply sentence based on the next plan designation information $1502_{25}$ included in the plan $1402_{25}$. In the present example, the next plan designation information $1502_{26}$ contains three ID data "2000-09" "2000-10" and "2000-11." The plan dialogue processing section 1320 uses, as the next candidate reply sentences, the reply sentences of three plans corresponding to the three ID data "2000-09," "2000-10" and "2000-11," respectively. That is, at this point, the dialogue control circuit completes the collection of "a Japanese horse" as the answer to the second question of the questionnaire, and executes the dialogue control so as to advance to the processing of acquiring an answer to the third question. These three plans corresponding to the three ID data "2000-09," "2000-10" and "2000-11" are omitted in FIG. 33.

On the other hand, when the user's speech "a foreign horse" is generated in response to the reply sentence outputted from the dialogue control circuit, "The second question. Would you prefer a Japanese horse or a foreign horse?", the plan dialogue processing section 1320 selects and performs the plan $1402_{26}$ having the user's speech character string $1701_{26}$ associated with the user's speech, from among these three plans $1402_{25}$, $1402_{26}$ and $1402_{27}$ designated as the next candidate reply sentences. That is, the plan dialogue processing section 1320 outputs the reply "The third question. What type of horse would you like? A pureblood horse, a thoroughbred horse, a light type or a pony?" that is the reply sentence $1501_{26}$ included in the plan $1402_{26}$, and specifies the next candidate reply sentence based on the next plan designation information $1502_{26}$ included in the plan $1402_{26}$. In the present example, the next plan designation information $1502_{26}$ contains three ID data "2000-09" "2000-10" and "2000-11." The plan dialogue processing section 1320 uses, as the next candidate reply sentences, the reply sentences of three plans corresponding to the three ID data "2000-09," "2000-10" and "2000-11," respectively. That is, the dialogue control circuit completes the receiving of "a foreign horse" as the answer to the second question of the questionnaire, and executes the dialogue control in order to advance to the processing of acquiring an answer to the third question.

On the other hand, when the user's speech is neither "a Japanese horse" nor "a foreign horse," specifically when "I do not know." or "I do not care." is generated in response to the reply sentence outputted from the dialogue control circuit, "The second question. Would you prefer a Japanese horse or a foreign horse?", the plan dialogue processing section 1320 selects and performs the plan $1402_{27}$ having the user's speech character string $1701_{27}$ associated with the user's speech, from among these three plans $1402_{25}$, $1402_{26}$ and $1402_{27}$ designated as the next candidate reply sentences. That is, the plan dialogue processing section 1320 outputs the reply "For now, please answer the second question. Would you prefer a Japanese horse or a foreign horse?" that is the reply sentence $1501_{27}$ included in the plan $1402_{27}$, and specifies the next candidate reply sentence based on the next plan designation information $1502_{27}$ included in the plan $1402_{27}$. In the present example, the next plan designation information $1502_{27}$ contains three ID data "2000-06" "2000-07" and "2000-08." The plan dialogue processing section 1320 uses, as the next candidate reply sentences, the reply sentences of these three plans $1402_{25}$, $1402_{26}$ and $1402_{27}$ corresponding to the three ID data "2000-06," "2000-07" and "2000-08," respectively. That is, the dialogue control circuit executes the dialogue control to repeat the second question of the questionnaire to the user in order to receive an answer to the second question. In other words, the dialogue control circuit, more specifically the plan dialogue processing section 1320, repeats the second question to the user until the user generates either "a Japanese horse" or "a foreign horse."

Thereafter, in the dialogue control mode as described above, the dialogue control circuit, more specifically the plan dialogue processing section 1320 performs collection of the third to fifth questions of the questionnaire.

The abovementioned second type of the dialogue control circuit enables providing the dialogue control circuit capable of acquiring the replies to predetermined items in a predetermined order, even if the user's speech content differs from the objective.

In the abovementioned two types of dialogue control circuit, it is necessary to provide a plurality of main components thereof for each language so that the language setting unit 240 can perform setting in the language designated by the player. It is also necessary that the type of language is designated by the player's operation on the input unit such as a touch panel. The following third type of dialogue control circuit minimizes the dialogue control circuit essential to each of the languages. Furthermore, the language can also be set by the player's speech without requiring the player to operate the input unit.

In addition, the abovementioned two types of the dialogue control circuits can identifies voice patterns, and phonemes HMMs, word dictionary, examples of sentences, and the like for each voice pattern may be stored in the voice dialogue database 1500 and the voice recognition dictionary storage section so as to generate voice messages according to voice patterns selected by the voice pattern setting circuit 70.

In the abovementioned two types of dialogue control circuit, it is necessary to provide a plurality of main components thereof for each language so that the language setting unit 240 can perform setting in the language designated by the player. It is also necessary that the type of language is designated by the player's operation on the input unit such as a touch panel. The following third type of dialogue control circuit minimizes the dialogue control circuit essential to each of the languages. Furthermore, the language can also be set by the player's speech without requiring the player to operate the input unit.

C. Third Type of Dialogue Control Circuit

Figure 34:
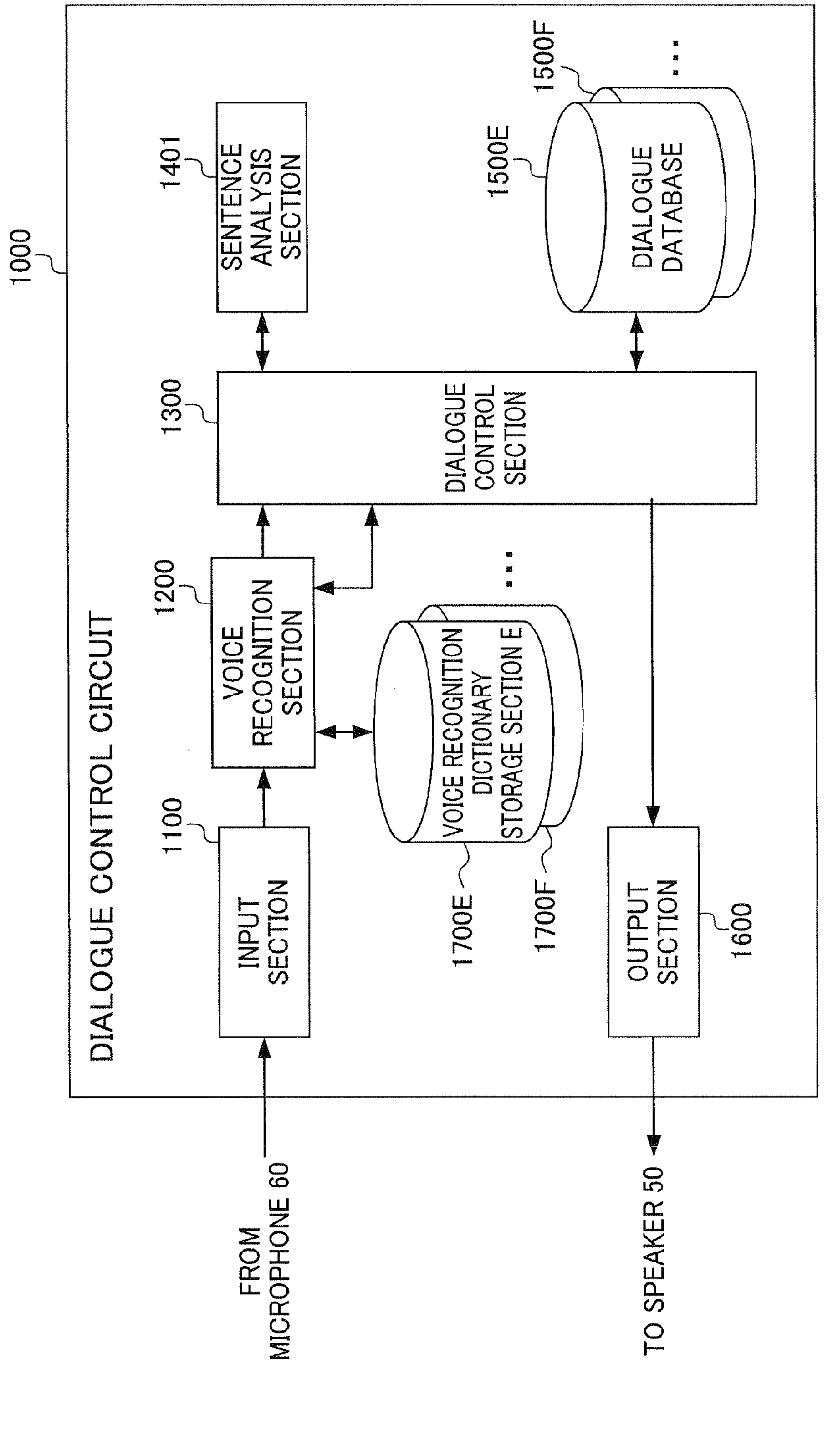
FIG. 34 is a functional block diagram showing an example of the configuration of the third type of dialogue control circuit.

The third type of dialogue control circuit applicable as the dialogue control circuit 1000 is described below. The third type of dialogue control circuit has substantially the same configuration as the first type of dialogue control circuit shown in FIG. 8. Similar reference numerals are used for similar components, and the detailed description thereof is omitted. FIG. 34 is a functional block diagram showing an example of the configuration of the third type of dialogue control circuit. As shown in FIG. 34, the third type of dialogue control circuit has a plurality of main components of the dialogue control circuit 1000, such as a dialogue database 1500 and a voice recognition dictionary storage section 1700, which are provided for the language types, respectively. Here, to simplify the description, it is assumed that the dialogue database includes an English database indicated by 1500E and an French dialogue database shown by 1500F, and the voice recognition dictionary storage unit includes an English voice recognition dictionary storage unit 1700 indicated by 1700E and a French voice recognition dictionary storage unit indicated by 1700F. Furthermore, in the third type of dialogue control circuit, the sentence analysis unit 1401 is configured to handle multiple languages.

Figure 35:
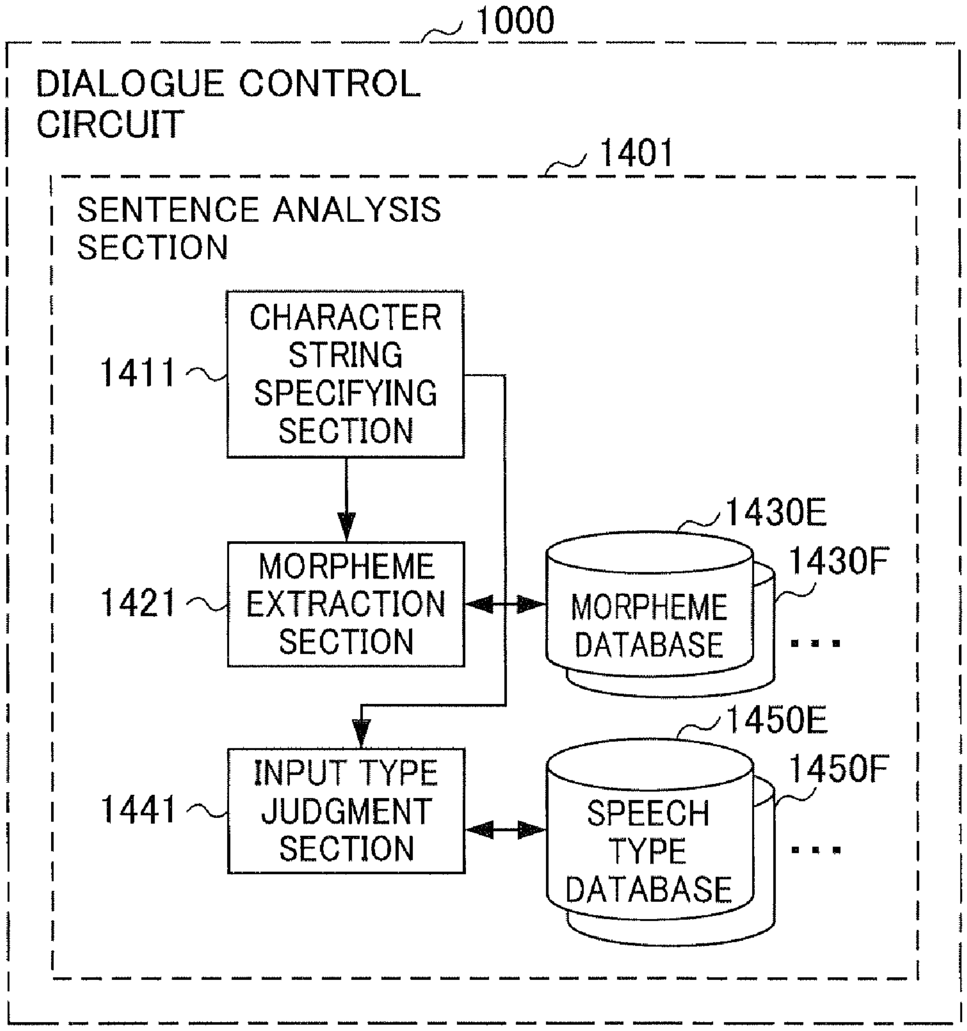
FIG. 35 is a functional block diagram showing an example of the configuration of a sentence analysis unit of the dialogue control circuit of FIG. 33.

FIG. 35 is a functional block diagram showing an example of the configuration of the sentence analysis unit of the third type of dialogue control circuit. As shown in FIG. 35, the sentence analysis unit 1401 of the third type of dialogue control circuit has a character string specifying unit 1411, a morpheme extraction unit 1421, an input type judgment unit 1441, and a plurality of morpheme databases 1431 and a plurality of speech type databases 1451 corresponding to their respective language types. Here, to simplify the description, it is assumed that the morpheme database includes an English morpheme database indicated by 1431E and a French morpheme database shown by 1431F, and the speech type includes an English speech type database indicated by 1451E and a French speech type database indicated by 1451F.

In the third type of dialogue control circuit thus configured, when sounds are received by the microphone 60, and the player's speech information converted to voice signals are inputted from the input unit 1100, as mentioned above, the voice recognition unit 1200 outputs a voice recognition result estimated from the voice signals by collating the inputted voice signals with the voice recognition dictionary storage units 1700E, 1700F, . . . provided on a per language type basis. For example, when the player's speech thus collated is in English, the language type is designated as English and transferred to a controller 235. Thus, without requiring the player to operate the input unit, the language recognition unit 1200 recognizes the language by the player's speech, enabling the controller 235 to set the language type. This eliminates the need for the input unit such as the language setting unit 240.

D. Modifications of Third Type of Dialogue Control Circuit

The sentence analysis unit 1401 of the third type of dialogue control circuit can be further improved in function by performing natural language document/player's speech semantic analysis based on knowledge recognition, and interlanguage knowledge retrieval and extraction in accordance with the player's speech in natural language.

Firstly, the principle of the natural language document/player's speech semantic analysis based on knowledge recognition and the principle of the interlanguage knowledge retrieval and extraction in accordance with the player's speech in natural language is described. Secondly, the sentence analysis section 1401 of the present embodiment is described below.

1.1. Principle of Interlanguage Knowledge Retrieval and Extraction

In the present embodiment, expanded SAO (subject-action-object) format is used as the formal expressions of the player's speech and document contents. The expanded SAO (or eSAO) includes the following seven elements.

1. Subject (S) that performs an action word (A) to an object (O).

2. An action word (A) performed on an object (O) by a subject (S).

3. An object (O) on which an action word (A) is executed by a subject (S).

4. A subject (A) having no object (O) in eSAO or an adjective (Adj) characterizing a subject-directed action word (A) (for example, the invention is "efficient." and "Water is heated.").

5. Preposition (Prep) defining an indirect-object (for example, A lamp is placed "on" the table. The device reduces friction "by" ultrasonic waves.)

6. Indirect Object (IO) becoming clear by a noun phrase along with a preposition substantially characterizing an action word which is an adverbial modifier (for example, A lamp is placed on "the table." The device reduces friction by "ultrasonic waves.").

7. Adverb (Adv) substantially characterizing the condition to execute an action word (A) (for example, Processing is slowly "improved." "The driver is required not to operate the steering wheel "in such a manner.").

Examples of applications of the eSAO format are shown in the following Tables 1 and 2.

TABLE 1

| |
|---|
| INPUT SENTENCE: A dephasing element guide completely suppresses unwanted modes. |
| OUTPUT: |
| SUBJECT: dephasing element guide |
| ACTION WORD: suppress |
| OBJECT: unwanted mode |
| PREPOSITION: — |
| INDIRECT OBJECT: — |
| ADJECTIVE: — |
| ADVERB: completely |

TABLE 2

| |
|---|
| INPUT SENTENCE: The maximum value of x is dependent on the ionic radius of the lanthanide element. |
| OUTPUT: |
| SUBJECT: maximum value of x |
| ACTION WORD: be |
| OBJECT: — |
| PREPOSITION: on |
| INDIRECT OBJECT: ionic radius of the lanthanide element |
| ADJECTIVE: dependent |
| ADVERB: |

The details of preferred systems and methods of automatic eSAO recognition, which may include a preformatter (to preformat an original player's speech/text document) and a language analysis unit (to perform parts-of-speech tagging of the player's speech/text document, and syntactic analysis and semantic analysis), are described in US Patent Publication No. 2002/0010574 titled as "Natural Language Processing and Query Driven Information Retrieval" and US Patent Publication No. 2002/0116176 titled as "Semantic Answering System and Method."

For example, when the system inputs "How to reduce the level of cholesterol in blood?" as a player's speech, this is converted to the expression shown in Table 3 at the eSAO recognition level.

TABLE 3

| |
|---|
| INPUT SENTENCE: How to reduce the level of cholesterol in blood? |
| OUTPUT: |
| SUBJECT: — |
| ACTION WORD: reduce |
| OBJECT: level of cholesterol |
| PREPOSITION: in |
| INDIRECT OBJECT: blood |
| ADJECTIVE: — |
| ADVERB: — |

When the system receives, as input, the following statement "Atorvastine reduces total cholesterol level in the blood by inhibiting HMG-CoA reductase activity" from the text document, for example, the system processes this statement to obtain the formal expression of the document including three eSAOs shown in Table 4.

TABLE 4

| |
|---|
| INPUT SENTENCE: Atorvastatine reduces total cholesterol level in the blood by inhibiting HMG-CoA reductase activity |
| OUTPUT: |
| $eSAO_1$ |
| SUBJECT: atorvastatine |
| ACTION WORD: inhibit |
| OBJECT: HMG-CoA reductase activity |
| PREPOSITION: — |
| INDIRECT OBJECT: — |
| ADJECTIVE: — |
| ADVERB: — |
| $eSAO_2$ |
| SUBJECT: atorvastatine |
| ACTION WORD: reduce |
| OBJECT: total cholesterol levels |
| PREPOSITION: in |
| INDIRECT OBJECT: blood |
| ADJECTIVE: — |
| ADVERB: — |
| $eSAO_3$ |
| SUBJECT: Inhibiting HMG-CoA reductase activity |
| ACTION WORD: reduce |
| OBJECT: total cholesterol levels |
| PREPOSITION: in |
| INDIRECT OBJECT: blood |
| ADJECTIVE: — |
| ADVERB: — |

Figure 36:
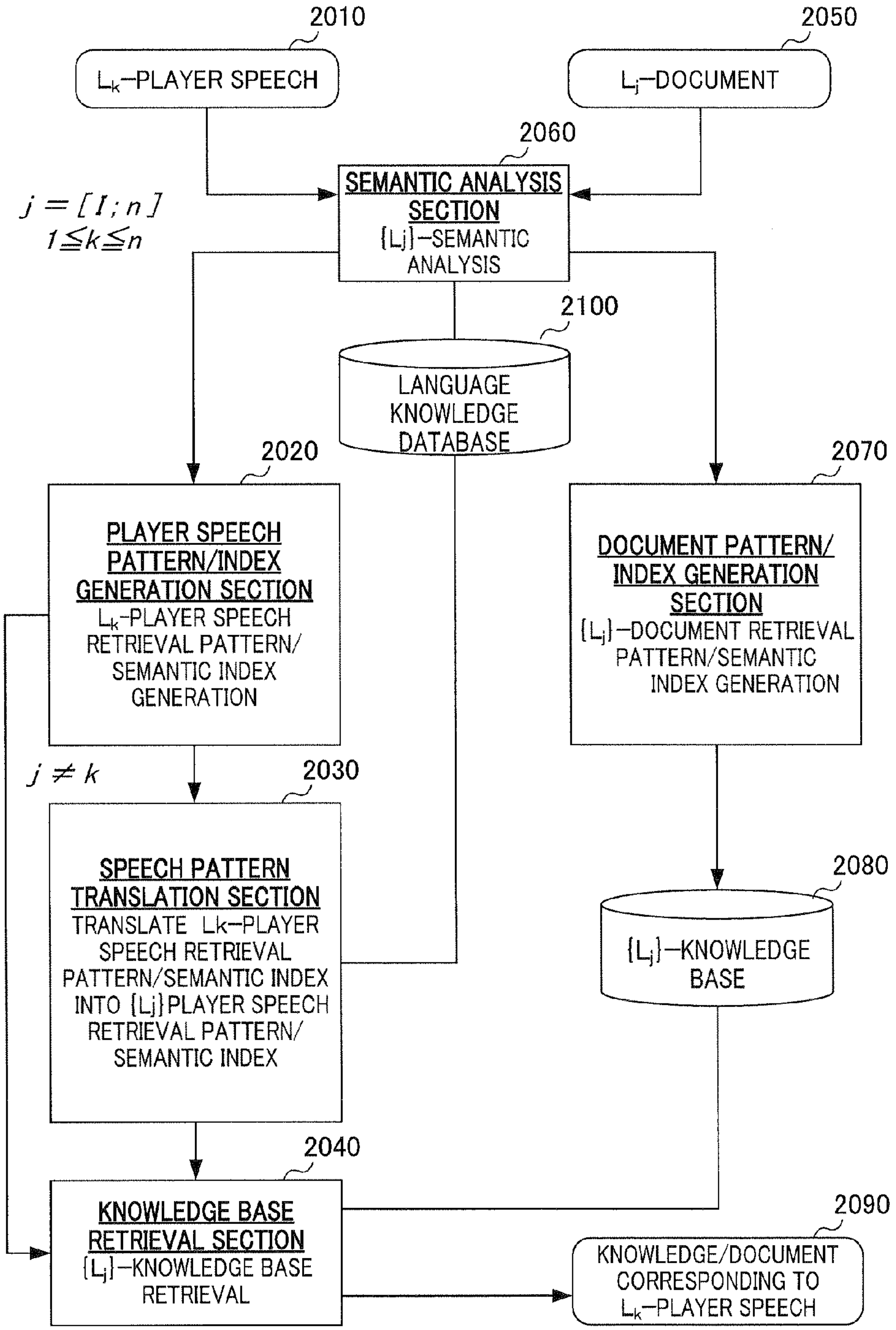
FIG. 36 is a diagram showing the structure and functional scheme of a system performing semantic analysis of natural language document/player's dialogue semantic analysis based on knowledge recognition, and interlanguage knowledge retrieval and extraction according to a player's speech in a natural language.

FIG. 36 shows the system of the present embodiment. As shown in FIG. 36, the system includes a semantic analysis section 2060, a player' speech pattern/index generation section 2020, a document pattern index generation section 2070, a speech pattern translation section 2030 and a knowledge base retrieval section 2040. The semantic analysis section 2060 performs semantic analysis of a player's speech and document expressed in the natural language having an arbitrary number j among n natural languages. The player's speech pattern/index generation section 2020 generates a retrieval pattern/semantic index of a player's speech expressed in the natural language having a certain number k. The document pattern index generation section 2070 generates a retrieval pattern/semantic index of a text document constituting an $\{L_j\}$-knowledge base 2080 by performing input into the language system having an arbitrary number j among the n natural languages. The speech pattern translation section 2030 translates the retrieval pattern/semantic index of an $L_k$ player's speech into an arbitrary j (j≈k) among all natural languages. The knowledge base retrieval section 2040 performs retrieval of a knowledge and a statement related to the retrieval pattern/semantic index of an $L_j$ player's speech by the $\{L_j\}$-knowledge base 2080. All the module functions of the system may be included in a language knowledge base 2100 containing various databases such as dictionaries, classifiers and synthetic data, as well as databases to distinguish language models (which recognize a noun and verb phrase, a subject, an object, action word, the attribute and causal relation of these by splitting a text into words).

The details of the $L_k$-player's speech and the $\{L_j\}$-document, the $L_k$-player's speech and the $\{L_j\}$-document semantic index generation, and the knowledge base retrieval are described in US Patent Publication No. 2002/0010574 titled as "Natural Language Processing and Query Driven Information Retrieval" and US Patent Publication No. 2002/0116176 titled as "Semantic Answering System and Method." In the present embodiment, it is preferable to use the semantic analysis, the semantic index generation and the knowledge base retrieval described in these two publications.

It should be noted that the semantic index/retrieval pattern of the $L_k$-player's speech and the text document indicates a plurality of eSAOs, and indicates the limitation of extraction from the player's speech/text document by the $\{L_j\}$-semantic analysis section 2060. The recognition of all of the eSAO elements are performed by their respective corresponding "language model recognitions" as part of the language knowledge base 2100. These models describe the use rules to perform extraction from a syntactically analyzed text eSAO along with a fixed-form action word, an unfixed-form action word and a verbal noun by using parts-of-speech tags, lexemes and syntactic categories. An example of the action word extraction rules is described below.

*<HVZ><BEN><VBN>=>(<A>=<VBN>)*

This rule defines that "when the inputted sentence includes a sequence of words w1, w2 and w3 after acquiring HVZ, BEN and VBN tags, respectively, at the stage of the parts-of-speech tagging process, the word having the VBN tag in this sequence is the action word." For example, the parts-of-speech tagging process of the phrase "seiseishita" results in "shita_HVZ seisei_BEN", and the rule shows "seisei" as an action word. Furthermore, the voice (active voice or passive voice) of the action word is taken into consideration in the rule for extracting a subject and an object. The limitation is imposed on a per player's speech/text document information lexeme basis, instead of a part of the eSAO. At the same time, all of semantic index elements (lexeme units) are also processed together with the corresponding parts-of-speech tags, respectively.

Therefore, for example, in response to the abovementioned player's speech "How to reduce the level of cholesterol in blood?", the semantic index corresponds to the combination field shown in Table 5.

TABLE 5

| |
|---|
| INPUT SENTENCE: How to reduce the level of cholesterol in blood? |
| OUTPUT: |

TABLE 5-continued

| |
|---|
| SUBJECT: — |
| ACTION WORD: Reduce_VB |
| OBJECT: level_NN/attr=parameter/of_IN cholesterol_NN/main |
| PREPOSITION: in_IN |
| INDIRECT OBJECT: blood_NN |
| ADJECTIVE: — |
| ADVERB: — |

Consequently, in the present embodiment, a plurality of semantic analysis sections 2060 may be provided to handle different natural languages. Table 5 merely shows an example where the parts-of-speech are expressed by tags "VB, NN and IN." For POS tags, refer to the abovementioned US Patent Publication No. 2002/0010574 and US Patent Publication No. 2002/0116176.

A player's speech 2010 may be related to different objects/concepts (e.g., in terms of their definitions and parameters), different facts (e.g., in terms of methods or techniques to realize a specific action word about a specific object, the time and place to realize a specific fact), a specific relation between facts (e.g., the cause of a specific matter, etc.) and/or other items.

The speech pattern/index generation section 2020 transmits a $L_k$-player's speech retrieval pattern/semantic index to the speech pattern translation section 2030 that translates a semantic retrieval pattern corresponding to an inquiry written in a source language $L_k$ into a target language $L_j$($j=1, 2, \ldots, n, j\neq k$). Therefore, for example, when the target language is French, the speech pattern translation section 2030 builds the "French" semantic index shown in Table 6, with respect to the abovementioned player's speech, for example.

TABLE 6

| |
|---|
| OUTPUT: |
| SUBJECT: — |
| ACTION WORD: abaisser_VB\|minorer_VB\|reduire_VB\|amenuiser_VB\|diminuer_VB |
| OBJECT: niveau_NN_main\|taux_NN_main\|degre_NN/attr=parameter/de_IN cholesterol_NN/main |
| PREPOSITION: dans_IN\|en_IN\|aux_IN\|sur_IN |
| INDIRECT OBJECT: sang_NN |
| ADJECTIVE: — |
| ADVERB: — |

Thus, the speech pattern translation section 2030 of the present embodiment translates a specific information word combination of the player's speech, while holding the POS tags, semantic roles and semantic relations of the player's speech, without relying on the mere translations of individual words of the player's speech.

The translated retrieval pattern is sent to the knowledge base retrieval section 2040, in which the corresponding player's speech knowledge/document retrieval is performed by using the partial aggregation of a semantically indexed text document included in the $\{L_j\}$-knowledge base 2080, corresponding to the target language $L_j$ (herein, French). The retrieval is usually performed by the step of collating the player's speech semantic index expressed in the original source language with the selected target language in the partial aggregation of the semantic indexes of the $\{L_j\}$-knowledge base 2080, in consideration of the synonym relation and hierarchical relation of the retrieval pattern.

Preferably, the speech pattern translation section 2030 uses a plurality of inherent bilingual dictionaries including bilingual dictionaries of action words and bilingual dictionaries of concepts/objects. For an example where the source language is English and the target language is French, refer to FIG. 37A. FIG. 37B shows an example of a bilingual dictionary where the source language is English and the target language is French concepts/objects.

Figure 38:
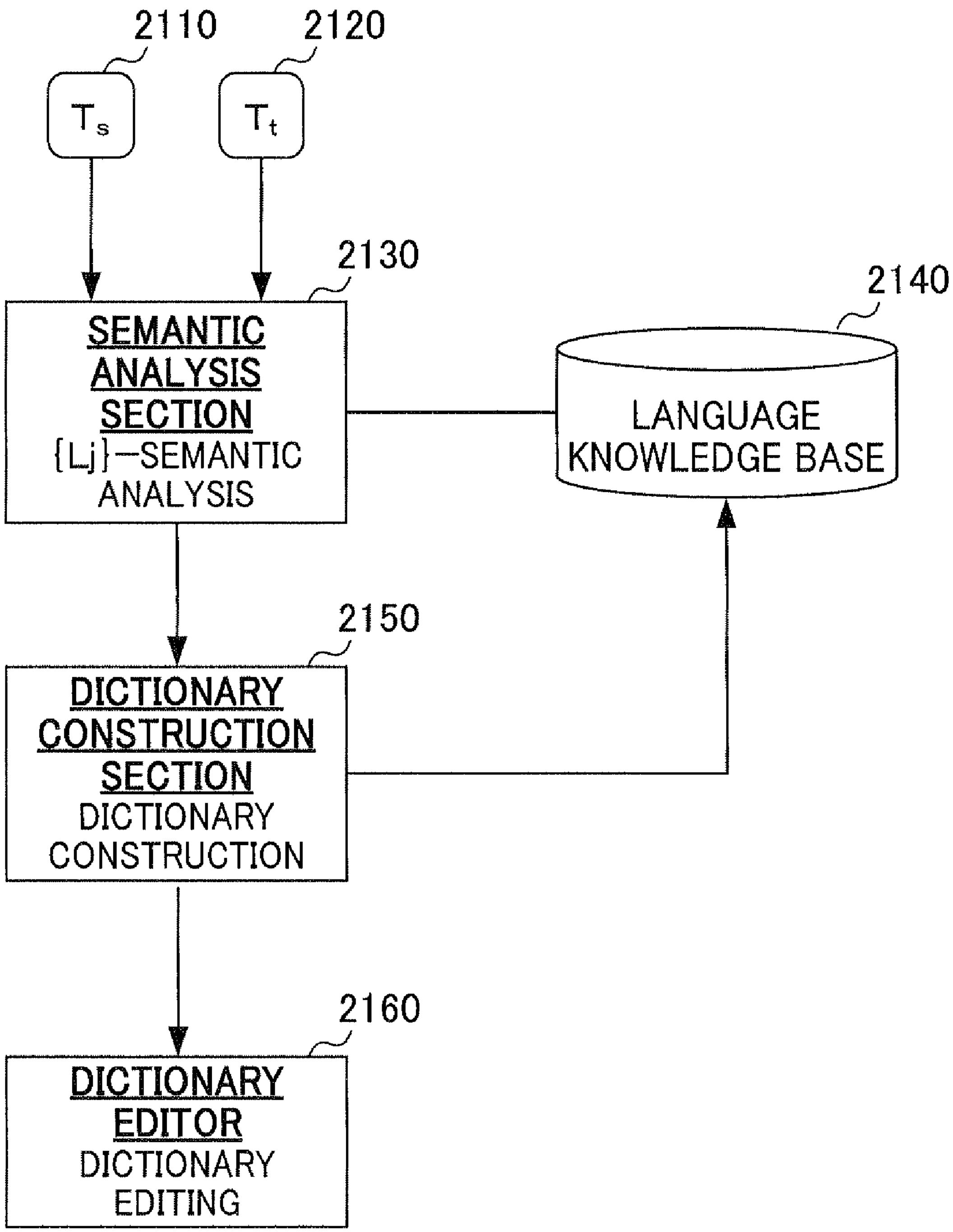
FIG. 38 is a diagram showing the structure and the functional scheme of dictionary construction.

FIG. 38 shows a construction example of the above dictionary. This dictionary is constructed by using parallel language materials. These two parallel language materials $T_s$2110 and $T_t$2120 are firstly processed by the semantic analysis section 2130. That is, the individual language materials $T_s$2110 and $T_t$2120 are processed by the semantic analysis sections 2130 corresponding to the languages of the $T_s$2110 and $T_t$2120, respectively. In these parallel language materials $T_s$2110 and $T_t$2120, the former is the language s and the latter is the language t, preferably including the translated document shown in a comparison of their respective language sentences. The respective semantic analysis sections 2130 (for the former language s and the latter language t) convert the language materials $T_s$2110 and $T_t$2120 to semantic indexes expressed by a plurality of parallel eSAOs, respectively. A dictionary construction section 2150 constructs a conceptual bilingual dictionary by extracting parallel groups of subjects and objects from the parallel eSAOs. The dictionary construction section 2150 also extracts parallel action words to construct a bilingual action word dictionary. The individual parallel groups include equivalent lexeme units in order to express the same semantic elements. The dictionary generated by the dictionary construction section 2150 is further processed by a dictionary editor 2160 provided with editing tools, such as a tool to continuously delete the groups of lexeme units. The dictionary thus edited is added to the language knowledge base 2140 along with other language resources used by the semantic analysis section 2130.

As shown in the speech pattern translation section 2030 in FIG. 36, the conceptual ambiguity of multiple words included in the player's speech can be reduced considerably by using the dictionary of concepts and action words, while translating the player's speech retrieval pattern. Due to the contexts provided in all fields of the abovementioned semantic index, the ambiguity can be further reduced or eliminated during retrieval. Therefore, the system and the method of the present embodiment improve knowledge extraction from a plurality of languages sources, and improve the designation and extraction of documents containing the corresponding knowledge.

The system and method of the present embodiment may be executed by instructions executable by more than one computer, microprocessor, microcomputer or a computer that resides in another processing device. The abovementioned computer-executable instructions to execute the system and the method may reside in the memory of the processing device, or alternatively may be supplied to the processing device by using a floppy disk, a hard disk, a CD (compact disk), a DVD (digital versatile disk), ROM (read only memory) or another storage medium.

1.2. Sentence Analysis Section 1401

The sentence analysis section 1401 of the third type of dialogue control circuit is an application of the abovementioned method and system. The morpheme database 1431 and the speech type database 1451 are eSAO format databases, and the morpheme extraction section 1421 extracts the first morpheme information in eSAO format by referring to the morpheme database 1431. The input type judgment section 1441 determines the first morpheme information extracted in eSAO format by referring to the morpheme database 1431.

In addition, the sections for interlanguage knowledge retrieval and extraction as described with reference to FIGS. 36 to 38 may be further mounted in still other forms on the dialogue control circuit 1000. The third type of dialogue control circuit thus configured is capable of not only setting the language types by the player's speech, but also increasing the voice recognition accuracy, thereby achieving smooth dialogue with the player. Furthermore, the bilingual dictionary and knowledge base of a second language can be formed from a first language, thus achieving quick and effective translation into the second language type. Hence, even if the player's language corresponds to a certain language type for which no suitable example reply sentences associated with the player's speech are stored in the database, such an event can be handled in the following manner. That is, when necessary, the player's speech can be translated into a language for which ample example reply sentences are stored in the database. Then, a suitable reply example sentence is formed in this language, the example reply sentence thus formed is translated into the player's language type, and then supplied to the player. This can thereafter be added to the database of the player's language type.

Besides the abovementioned three types of dialogue control circuits, various types of dialogue control circuits are applicable.

Figure 39:
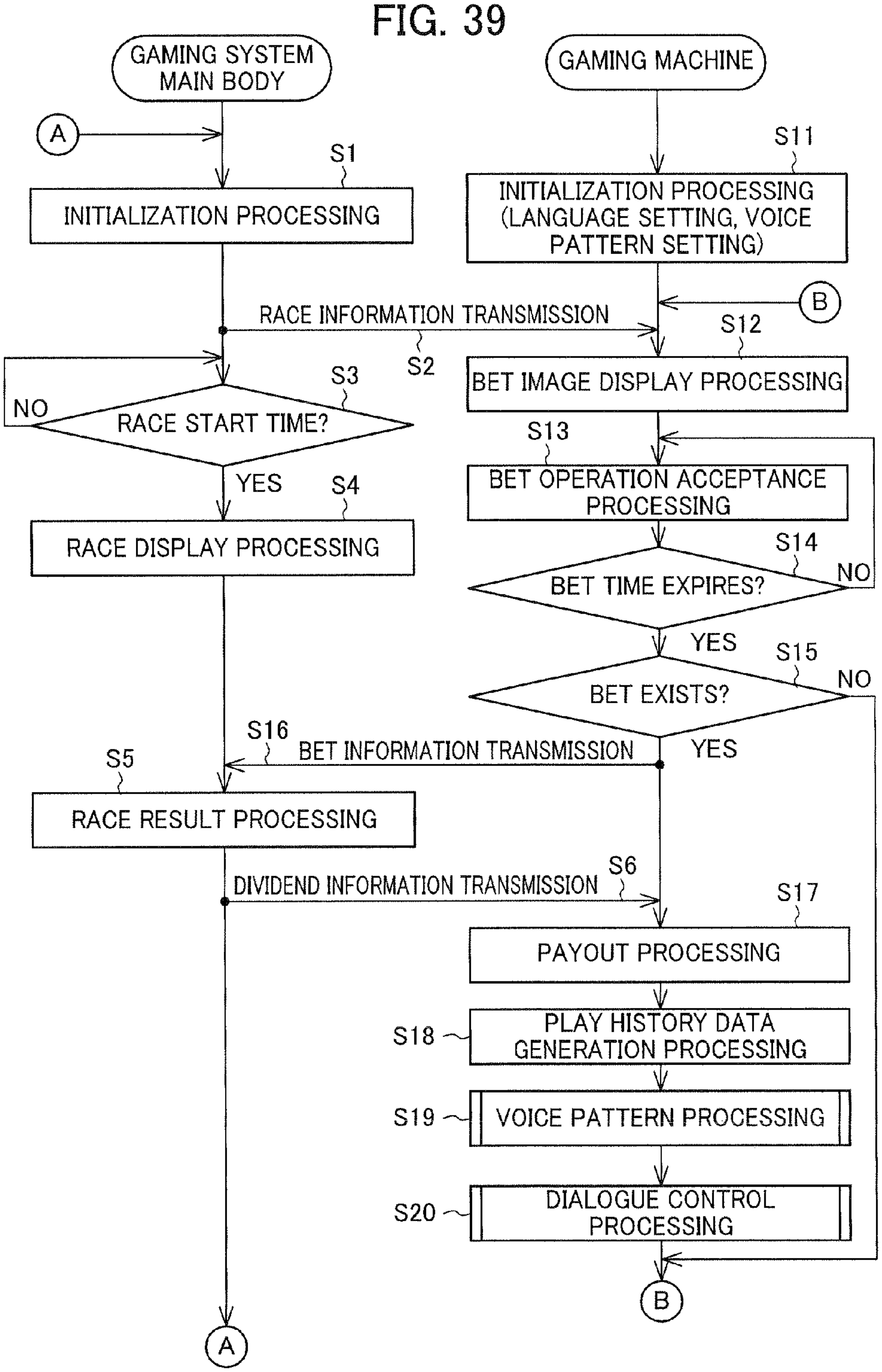
FIG. 39 is a flowchart showing a game operation carried out by a gaming system according to the first embodiment of the present invention.

Game operation on the gaming system 1 thus configured is described by referring to the flow chart shown in FIG. 39. Individual gaming machines 30 cooperate with the gaming system main body 20 to perform the same gaming operation. FIG. 39 shows only one of these gaming machines 30.

The gaming system main body 20 performs the operations in Steps S1 to S6. In Step S1, a primary control section 112 performs initialization processing, and then moves onto Step S2. In this processing, which is related to a horse racing game, a CPU 141 determines a course, entry horses and the start time of the present race, and reads the data related to these from the ROM 143.

In Step S2, the primary control section 112 sends the race information to the individual gaming machines 30, and then moves onto Step S3. In this processing, the CPU 141 sends the data related to the course, entry horses and the start time of the present race, to the individual gaming machines 30.

In Step S3, the primary control section 112 determines whether it is the race start time. When the judgment result is YES, the procedure advances to Step S4. When the judgment result is NO, Step S3 is repeated. More specifically, the CPU 141 repeats the time check until the race start time. At the race start time, the procedure advances to Step S4.

In Step S4, the primary control section 112 performs race display processing, and then moves onto Step S5. In this processing, based on the data read from the ROM 143 in Step S1, the CPU 141 causes the main display unit 21 to display the race images, and causes the speaker unit 22 to output sound effects and voices.

In Step S5, the primary control section 112 performs race result processing, and then moves onto Step S6. In this processing, based on the data related to the racing result and the betting information received from the individual gaming machines 30, the CPU 141 calculates the dividends on the individual gaming machines 30, respectively.

In Step S6, the primary control section 112 performs dividend information transfer processing, and the procedure returns to Step S1. In this processing, the CPU 141 transmits the data of the dividends calculated in Step S5 to the gaming machines 30, respectively.

On the other hand, the individual gaming machines 30 perform the operations of Steps S11 to S21. In Step S11, a sub-controller 235 performs language setting processing, and moves onto Step S12. In this processing, the CPU 231 sets, as the player's language type, the language type designated through the language setting section 240 by the player, to the language control circuit 1000. When the dialogue control circuit 1000 is formed by the abovementioned third type of dialogue control circuit, based on the player's sounds received by the microphone 60, the dialogue control circuit 1000 automatically distinguishes the player's language type, and the CPU 231 sets the player's language type thus distinguished to the dialogue control circuit 1000. In addition, the CPU 231 controls the touch panel driving circuit 222 and displays the message "Please select a voice pattern" for allowing the player to select a voice pattern and a list of voice patterns from which player can select on the liquid crystal monitor 342. When the player touches the liquid crystal monitor 342 which operates as a touch panel and selects a voice pattern that the player wants, the voice pattern thus selected is stored in the RAM 232 as a voice pattern that the player selects. In addition, when the player selects an option not to set a voice pattern, information which indicates that a voice pattern is not set is stored in the RAM 232. Thus, the language setting and the voice pattern setting are initialized.

In Step S12, the sub-controller 235 performs betting image display processing, and then moves onto Step S13. In this processing, based on the data transmitted from the gaming system main body 20 in Step S2, the CPU 231 causes a liquid crystal monitor 342 to display the odds and the race results so far of individual racing horses.

In Step S13, the sub-controller 235 performs bet operation acceptance processing, and then moves onto Step S14. In this processing, the CPU 231 enables the player to perform touch operation on the surface of the liquid crystal monitor 342 as a touch panel, and starts to accept the player's bet operation and changes the display image in accordance with the bet operation.

In Step S14, the sub-controller 235 determines whether the betting period has expired. If the judgment result is YES, the procedure advances to Step S15. If it is NO, Step S13 is repeated. More specifically, the CPU 231 checks the time from the start of the bet operation acceptance processing in Step S13 to the expiration of a predetermined time period, and after the predetermined period of time, terminates the acceptance of the player's bet operation, and the procedure advances to Step S15.

In Step S15, the sub-controller 235 determines whether the bet operation has been carried out. If the judgment result is YES, the procedure advances to Step S16. If it is NO, the procedure advances to Step S11. In this processing, the CPU 231 determines whether the bet operation has been carried out during the term of the bet operation acceptance.

In Step S16, the sub-controller 235 performs bet information transfer processing, and then moves onto Step S17. In this processing, the CPU 231 transmits the data of the executed bet operation to the gaming system main body 20.

In Step S17, the sub-controller 235 performs payout processing, and then moves onto Step S18. In this processing, based on the dividend-related data and the like transmitted from the gaming system main body 20 in Step S6, the CPU 231 pays out medals equivalent to the credits through the medal payout port.

In Step S18, the sub-controller 235 performs play history data generation processing, and then moves onto Step S19. In this processing, according to the player's operation, the CPU 231 performs arithmetic on the value calculated based on at least one of the input credit amount, the accumulated input credit amount, the credit payout amount, namely the payout amount, the accumulated credit payout amount: namely, the accumulated payout amount, the payout rate corresponding to the payout amount per play, the accumulated play time and the accumulated number of times played.

In Step S19, the sub-controller 235 performs voice pattern processing, and then moves onto Step S20.

In Step S20, the sub-controller 235 performs dialogue control processing, and then moves onto Step S12.

Figure 40:
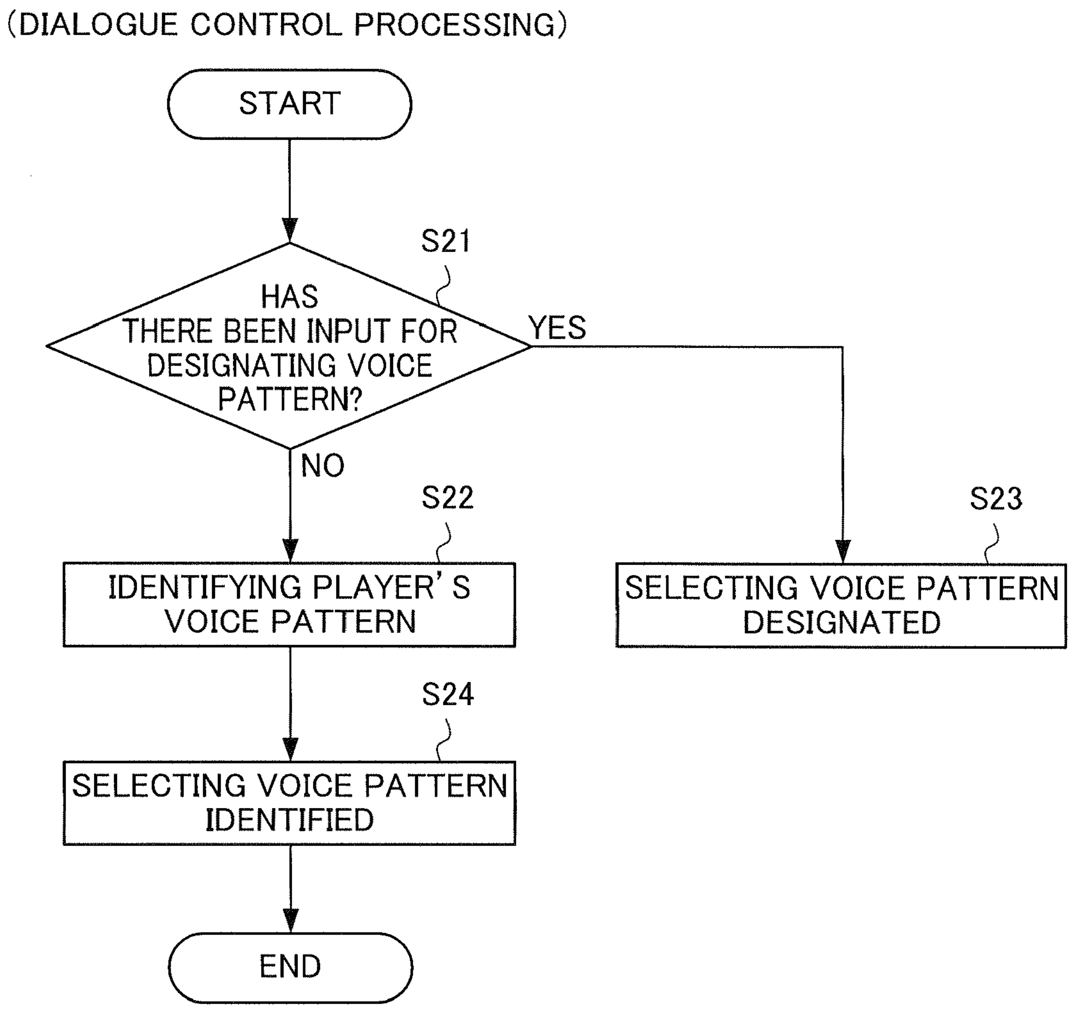
FIG. 40 is a flowchart showing dialogue control processing in game operations of FIG. 38.

The voice pattern processing of the present embodiment is described with reference to the flowchart shown in FIG. 40.

In Step S21, the sub-controller 235 determines whether there is an input for designating a voice pattern in Step 11. If it is a YES determination, the CPU advances the processing to Step S23. On the other hand, if it is a NO determination, the CPU advances the processing to Step S22. In this processing, the CPU 231 determines whether the voice pattern that the player selected is stored in the RAM 232, and also determines whether the information which indicates that the voice pattern is not selected is stored in the RAM 232.

In Step 22, the sub-controller 235 identifies a player's voice pattern, and the CPU advances the processing to Step S24. In this processing, the CPU 231 controls the touch panel driving circuit 222 and displays a message for allowing the player to select a voice pattern on the liquid crystal monitor 342 based on the data stored in the RAM 232. In a case in which an indication for allowing the player to select a voice pattern is displayed on the liquid crystal monitor 342 which operates as a touch panel, the CPU 231 cooperates with the voice pattern setting circuit 70 and stores the voice pattern thus selected in the RAM 232 as a voice pattern corresponding to the player. Alternatively, in a case in which an indication for allowing the player to select a voice pattern is not displayed on the liquid crystal monitor 342 which operates as a touch panel, the CPU 231 cooperates with the voice pattern setting circuit 70 to control the touch panel driving circuit 222, and displays a message for causing the player to read out a predetermined phrase based on the data stored in the RAM 232. When a player's voice is collected from the microphone 60, the controller 235 collates the player's voice pattern using the voice recognition unit 1200 dialogue control circuit 1000. More specifically, the characteristic extraction section 1200A of the voice recognition unit 1200 determines whether it is a man's voice or a woman's voice based on a frequency such as pitch frequency and formant frequency, and stores the information thereof. In addition, the word collation section 1200C of the dialogue control circuit 1000 detects a word hypothesis and calculates and outputs the likelihood thereof by using phonemes for each dialect and phonemes HMMs including word information, which are stored in the voice recognition dictionary storage section 1700. In this way, the CPU identifies the player's voice pattern based on the information stored in the RAM 232.

In Step S23, the designated voice pattern is selected as a player's voice pattern. In this processing, the CPU 231 sets the designated voice pattern to the language control circuit 1000. More specifically, the dialogue control circuit 1000 incorporates information of designated voice patterns, examples of sentences, dictionaries, etc. in the dialogue database 1500 and the voice recognition dictionary section 1700, and is set so as to use information of designated voice patterns, examples of sentences, dictionaries, etc when generating a voice message.

In Step S24, the designated voice pattern is selected as a player's voice pattern. In this processing, the CPU 231 sets the identified voice pattern to the language control circuit 1000. More specifically, the dialogue control circuit 1000 incorporates information of identified voice patterns, examples of sentences, dictionaries, etc. in the dialogue database 1500 and the voice recognition dictionary section 1700, and is set so as to use information of identified voice patterns, examples of sentences, dictionaries, etc when generating a voice message.

Figure 41:
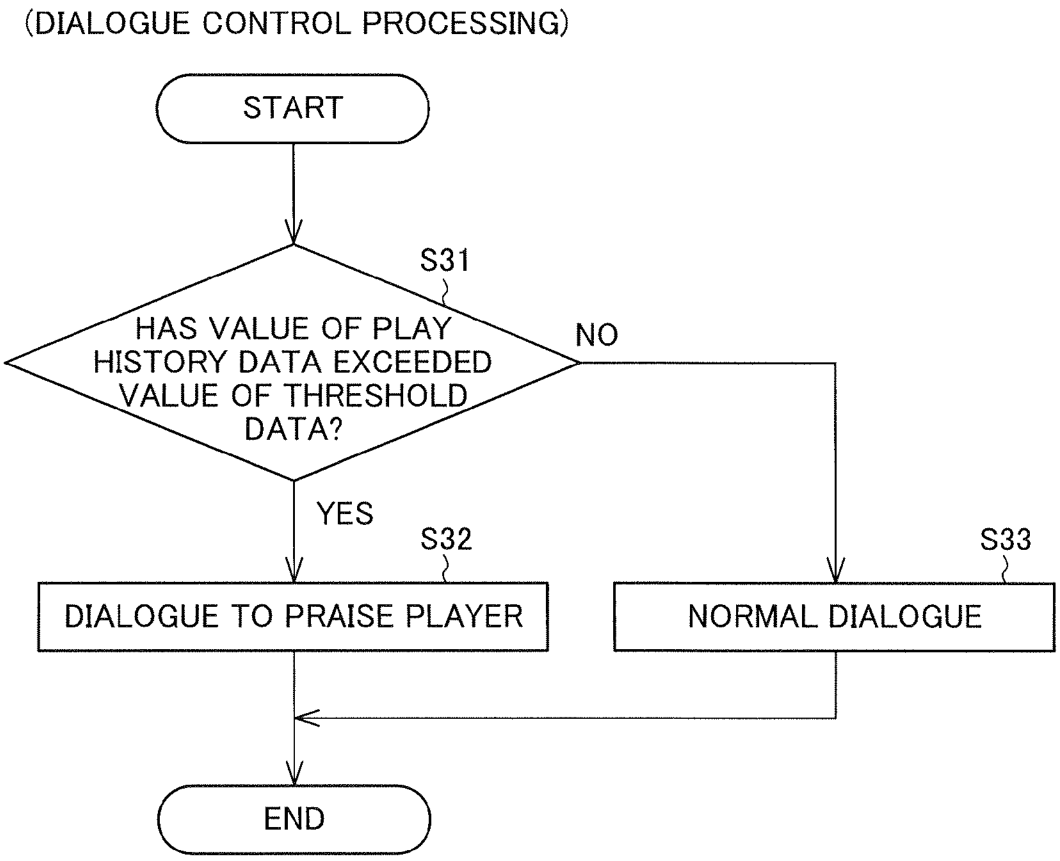
FIG. 41 is a flowchart showing dialogue control processing in game operations of FIG. 39.

The dialogue control processing is described by referring to the flow chart shown in FIG. 41.

In Step S31, the sub-controller 235 determines whether the value of the play history data generated in Step S18 exceeds the value of a threshold value data stored in the ROM 233. If the judgment result is YES, the procedure advances to Step S32. If it is NO, the procedure advances to Step S33. More specifically, the value calculated based on at least one of the input credit amount, the accumulated input credit amount, the payout amount, the accumulated payout amount, the payout rate corresponding to the payout amount per play, the accumulated play time, and the accumulated number of times played in the play history data generated in Step S18, is compared with the value stored in the ROM 233 as the threshold value data.

In Step S32, the dialogue control circuit 1000 provides a dialogue to praise the player. For example, a speech "you are doing very well" is made with the voice pattern decided in the voice pattern processing of Step S19 with, for example, a man's voice, a woman's voice, a dialect, and the like. When the player replies positively such as "Yes, that's right." or replies ambiguously such as "I wonder.", the dialogue control circuit 1000 generates such speech as "How did you know this horse was good?" to continue the dialogue. Even if the player replies "Because . . . " or "Intuition", finally, the dialogue control circuit 1000 generates speech such as "Let's continue at this rate." to urge the player to continue the game.

In Step S33, on the contrary, the dialogue control circuit 1000 provides the player with a general dialogue. For example, the speaker 50 generates speech of "How's it going?" with the voice pattern decided in the voice pattern processing of Step S19. Even if the player replies such as "The truth is that . . . " or "I'm just not in the swing of it.", the dialogue control circuit 1000 provides general information such as "This horse will run in the next game. This horse is a good choice. That horse is . . . " with the voice pattern decided in the voice pattern processing of Step S19. When the player replies "Okay." or "I agree.", the dialogue control circuit 1000 finally informs the player of the game progress such as "The next game will start in a few minutes. Are you ready?" with the voice pattern decided in the voice pattern processing of Step S19.

Generally, voices generated by machines tends to be monotonous, which is possible to weaken the enthusiasm of players. However, the gaming machine 30 of the present embodiment enhances the enthusiasm of players by mounting a dialogue controller, and enhances the enthusiasm of players with a configuration that the way of outputting voice messages can be changed using various voice patterns according to players so as to avoid the voice messages outputted from the speaker 50 being monotonous.

Although the abovementioned embodiment is described with a voice pattern with a man's voice, a woman's voice, a dialect, and the like, the present invention is not limited thereto. Various voices including a high voice, a deep voice, a peculiar way of speaking, vocal sound, intonations, and the like, and the combinations thereof may be included as long as it can be identified as a voice pattern. As an additional example of a voice pattern, for example, examples including suppressed voices, cool voices, elevated voices, and the like are described in detail in the following embodiment.

Second Embodiment

Figure 42:
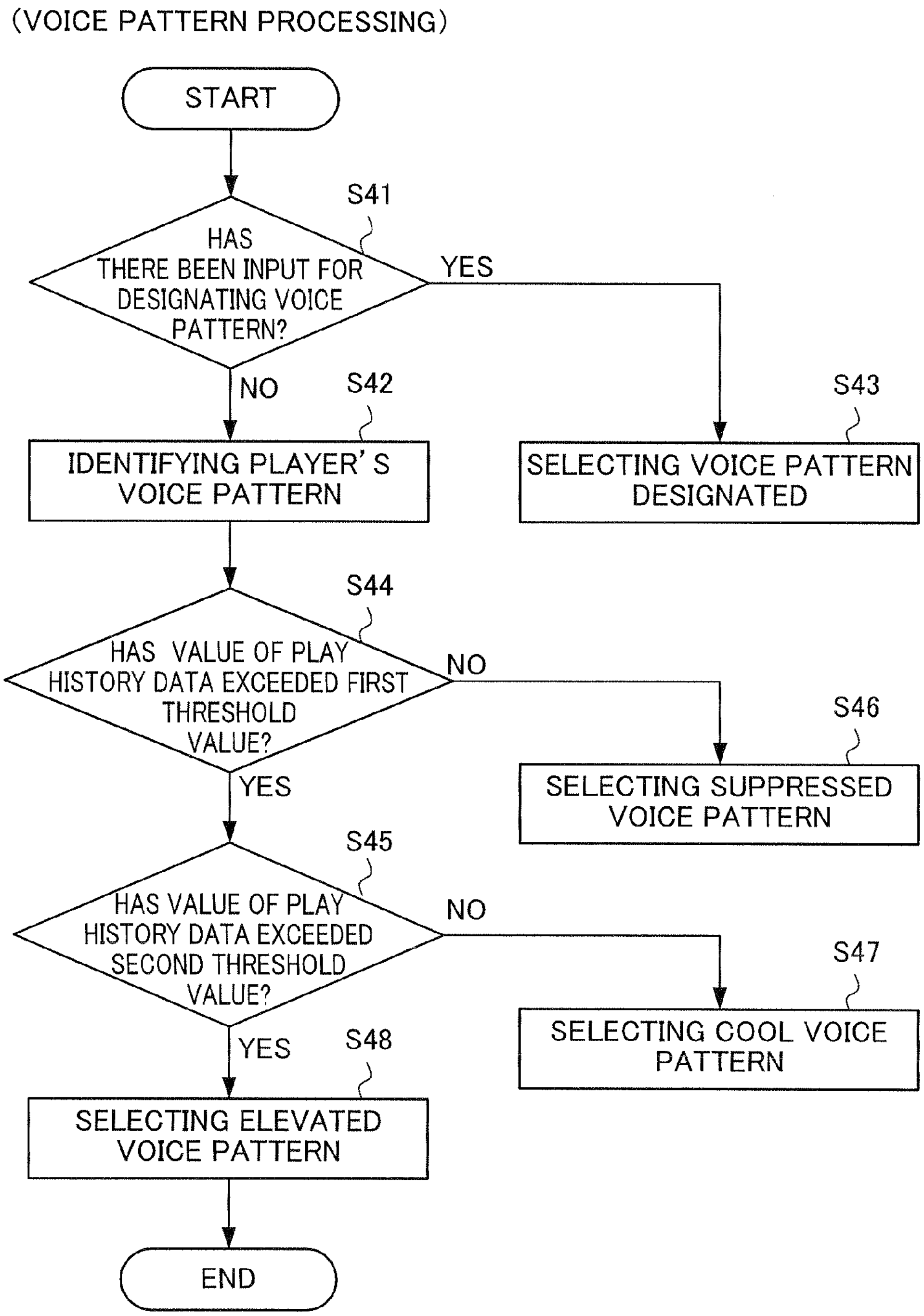
FIG. 42 is a flow chart showing a game operation carried out by a gaming system according to the first embodiment of the present invention.

The gaming machine 30 of the second embodiment of the present invention is described with reference to FIG. 42. FIG.

42 is a flowchart showing voice pattern processing that the gaming machine 30 of the present embodiment executes. The gaming system 30 of the second embodiment has substantially the same configuration and operations as those in the gaming system 30 of the first embodiment, except for voice pattern processing. Similar reference numerals have been used to describe similar components and operations, and the description thereof is, therefore, omitted.

The voice pattern processing executed by the gaming machine 30 of the present embodiment is described with reference to the flowchart shown in FIG. 42.

In the present embodiment, a plurality of thresholds are compared with values of the play history data. More specifically, a plurality of threshold values, each of which may have different values, calculated based on the input credit amount, the accumulated input credit amount, the payout amount, the accumulated payout amount, the payout rate corresponding to the payout amount per play, the accumulated play time and the accumulated number of times played, is stored in the ROM 233 as threshold value data. The present embodiment includes a first threshold value, a second threshold value, and a third threshold value, and the second threshold value is greater than the first threshold value, and the third threshold value is greater than the second threshold value. In the dialogue control processing of Step S31, the first threshold value is used as a threshold value. In addition, the dialogue control circuit 1000 incorporates information of a cool voice pattern, a suppressed voice pattern, an elevated voice pattern, examples of sentences, dictionaries, etc. in the dialogue database 1500 and the voice recognition dictionary section 1700, and is set so as to use information of a cool voice pattern, a suppressed voice pattern, an elevated voice pattern, examples of sentences, dictionaries, etc.

In Step S41, the sub-controller 235 determines whether there is an input for designating a voice pattern in Step 11. If the judgment result is YES, the procedure advances to Step S43. If it is NO, the procedure advances to Step S42. In this processing, the CPU 231 determines whether the voice pattern that the player selected is stored in the RAM 232, and also determines whether the information which indicates that the voice pattern is not selected is stored in the RAM 232.

In Step 42, the sub-controller 235 identifies a players voice pattern, and the CPU advances the processing to Step S44. In this processing, the CPU 231 controls the touch panel driving circuit 222 and displays a message for allowing the player to select a voice pattern on the liquid crystal monitor 342 based on the data stored in the RAM 232. In a case in which an indication for allowing the player to select a voice pattern is displayed on the liquid crystal monitor 342 which operates as a touch panel, the CPU 231 cooperates with the voice pattern setting circuit 70 and stores the voice pattern thus selected in the RAM 232 as a voice pattern corresponding to the player. Alternatively, in a case in which an indication for allowing the player to select a voice pattern is not displayed on the liquid crystal monitor 342 which operates as a touch panel, the CPU 231 cooperates with the voice pattern setting circuit 70 to control the touch panel driving circuit 222, and displays a message for causing the player to read out a predetermined phrase based on the data stored in the RAM 232. When a player's voice is collected from the microphone 60, the controller 235 collates the player's voice pattern using the voice recognition unit 1200 dialogue control circuit 1000. More specifically, the characteristic extraction section 1200A of the voice recognition unit 1200 determines whether it is a man's voice or a woman's voice based on a frequency such as pitch frequency and formant frequency, and stores the information thereof. In addition, the word collation section 1200C of the dialogue control circuit 1000 detects a word hypothesis and calculates and outputs the likelihood thereof by using phonemes for each dialect and phonemes HMMs including word information, which are stored in the voice recognition dictionary storage section 1700. In this way, the CPU identifies the player's voice pattern based on the information stored in the RAM 232.

In Step S43, the designated voice pattern is selected as a player's voice pattern. In this processing, the CPU 231 sets the designated voice pattern to the language control circuit 1000. More specifically, the dialogue control circuit 1000 incorporates information of designated voice patterns, examples of sentences, dictionaries, etc. in the dialogue database 1500 and the voice recognition dictionary section 1700, and is set so as to use information of designated voice patterns, examples of sentences, dictionaries, etc when generating a voice message.

In Step S44, the CPU 231 determines whether a threshold of the play history data exceeds the first threshold data. If the judgment result is YES, the procedure advances to Step S45. If it is NO, the procedure advances to Step S46. More specifically, the value calculated based on at least one of the input credit amount, the accumulated input credit amount, the payout amount, the accumulated payout amount, the payout rate corresponding to the payout amount per play, the accumulated play time, and the accumulated number of times played in the play history data generated in Step S18, is compared with the value stored in the ROM 233 as the first threshold value data.

In Step S45, the CPU 231 determines whether a threshold of the play history data exceeds the second threshold data. If the judgment result is YES, the procedure advances to Step S48. If it is NO, the procedure advances to Step S47. More specifically, the value calculated based on at least one of the input credit amount, the accumulated input credit amount, the payout amount, the accumulated payout amount, the payout rate corresponding to the payout amount per play, the accumulated play time, and the accumulated number of times played in the play history data generated in Step S18, is compared with the value stored in the ROM 233 as the second threshold value data.

In Step S24, the suppressed voice pattern is selected as a player's voice pattern. In this processing, the CPU 231 sets the suppressed voice pattern to the language control circuit 1000. More specifically, the dialogue control circuit 1000 incorporates information of suppressed voice patterns, examples of sentences, dictionaries, etc. in the dialogue database 1500 and the voice recognition dictionary section 1700, and is set so as to use information of suppressed voice patterns, examples of sentences, dictionaries, etc when generating a voice message.

In Step S47, the cool voice pattern is selected as a player's voice pattern. In this processing, the CPU 231 sets the cool voice pattern to the language control circuit 1000. More specifically, the dialogue control circuit 1000 incorporates information of cool voice patterns, examples of sentences, dictionaries, etc. in the dialogue database 1500 and the voice recognition dictionary section 1700, and is set so as to use information of cool voice patterns, examples of sentences, dictionaries, etc when generating a voice message.

In Step S24, the elevated voice pattern is selected as a player's voice pattern. In this processing, the CPU 231 sets the elevated voice pattern to the language control circuit 1000. More specifically, the dialogue control circuit 1000 incorporates information of elevated voice patterns, examples of sentences, dictionaries, etc. in the dialogue database 1500 and the voice recognition dictionary section 1700, and is set so as to use information of elevated voice patterns, examples of sentences, dictionaries, etc when generating a voice message.

In the present embodiment, the third threshold value is greater than the second threshold value. In the dialogue control processing of Step S31, the first threshold value is used as a threshold value. More specifically, for example, a suppressed voice pattern may be humble and polite voice pattern, a cool voice pattern may be a normal voice, and an elevated voice pattern may be a excited voice with intonation. With the embodiment thus configured, When a value of the play history data exceeds the first threshold value, when a value of the play history data exceeds the second threshold value, and also when a value of the play history data exceeds the third threshold data, in the dialogue control processing of Step S32, the dialogue control circuit 1000 can use various voice pattern for an identical phrase such as using intonations so as to make its conversation fun. Although voices generated by machines tends to be monotonous, which is possible to weaken the enthusiasm of players, the gaming machine 30 of the present embodiment enhances the enthusiasm of players by mounting a dialogue controller, and enhances the enthusiasm of players with a configuration that the way of outputting voice messages can be changed using various voice patterns according to players so as to avoid the voice messages outputted from the speaker 50 being monotonous.

In addition, if a player designates a voice pattern, the gaming machine of the present invention outputs a voice message with a voice pattern that the player designates. However, the present invention is not limited thereto. Even when the player designates the voice pattern, the gaming machine of the present invention can change the voice pattern that the player designates based on the latest gaming condition of the player. For example, when a player designates a dialect, a man's voice, or a woman's voice as a voice pattern and does not designate another options such as a suppressed voice pattern and elevated voice pattern, the CPU 231 advances the processing of the present embodiment from Step S43 to Step S44, and then executes the subsequent Steps. Thus, for example, even when a player designates a woman's voice pattern, the player additionally designates various voice patterns such as a voice pattern with intonations. Therefore, the conversations can be changed with various patterns using a voice pattern that the player designates, which can make the conversations more fun.

Alternatively, in stead of the sensor 40, a weight sensor may be configured to be mounted on a seat portion 311 to sense the weight of the player sitting on a seat 31 and to temporarily store the sensed weight so as to detect the player's presence. When the player leaves the seat 31 with the medals, corresponding to credits, inserted into the gaming machine 30, namely with the medals credited, the seat 31 can be turned up to the position at which a back support 312 faces the front of the gaming machine 30, upon sensing substantially the same weight as the temporarily stored player's weight. This configuration enables the dialogue control circuit 1000 to give a warning dialogue when any improper person (i.e. players other than the present player) sits on the seat 31. In addition, this prevents the following event of, when the present player temporarily leaves the seat 31 in the middle of the game with medals credited, for example, in order to go to the toilet, other player sitting on the seat 31 until the present player returns to the seat 31.

While embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims. The effects described in the foregoing embodiments are merely cited as the most suitable effects produced by the invention, and the effects of the invention are not limited to those described in the foregoing embodiments.

What is claimed is:

1. A gaming machine disposed on a predetermined play area, comprising:

a memory for storing play history data generated according to a game result of a player, a plurality of voice generation original data for generating a predetermined voice message, and a predetermined threshold value data in relation to the play history data;

a speaker for outputting a voice message;

a microphone for collecting a voice generated by a player;

a dialogue voice database for identifying a type of voice based on player's voices; and a controller programmed to carry out the following processing of:

(a) executing a game and paying out a predetermined amount of credits according to a game result;

(b) generating voice data based on a player's voice collected by the microphone;

(c) identifying a voice pattern corresponding to the voice data by retrieving the dialogue voice database and identifying a type of voice corresponding to the voice data, so as to store the voice data along with the voice pattern into the memory;

(d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation;

(e) comparing, upon updating the play history data stored in the memory, the play history data thus updated and stored in the memory with a predetermined threshold value data;

(f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern.

2. A gaming machine as set forth in claim 1, further comprising an input section for receiving a voice input instruction, wherein the controller carries out the processing of, when the voice input instruction is received by the input section, collecting player's voices in the processing (b).

3. A gaming machine as set forth in claim 1, further comprising a voice pattern specifying device for specifying a voice pattern, wherein the controller, in the processing (c), carries out the processing of identifying the voice pattern specified by the voice pattern specifying device as a voice pattern corresponding to the voice data.

4. A gaming machine as set forth in claim 1, wherein the controller, in the processing (f), carries out the processing of changing the voice pattern in view of the play history data thus updated.

5. A gaming machine as set forth in claim 1, wherein the voice pattern includes at least one of a man's voice pattern, a woman's voice pattern, a dialect pattern, a suppressed voice pattern, and an elevated voice pattern.

6. A gaming machine as set forth in claim 1, wherein the controller further carries out the following processing of:

(h) setting a language type; and (i) outputting voices from the speaker based on the language type thus set, and the play history data and the voice generation original data stored in the memory.

7. A gaming machine disposed on a predetermined play area, comprising:

a memory for storing play history data generated according to a game result of a player, a plurality of voice generation original data for generating a predetermined voice message, and a predetermined threshold value data in relation to the play history data;

a speaker for outputting a voice message;

a microphone for collecting a voice generated by a player;

an input section for receiving a voice input instruction;

a dialogue voice database for identifying a type of voice based on player's voices; and a controller programmed to carry out the following processing of:

(a) executing a game and paying out a predetermined amount of credits according to a game result;

(b) generating voice data based on a player's voice collected by the microphone when the voice input instruction is received by the input section;

(c) identifying a voice pattern corresponding to the voice data by retrieving the dialogue voice database and identifying a type of voice corresponding to the voice data, so as to store the voice data along with the voice pattern into the memory;

(d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation;

(e) comparing, upon updating the play history data stored in the memory, the play history data thus updated and stored in the memory with a predetermined threshold value data;

(f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern.

8. A gaming machine disposed on a predetermined play area, comprising:

a memory for storing play history data generated according to a game result of a player, a plurality of voice generation original data for generating a predetermined voice message, and a predetermined threshold value data in relation to the play history data;

a speaker for outputting a voice message;

a microphone for collecting a voice generated by a player;

an input section for receiving a voice input instruction;

a dialogue voice database for identifying a type of voice based on player's voices; and a controller programmed to carry out the following processing of:

(a) executing a game and paying out a predetermined amount of credits according to a game result;

(b) generating voice data based on a player's voice collected by the microphone when the voice input instruction is received by the input section;

(c) identifying a voice pattern including at least one of a man's voice pattern, a woman's voice pattern, a dialect pattern, a suppressed voice pattern, and an elevated voice pattern, corresponding to the voice data by retrieving the dialogue voice database and identifying a type of voice corresponding to the voice data, so as to store the voice data along with the voice pattern into the memory;

(d) calculating at least one of an input credit amount, an accumulated input credit amount, a payout amount, an accumulated payout amount, a payout rate, an accumulated play time, and an accumulated number of times played, according to a game result of a player, and updating the play history data stored in the memory using the result of the calculation;

(e) comparing, upon updating the play history data stored in the memory, the play history data thus updated and stored in the memory with a predetermined threshold value data;

(f) generating voice data according to the voice pattern stored in the memory based on the play history data if a result of the comparison in the processing (e) indicates that the play history data thus updated exceeds the predetermined threshold value data; and (g) outputting voices from the speaker based on the voice data generated in the processing (f) with the voice pattern.

* * * * *